(12) United States Patent
Hino et al.

(10) Patent No.: US 7,425,786 B2
(45) Date of Patent: Sep. 16, 2008

(54) PERMANENT MAGNET TYPE ROTATING ELECTRICAL MACHINE

(75) Inventors: Noriaki Hino, Mito (JP); Yutaka Matsunobu, Hitachinaka (JP); Fumio Tajima, Hitachi (JP); Takashi Yasuhara, Yotsukaido (JP)

(73) Assignee: Hitachi, Ltd., Tokyo (JP)

( * ) Notice: Subject to any disclaimer, the term of this patent is extended or adjusted under 35 U.S.C. 154(b) by 322 days.

(21) Appl. No.: 11/289,425

(22) Filed: Nov. 30, 2005

(65) Prior Publication Data
US 2006/0113858 A1     Jun. 1, 2006

(30) Foreign Application Priority Data
Nov. 30, 2004  (JP)  .............................. 2004-346384
Jul. 29, 2005  (JP)  .............................. 2005-220417

(51) Int. Cl.
*H02K 1/27*  (2006.01)
(52) U.S. Cl. ............................ 310/156.57; 310/156.53; 310/156.54; 310/156.56
(58) Field of Classification Search ................................ 310/156.43–156.58
See application file for complete search history.

(56) References Cited

U.S. PATENT DOCUMENTS

| | | | |
|---|---|---|---|
| 4,795,936 A | | 1/1989 | Crosetto et al. |
| 5,159,220 A | | 10/1992 | Kliman |
| 6,121,706 A | | 9/2000 | Nashiki et al. |
| 6,208,054 B1 * | | 3/2001 | Tajima et al. ................. 310/46 |
| 6,359,359 B1 | | 3/2002 | Miura et al. |
| 6,486,581 B2 * | | 11/2002 | Miyashita et al. ...... 310/156.53 |
| 6,703,744 B2 * | | 3/2004 | Yoshinaga et al. ..... 310/156.45 |
| 7,105,971 B2 * | | 9/2006 | Asai et al. .............. 310/156.53 |

(Continued)

FOREIGN PATENT DOCUMENTS

EP     0 901 214 A2     3/1999

(Continued)

OTHER PUBLICATIONS

European Search Report dated Jul. 11, 2006 (Twenty-two (22) pages).

(Continued)

*Primary Examiner*—Tran Nguyen
(74) *Attorney, Agent, or Firm*—Crowell & Moring LLP

(57) ABSTRACT

A permanent magnet type rotating electrical machine that is capable of producing a higher output and is suitable for high-speed rotation. A pair of nonmagnetic portions are formed in a rotor core at opposite ends of each pole. The waveform of induced voltage and a motor voltage are adjusted based on two parameters, i.e., an angle covering minimum magnetic path portions formed by the nonmagnetic portions and a magnet width. Assuming that a circumferential pitch of teeth cores with respect to a rotor axis is $\tau s$ (degree) and an opening angle contained by a circumferential width between radial width minimum points of the pair of magnetic path portions with respect to the rotor axis is $\theta$ (degree), $\theta \approx (n+Y) \times \tau s$ (n: integer larger than 0) is met. $Y=0.5$ is set when the stator windings are wound in a distributed winding way, and $Y=0.9$-$1.2$ is set when they are wound in a concentrated winding way. The magnet forming one pole is divided into two parts, and a bridge portion is formed between the two divided magnet parts.

32 Claims, 35 Drawing Sheets

U.S. PATENT DOCUMENTS

| | | | |
|---|---|---|---|
| 7,233,090 B2 * | 6/2007 | Evans et al. | 310/156.57 |
| 2003/0094875 A1 | 5/2003 | Sakuma et al. | |
| 2004/0017123 A1 | 1/2004 | Miyashita et al. | |
| 2004/0145263 A1 * | 7/2004 | Kojima et al. | 310/156.23 |
| 2005/0168089 A1 * | 8/2005 | Miyashita et al. | 310/156.57 |

FOREIGN PATENT DOCUMENTS

| | | |
|---|---|---|
| EP | 0 930 691 A1 | 7/1999 |
| EP | 1 067 656 A2 | 1/2001 |
| EP | 1 139 548 A2 | 10/2001 |
| EP | 1 298 773 A1 | 4/2003 |
| EP | 1 363 381 A1 | 11/2003 |
| EP | 1 569 320 A2 | 8/2005 |
| JP | U 7-11859 | 2/1995 |
| JP | 08-256440 A | 10/1996 |
| JP | A 10-126985 | 5/1998 |
| JP | 2000-270503 A | 9/2000 |
| JP | A 2001-112202 | 4/2001 |
| JP | A 2002-78260 | 3/2002 |
| JP | 2002-354726 A | 12/2002 |
| JP | A 2002-354726 | 12/2002 |
| JP | B2 3598887 | 9/2004 |
| JP | A 2005-6484 | 1/2005 |
| WO | WO 03/081748 A1 | 10/2003 |

OTHER PUBLICATIONS

European Search Report (Six (6) pages) dated Apr. 5, 2006.

* cited by examiner

FIG.18
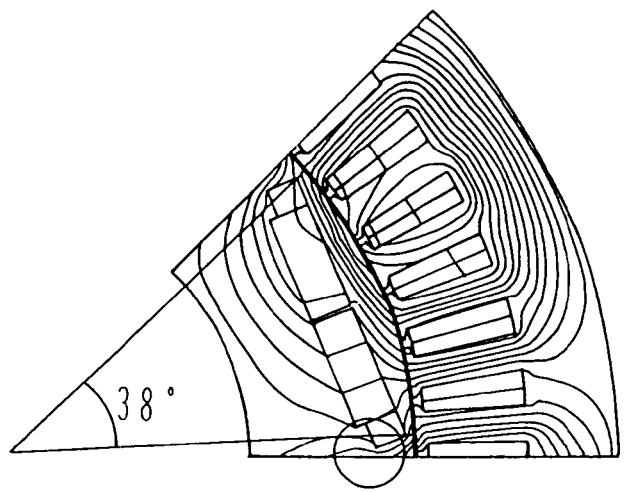 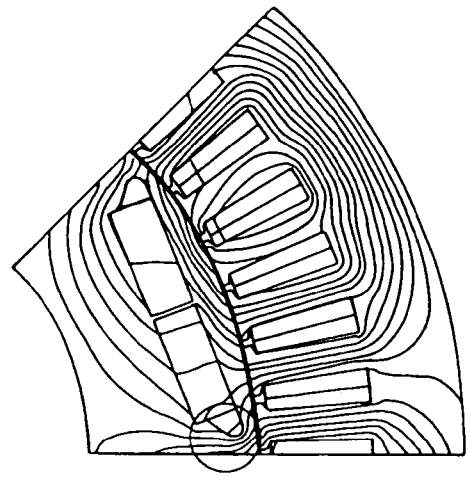
b/a=1.0  b/a=0
FIG.19
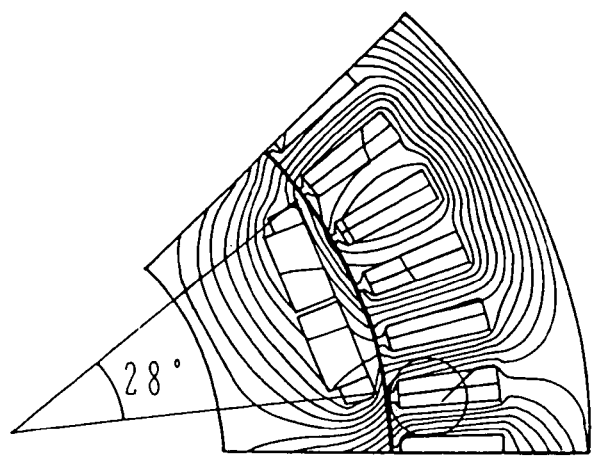 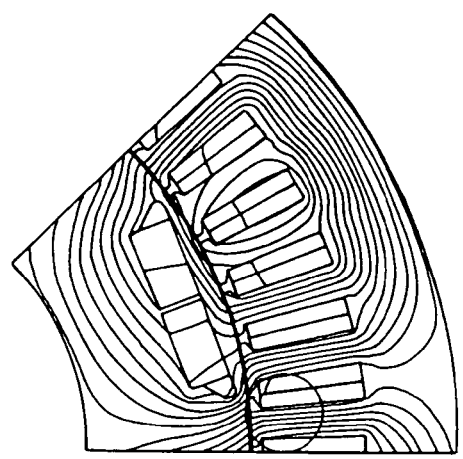
b/a=0.8  b/a=0

PERMANENT MAGNET TYPE ROTATING ELECTRICAL MACHINE

BACKGROUND OF THE INVENTION

1. Field of the Invention

The present invention relates to a permanent magnet type rotating electrical machine.

2. Description of the Related Art

A permanent magnet type rotating electrical machine, in particular, a permanent magnet type rotating electrical machine used for vehicle driving, is required to have a smaller size and a higher output, including an inverter that serves as a control circuit for the rotating electrical machine. Especially, there is a demand for a permanent magnet type rotating electrical machine that is capable of outputting large torque in a low-speed rotation range and maintaining a high output in a high-speed rotation range as well. To meet such a demand, many of permanent magnet type rotating electrical machines have hitherto been practiced as the embedded permanent magnet type provided with auxiliary salient poles, which can not only perform field weakening control, but also utilize reluctance torque in the high-speed rotation range. For example, JP,A 10-126985 (Patent Document 1) discloses the structure of one embedded permanent magnet type rotating electrical machine.

Other related structures of rotating electrical machines are disclosed in, e.g., JP,A 2005-6484 (Patent Document 2), JP,A 2002-354726 (Patent Document 3), JP,U 7-11859 (Patent Document 4), and Japanese Patent No. 3598887 (Patent Document 5).

In permanent magnet type rotating electrical machines, it is demanded to increase an output even just a small percentage, e.g., 1%, under condition of limited supply of power in vehicles. A permanent magnet type rotating electrical machine generates an electromotive force by receiving current and voltage supplied from an inverter as a control circuit. To obtain a higher output in the permanent magnet type rotating electrical machine, therefore, the waveform of voltage induced by the permanent magnet type rotating electrical machine has to be adjusted, taking into account the mutual relationships among components including the inverter as well. Known techniques for adjusting the waveform of voltage induced by the permanent magnet type rotating electrical machine are disclosed in, e.g., JP,A 2001-112202 (Patent Document 6) and JP,A 2002-78260 (Patent Document 7).

SUMMARY OF THE INVENTION

When the permanent magnet type rotating electrical machine is co-rotated with a running vehicle, a voltage is induced in stator windings due to magnetic fluxes of permanent magnets during deceleration with coasting or braking of a vehicle, for example, while the vehicle is driven by another driving source. The induced voltage is proportional to the rotation speed. Therefore, a maximum induced voltage of the permanent magnet type rotating electrical machine is decided depending on a maximum rotation speed when the machine is co-rotated. In the design stage, it is required to design an electrical system of the permanent magnet type rotating electrical machine such that a peak value of the induced voltage in the permanent magnet type rotating electrical machine will not exceed the withstand voltages of semiconductor devices and capacitors which constitute the inverter. Also, an output of the permanent magnet type rotating electrical machine is decided depending on the magnitude of a basic wave component of the induced voltage. In order to obtain a higher output of the permanent magnet type rotating electrical machine, therefore, the magnitude of a basic wave component of the induced voltage has to be increased while suppressing the peak value of the induced voltage.

The peak value of the induced voltage can be suppressed by adjusting the waveform of voltage induced by the permanent magnet type rotating electrical machine, as disclosed in the above-cited JP,A 2001-112202 and JP,A 2002-78260. However, JP,A 2001-112202 does not take into consideration of a permanent magnet type rotating electrical machine including nonmagnetic portions on both sides of a permanent magnet in the circumferential direction. Hence, Patent Document 6 is effective for the permanent magnet type rotating electrical machine not including the nonmagnetic portions on both sides of the permanent magnet in the circumferential direction, but it cannot be directly applied to the permanent magnet type rotating electrical machine including the nonmagnetic portions on both sides of the permanent magnet in the circumferential direction. In the related art disclosed in JP,A 2002-78260, because a plurality of grooves are formed in an outer peripheral surface of a rotor core, measures for reducing the windage loss and wind roar (noise) are required.

In the permanent magnet type rotating electrical machine used for vehicle driving, torque required per unit bulk is very large. Further, the torque outputted from the rotating electrical machine can be generally increased by supplying a larger current to stator windings. However, the larger current increases an amount of generated heat correspondingly, thus imposing a thermal limitation on the current density. Accordingly, efficient utilization of the magnetic fluxes generated from the permanent magnet is effective in outputting even just a litter larger torque in the permanent magnet type rotating electrical machine used for vehicle driving.

In the embedded permanent magnet type rotating electrical machine, the effective magnetic fluxes can be increased by reducing the depth of an embedded permanent magnet (i.e., embedding a permanent magnet at a shallower position) so that leakage fluxes are reduced. However, because the embedded permanent magnet type rotating electrical machine used for vehicle driving is rotated at high speeds, reducing the depth of the embedded permanent magnet (i.e., embedding a permanent magnet at a shallower position) requires a structure that provides higher mechanical strength against centrifugal forces and is endurable against high-speed rotation.

One object of the present invention is to provide a permanent magnet type rotating electrical machine, which can suppress a peak value of induced voltage when nonmagnetic portions are formed on both sides of a permanent magnet in the circumferential direction.

Another object of the present invention is to provide a permanent magnet type rotating electrical machine, which can increase a basic wave component of induced voltage while suppressing a peak value of the induced voltage.

Still another object of the present invention is to provide a permanent magnet type rotating electrical machine, which can effectively utilize magnetic fluxes of permanent magnets while ensuring durability against high-speed rotation.

Still another object of the present invention is to provide a permanent magnet type rotating electrical machine, which has a space inside a rotor.

According to one aspect of the present invention, assuming that a circumferential pitch of teeth cores with respect to a rotor axis is τs (degree) and an opening angle contained by a circumferential width between radial width minimum points of a pair of magnetic path portions with respect to the rotor axis is θ (degree), θ is expressed by the following formula (1):

$$\theta \approx (n+Y) \times \tau s \text{ (}n\text{: integer larger than 0)} \quad (1)$$

where Y=0.5 when stator windings are wound in a distributed winding way, and Y=0.9-1.2 when the stator windings are wound in a concentrated winding way.

According to another aspect of the present invention, in the case of the stator windings being wound in a distributed winding way, assuming that a circumferential pitch of teeth cores with respect to a rotor axis is τs (degree) and an opening angle contained by a circumferential width between radial width minimum points of a pair of magnetic path portions with respect to the rotor axis is θ (degree), θ is expressed by the following formula (1) and a ratio of the number m of magnetic poles of the rotor to the number of the teeth cores is expressed by the following formula (2);

$$\theta \approx (n+0.5) \times \tau s \text{ (}n\text{: natural number)} \quad (1)$$

$$m:6m \text{ (}m\text{: natural number)} \quad (2)$$

and, assuming that an angle contained by a width between circumferential opposite ends of the permanent magnet on the side closer to a stator with respect to the rotor axis is φ (degree), φ is 0.7-0.9 time θ.

According to still another aspect of the present invention, in the case of the stator windings being wound in a distributed winding way, on an assumption that a ratio of the number m of magnetic poles of the rotor to the number of teeth cores is expressed by the following formula (1);

$$m:6m \text{ (}m\text{: natural number)} \quad (1)$$

an angle contained by a circumferential width between radial width minimum points of a pair of magnetic path portions with respect to a rotor axis is in the range of 104°-112° or 152°-168° in terms of electrical angle, and an angle contained by a width between circumferential opposite ends of the permanent magnet on the side closer to a stator with respect to the rotor axis is in the range of 72.8°-100.8° or 106.4°-151.2° in terms of electrical angle.

According to still another aspect of the present invention, the permanent magnet constituting one magnetic pole of the rotor is divided into plural parts in the circumferential direction, and a bridge portion is formed between adjacent two divided parts of the permanent magnet for mechanically connecting a portion of the rotor core which is positioned on one side of the permanent magnet closer to the stator and a portion of the rotor core which is positioned on the other side of the permanent magnet closer to the axis of the rotor.

According to still another aspect of the present invention, the rotating electrical machine has a space inside the rotor, stator windings are wound in a concentrated winding way, an opening angle θ (degree) contained by a circumferential width between radial width minimum points of a pair of magnetic path portions with respect to a rotor axis is in the range of 130°-155° in terms of electrical angle, and the number of poles of the permanent magnets is 16 or more.

According to the present invention having the above-mentioned features, when the nonmagnetic portions are formed on both sides of the permanent magnet in the circumferential direction, a peak value of induced voltage can be suppressed and therefore a permanent magnet type rotating electrical machine suitable for driving a vehicle can be obtained.

Also, according to the present invention, a basic wave component of induced voltage can be increased while suppressing a peak value of the induced voltage, and therefore a permanent magnet type rotating electrical machine suitable for driving a vehicle can be obtained.

Further, according to the present invention, magnetic fluxes of the permanent magnets can be effectively utilized while ensuring durability against high-speed rotation, and therefore a permanent magnet type rotating electrical machine suitable for driving a vehicle can be obtained.

In addition, according to the present invention, a permanent magnet type rotating electrical machine having a space inside the rotor can be obtained.

BRIEF DESCRIPTION OF THE DRAWINGS

FIG. 18 is an explanatory view for explaining the effect resulting from the shape of the nonmagnetic portion;

FIG. 19 is an explanatory view for explaining the effect resulting from the shape of the nonmagnetic portion;

DESCRIPTION OF THE PREFERRED EMBODIMENTS

Embodiments of the present invention will be described below with reference to the drawings.

Figure 4:
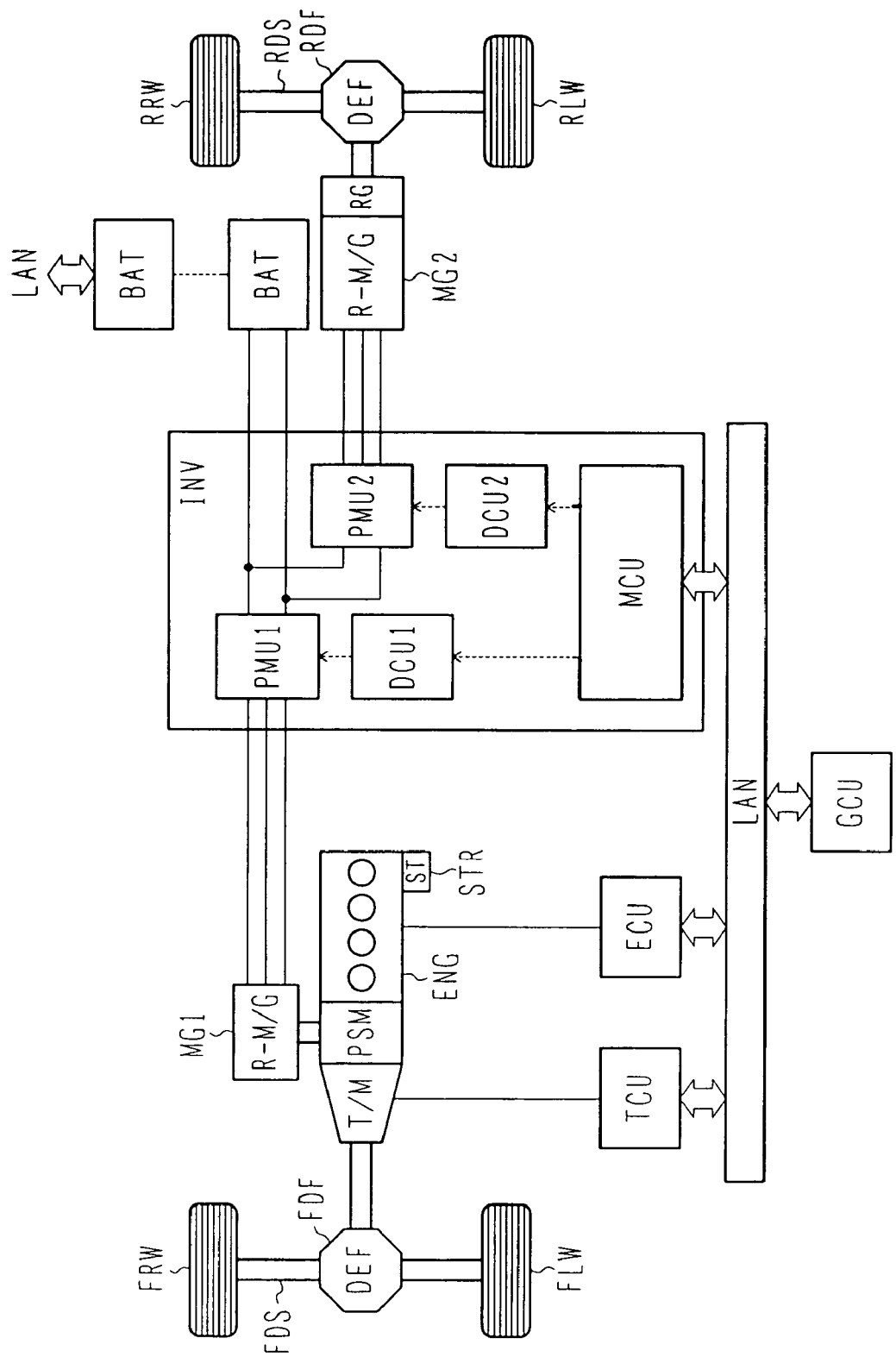
FIG. 4 is a block diagram showing the construction of a hybrid electric vehicle (HEV) to which the motor generator according to one embodiment of the present invention is applied.

With reference to FIG. 4, a description is first made of the construction of a vehicle to which a motor generator (permanent magnet type rotating electrical machine) according to one embodiment of the present invention is applied. This embodiment is described, by way of example, in connection with a hybrid electric vehicle (HEV) having two different motive power sources.

The hybrid electric vehicle of this embodiment is a four-wheel drive vehicle in which front wheels FLW, FRW are driven by an engine (internal combustion engine) ENG and a motor generator MG1, and rear wheels RLW, RRW are driven by a motor generator MG2. While this embodiment is described as driving the front wheels FLW, FRW by the engine ENG and the motor generator MG1 and driving the rear wheels RLW, RRW by the motor generator MG2, the front wheels FLW, FRW may be driven by the motor generator MG1, and the rear wheels RLW, RRW may be driven by the engine ENG and the motor generator MG2.

A transmission T/M is mechanically connected to respective front drive shafts (axles) FDS of the front wheels FLW, FRW through a front differential FDF. The motor generator MG1 and the engine ENG are mechanically connected to the transmission T/M through a power splitting mechanism PSM. The power splitting mechanism PSM serves to combine and split rotational driving forces (torque). The AC side of an inverter INV is electrically connected to stator windings of the motor generator MG1. The inverter INV is a power converting unit for converting DC power to 3-phase AC power and controls driving of the motor generator MG1. A battery BAT is electrically connected to the DC side of the inverter INV.

The motor generator MG2 is mechanically connected to respective rear drive shafts (axles) RDS of the rear wheels RLW, RRW through a rear differential RDF and a reduction gear RG. The AC side of the inverter INV is also electrically connected to stator windings of the motor generator MG2. The inverter INV is shared by the motor generators MG1 and MG2, and it includes a power module PMU1 and a drive circuit unit DCU1 for the motor generator MG1, a power module PMU2 and a drive circuit unit DCU2 for the motor generator MG2, and a motor control unit MCU.

The engine ENG is provided with a starter STR. The starter STR serves as a unit for starting the operation of the engine ENG.

An engine control unit ECU computes, based on input signals from sensors, other control units, etc., control values for operating various components (such as a throttle valve and a fuel injection valve) of the engine ENG. The control values are outputted as control signals to respective drivers for the components of the engine ENG. The operations of the components of the engine ENG are thereby controlled.

The operation of the transmission T/M is controlled by a transmission control unit TCU. The transmission control unit TCU computes, based on input signals from the sensors, other control units, etc., control values for operating a transmission mechanism. The control values are outputted as control signals to a driver for the transmission mechanism. The operation of the transmission mechanism of the transmission T/M is thereby controlled.

The battery BAT is a high-voltage lithium ion battery having a battery voltage of not lower than 200 V. A battery control unit BCU manages charging/discharging, life, etc. of the battery BAT. In order to manage charging/discharging, life, etc. of the battery BAT, voltage and current values of the battery BAT are inputted to the battery control unit BCU. Though not shown, a low-voltage battery having a battery voltage of 12 V is also installed to supply source power for a control system and a source power for a radio, lights, etc.

The engine control unit ECU, the transmission control unit TCU, the motor control unit MCU, and the battery control unit BCU are electrically interconnected via an onboard local area network LAN, and are also electrically connected to a general control unit GCU via the LAN. The connections via the LAN enable those control units to transfer signals in two-way directions for, e.g. mutual transfer of information and sharing of detected values among them. The general control unit GCU outputs command signals to the corresponding control units depending on the operating status of the vehicle. For example, the general control unit GCU computes a torque value required for the vehicle depending on the depression amount of an accelerator in accordance with an acceleration demand from a driver, and splits the required torque value to an output torque value for the engine ENG side and an output torque value for the motor generator MG1 side so that satisfactory operation efficiency of the engine ENG is obtained. Then, the general control unit GCU outputs the split output torque value for the engine ENG side, as an engine torque command signal, to the engine control unit ECU and the split output torque value for the motor generator MG1 side, as a motor torque command signal, to the motor control unit MCU.

The operation of the hybrid electric vehicle of this embodiment will be described below.

At startup of the hybrid electric vehicle and in a low-speed running mode thereof (i.e., in a running range where the operation efficiency (fuel economy) of the engine ENG is reduced), the front wheels FLW, FRW are driven by the motor generator MG1. While this embodiment is described as driving the front wheels FLW, FRW by the motor generator MG1 at the startup and in the low-speed running mode of the hybrid electric vehicle, the rear wheels RLW, RRW may be driven by the motor generator MG2 in addition to the driving of the front wheels FLW, FRW by the motor generator MG1 (i.e., four-wheel drive). DC power is supplied to the inverter INV from the battery BAT. The supplied DC power is converted to 3-phase AC power by the inverter INV. The converted 3-phase AC power is supplied to the stator windings of the motor generator MG1. The motor generator MG1 is thereby driven to produce a torque (rotation) output. The produced torque output is applied to the transmission T/M through the power splitting mechanism PSM. The applied torque output is changed in speed by the transmission T/M and then applied to the front differential FDF. The applied torque output is split by the front differential FDF into components for the left and right sides, which are transmitted to the left and right front drive shafts FDS. The front drive shafts FDS are thereby driven to rotate. Then, the front wheels FLW, FRW are driven to rotate with the rotation of the front drive shafts FDS.

In an ordinary running mode of the hybrid electric vehicle (i.e., in a running range where the vehicle runs on a dried road surface and the operation efficiency (fuel economy) of the engine ENG is good), the front wheels FLW, FRW are driven by the engine ENG. A torque output of the engine ENG is applied to the transmission T/M through the power splitting mechanism PSM. The applied torque output is changed in speed by the transmission T/M and then applied to the front drive shafts FDS through the front differential FDF. Thus, the front wheels FLW, FRW are driven to rotate with the rotation of the front drive shafts FDS. When it is required to detect the charged state of the battery BAT and to charge the battery BAT, the torque output of the engine ENG is split to the motor generator MG1 through the power splitting mechanism PSM, thereby driving the motor generator MG1 to rotate. Thus, the motor generator MG1 operates as a generator. With that operation, 3-phase AC power is generated in the stator windings of the motor generator MG1. The generated 3-phase AC power is converted to predetermined DC power by the inverter INV. The thus-converted DC power is supplied to the battery BAT. As a result, the battery BAT is charged.

In a four-wheel-drive running mode of the hybrid electric vehicle (i.e., in a running range where the vehicle runs on a low-μ road surface, e.g., a snow-covered road, and the operation efficiency (fuel economy) of the engine ENG is good), the rear wheels RLW, RRW are driven by the motor generator MG2. At the same time, the front wheels FLW, FRW are driven by the engine ENG as in the above-described ordinary running mode. Further, because the amount of electricity charged in the battery BAT is reduced with the driving of the motor generator MG1, the motor generator MG1 is driven to rotate with the torque output of the engine ENG, thereby charging the battery BAT as in the above-described ordinary running mode. In order to drive the rear wheels RLW, RRW by the motor generator MG2, the DC power is supplied to the inverter INV from the battery BAT. The supplied DC power is converted to 3-phase AC power by the inverter INV. The converted 3-phase AC power is supplied to the stator windings of the motor generator MG2. The motor generator MG2 is thereby driven to produce a torque output. The produced torque output is reduced in speed by the reduction gear RG and then applied to the rear differential RDF. The applied torque output is split by the rear differential RDF into components for the left and right sides, which are transmitted to the left and right rear drive shafts RDS. The rear drive shafts RDS are thereby driven to rotate. Then, the rear wheels RLW, RRW are driven to rotate with the rotation of the rear drive shafts RDS.

In an acceleration mode of the hybrid electric vehicle, the front wheels FLW, FRW are driven by both the engine ENG and the motor generator MG1. While this embodiment is described as driving the front wheels FLW, FRW by the engine ENG and the motor generator MG1 in the acceleration mode of the hybrid electric vehicle, the rear wheels RLW, RRW may be driven by the motor generator MG2 in addition to the driving of the front wheels FLW, FRW by the engine ENG and the motor generator MG1 (i.e., four-wheel drive). The torque outputs of the engine ENG and the motor generator MG1 are applied to the transmission T/M through the power splitting mechanism PSM. The applied torque output is changed in speed by the transmission T/M and then transmitted to the front drive shafts FDS through the front differential FDF. The front wheels FLW, FRW are thereby driven to rotate.

In a regenerative mode of the hybrid electric vehicle (i.e., during deceleration occurred when a brake is depressed, or when the depression of the accelerator is relieved or stopped), the torque of the front wheels FLW, FRW is transmitted to the motor generator MG1 through the front drive shafts FDS, the front differential FDF, the transmission T/M, and the power splitting mechanism PSM, thereby driving the motor generator MG1 to rotate. Thus, the motor generator MG1 operates as a generator. With that operation, 3-phase AC power is generated in the stator windings of the motor generator MG1. The generated 3-phase AC power is converted to predetermined DC power by the inverter INV. The thus-converted DC power is supplied to the battery BAT. As a result, the battery BAT is charged. On the other hand, the torque of the rear wheels RLW, RRW is transmitted to the motor generator MG2 through the rear drive shafts RDS, the rear differential RDF, and the reduction gear RG, thereby driving the motor generator MG2 to rotate. Thus, the motor generator MG2 operates as a generator. With that operation, 3-phase AC power is generated in the stator windings of the motor generator MG2. The generated 3-phase AC power is converted to predetermined DC power by the inverter INV. The thus-converted DC power is supplied to the battery BAT. As a result, the battery BAT is charged.

Figure 3:
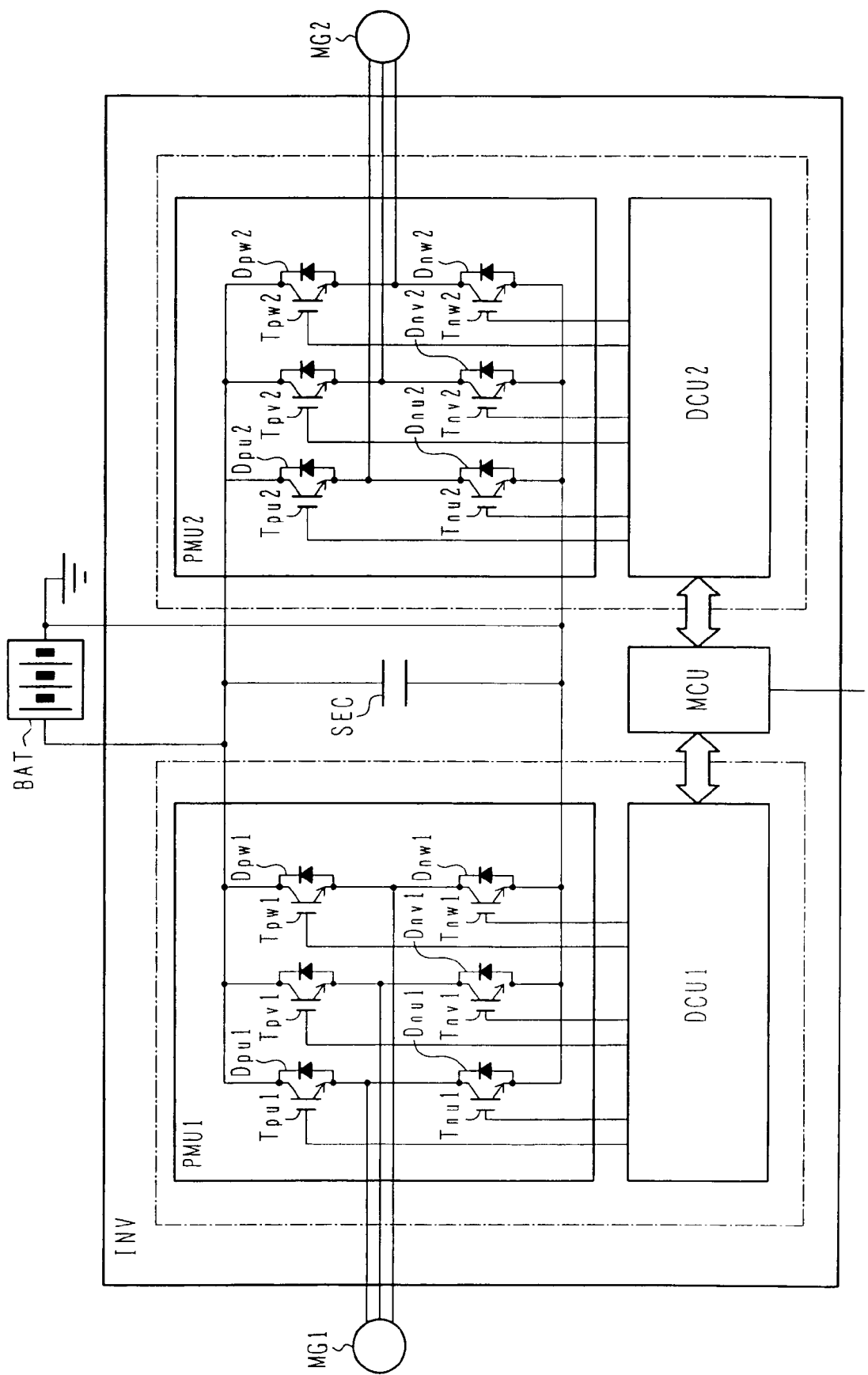
FIG. 3 is a circuit diagram showing the circuit configuration of an inverter used in one embodiment of the present invention.

FIG. 3 shows the circuit configuration of the inverter INV used in this embodiment.

The inverter INV includes, as described above, the power modules PMU1, PMU2, the drive circuit units DCU1, DCU2, and the motor control unit MCU. The power modules PMU1, PMU2 have the same configuration, and the drive circuit units DCU1, DCU2 have the same configuration.

The power modules PMU1, PMU2 constitute conversion circuits (also called main circuits) for converting the DC power supplied from the battery BAT to the AC power and supplying the converted DC power to the motor generators MG1, MG2, respectively. Further, the conversion circuits convert the AC power supplied from the corresponding motor generators MG1, MG2 to the DC power that is supplied to the battery BAT.

The conversion circuits are each constituted as a bridge circuit in which serial circuits for three phases are electrically connected in parallel between the positive side and the negative side of the battery BAT. Each of the serial circuits is also called an arm and is made up of two semiconductor devices.

The arm is constituted per phase by electrically connecting a power semiconductor device in the upper arm side and a power semiconductor device in the lower arm side in series. This embodiment uses, as the power semiconductor device, an IGBT (Insulated Gate Bipolar Transistor) that is a switching semiconductor device. A semiconductor chip constituting the IGBT has three electrodes, i.e., a collector electrode, an emitter electrode, and a gate electrode. A diode in the form of another chip separate from the IGBT is electrically connected between the collector electrode and the emitter electrode. More specifically, the diode is electrically connected between the emitter electrode and the collector electrode such that the direction from the emitter electrode toward the collector of the IGBT is a forward direction. As the power semiconductor device, a MOSFET (Metal Oxide Semiconductor Field Effect Transistor) may be used instead of the IGBT. In this case, the diode is omitted.

A u-phase arm of the power module PMU1 is constituted by electrically connecting an emitter electrode of a power semiconductor device Tpu1 and a collector electrode of a power semiconductor device Tnu1 in series. Other v- and w-phase arms are constituted similarly to the u-phase arm. More specifically, a v-phase arm of the power module PMU1 is constituted by electrically connecting an emitter electrode of a power semiconductor device Tpv1 and a collector electrode of a power semiconductor device Tnv1 in series, and a w-phase arm of the power module PMU1 is constituted by electrically connecting an emitter electrode of a power semiconductor device Tpw1 and a collector electrode of a power semiconductor device Tnw1 in series. In the power module PMU2, arms of respective phases are also constituted in similar connection relationships to those in the power module PMU1.

The collector electrodes of the power semiconductor devices Tpu1, Tpv1, Tpw1, Tpu2, Tpv2 and Tpw2 are electrically connected to the higher potential side (positive side) of the battery BAT. The emitter electrodes of the power semiconductor devices Tnu1, Tnv1, Tnw1, Tnu2, Tnv2 and Tnw2 are electrically connected to the lower potential side (negative side) of the battery BAT.

A midpoint of the u-phase arm (v- or w-phase arm) of the power module PMU1 (i.e., a junction between the emitter electrode of the upper-arm side power semiconductor device and the collector electrode of the lower-arm side power semiconductor device in each arm) is electrically connected to the stator windings of the u-phase (v- or w-phase) in the motor generator MG1.

A midpoint of the u-phase arm (v- or w-phase arm) of the power module PMU2 (i.e., a junction between the emitter electrode of the upper-arm side power semiconductor device and the collector electrode of the lower-arm side power semiconductor device in each arm) is electrically connected to the stator windings of the u-phase (v- or w-phase) in the motor generator MG2.

Between the positive side and the negative side of the battery BAT, an electrolytic capacitor SEC for smoothing is electrically connected in order to suppress fluctuations of the DC voltage caused with the operation of the power semiconductor device.

The drive circuit units DCU1, DCU2 constitute drivers for outputting drive signals to operate the power semiconductor devices of the power modules PMU1, PMU2 in accordance with the control signals outputted from the motor control unit MCU, thereby operating the power semiconductor devices. Each of the drive circuit units DCU1, DCU2 is made up of circuit parts, such as an isolated power supply, an interface circuit, a drive circuit, a sensor circuit, and a snubber circuit (all not shown).

The motor control unit MCU is a processing unit constituted by a microcomputer, which receives a plurality of input signals and outputs, to the drive circuit units DCU1, DCU2, the control signals for operating the power semiconductor devices of the power modules PMU1, PMU2. As the input signals, the motor control unit MCU receives torque command values $\tau^*1$, $\tau^*2$, current detected signals iu1-iw1, iu2-iw2, and pole position detected signals $\theta1$, $\theta2$.

The torque command values $\tau^*1$, $\tau^*2$ are outputted from the higher-level control unit depending on the vehicle operating mode. The torque command value $\tau^*1$ corresponds to the motor generator MG1, and the torque command value $\tau^*2$ corresponds to the motor generator MG2, respectively. The current detected signals iu1-iw1 are detected signals of input currents of the u- to w-phases supplied from the conversion circuit of the inverter INV to the stator windings of the motor generator MG1, and are obtained by detecting the respective input currents with current sensors, such as current transformers (CT). The current detected signals iu2-iw2 are detected signals of input currents of the u- to w-phases supplied from the inverter INV to the stator windings of the motor generator MG2, and are obtained by detecting the respective input currents with current sensors, such as current transformers (CT). The pole position detected signal $\theta1$ is a detected signal of the rotating pole position of the motor generator MG1, and is obtained by using a pole position sensor, such as a resolver, an encoder, a Hall device or a Hall IC. The pole position detected signal $\theta2$ is a detected signal of the rotating pole position of the motor generator MG2, and is obtained by using a pole position sensor, such as a resolver, an encoder, a Hall device or a Hall IC.

The motor control unit MCU computes voltage control values based on the input signals and outputs, to the drive circuit units DCU1, DCU2, the computed voltage control values as control signals (PWM (Pulse Width Modulation) signals) for operating the power semiconductor devices Tpu1-Tnw1, Tpu2-Tnw2 of the power modules PMU1, PMU2.

Generally, the motor control unit MCU outputs a PWM signal such that the voltage averaged over time has a sine wave. In that case, a momentary maximum output voltage is given based on the voltage of a DC line inputted to the inverter and therefore has an effective value of $1/\sqrt{2}$ time when the sine-wave voltage is outputted. Taking into account that fact, in the hybrid electric vehicle of this embodiment, the effective value of the motor input voltage is increased with intent to further increase the motor output under limitation in use of the inverter. Stated another way, the motor control unit MCU is designed to output a PWM signal in a rectangular wave having only ON and OFF levels. As a result, the rectangular-wave signal has a crest value given by the voltage Vdc of the DC line inputted to the inverter and therefore has an effective value of Vdc. This is a method for maximizing the effective value of the motor input voltage.

However, the rectangular-wave voltage accompanies the problem that, in a low rotation speed range, the current waveform is disturbed due to small inductance and undesired vibration forces are applied to the motor, thus causing noise. For that reason, rectangular-wave voltage control is executed only in the high-speed rotation mode, and ordinary PWM control is executed at low frequency.

Figure 1:
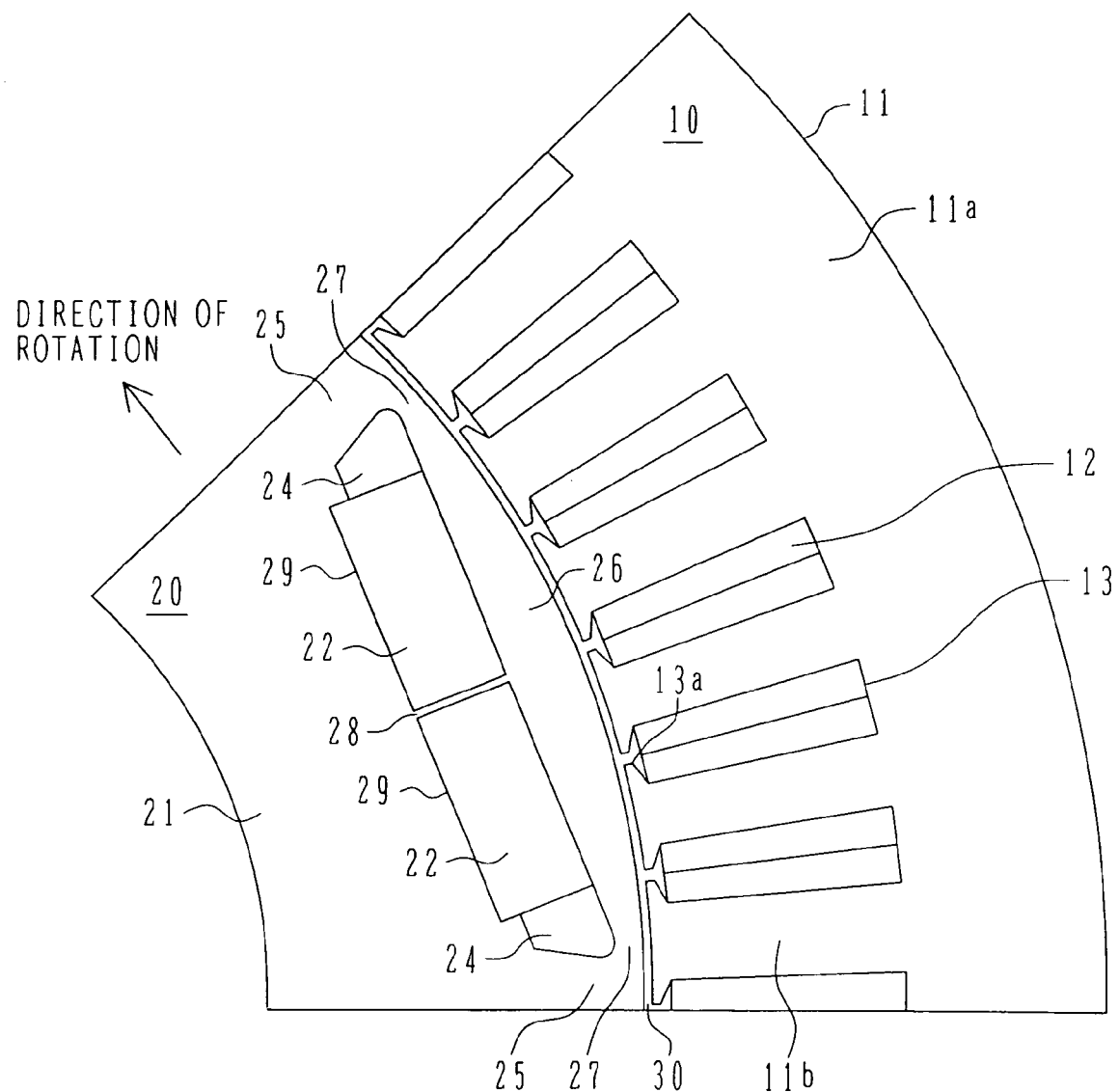
FIG. 1 is a sectional view showing the structure of a motor generator according to one embodiment of the present invention.
Figure 2:
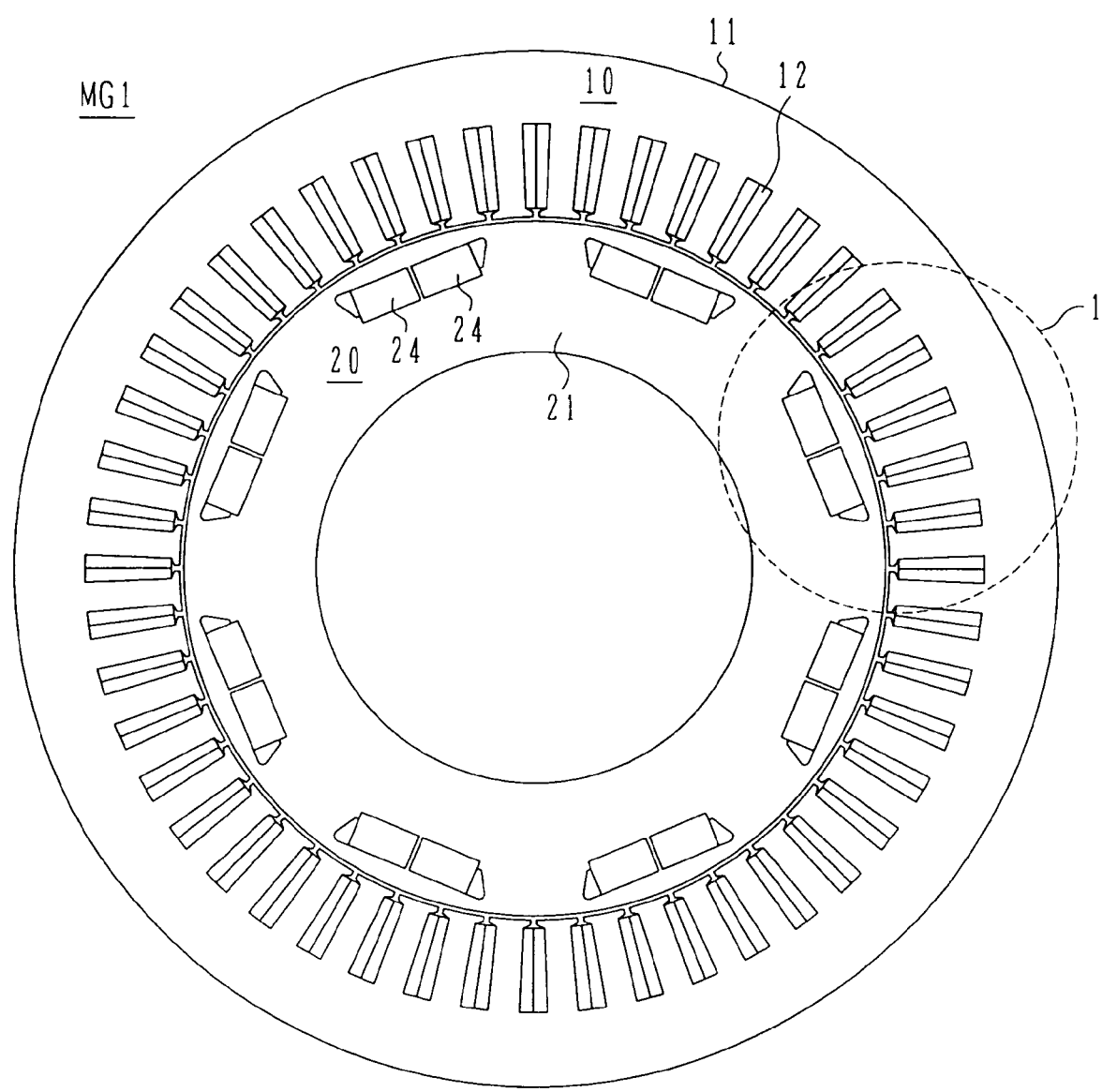
FIG. 2 is a sectional view showing the structure of the motor generator according to one embodiment of the present invention.

FIGS. 1 and 2 show the structure of the motor generator MG1 of this embodiment.

This embodiment will be described below, by way of example, in connection with the case of using an embedded permanent magnet type 3-phase AC synchronous machine as the motor generator MG1. While the structure of the motor generator MG1 is described in this embodiment, the motor generator MG2 also has the same structure.

As shown in FIG. 2, the motor generator MG1 of this embodiment comprises a stator 10 and a rotor 20 that is rotatably supported and disposed inside the stator 10 in opposed relation to an inner periphery of the stator 10 with a gap 30 left between them. The stator 10 and the rotor 20 are held in a housing. The housing is omitted from the drawing.

The stator 10 comprises a stator core 11 and stator windings 12. The stator core 11 is formed by stacking a plurality of magnetic substances, e.g., a plurality of silicon steel plates, in multiple layers in the axial direction. The stator core 11 is made up of a yoke portion (also called a core back portion) and teeth portions (also called projected portions or salient pole portions). The yoke portion is constituted as a cylindrical yoke core 11a (also called a core back) that is fitted to an inner periphery of the housing. The teeth portions are constituted as a plurality of teeth cores 11b, which are projected radially inward from an inner periphery of the yoke core 11a and are arranged at predetermined angular intervals in the circumferential direction. In this embodiment, 48 teeth cores 11b are formed along the inner periphery of the yoke core 11a. Thus, the stator 10 having a number 48 of magnetic poles is obtained in this embodiment.

Between every adjacent twos of the teeth cores 11b, a number 48 of slots 13 are formed which are continuously extended in the axial direction and have slot openings 13a on the side facing the rotor 20. Within 48 slots 13, slot insulations (not shown) are provided and plural sets of phase windings of the u- to w-phases constituting the stator windings 12 are fitted. In this embodiment, the stator windings 12 are wound in a way of distributed winding. Here, the term "distributed winding" means a winding method in which the phase windings are wound in the stator core 11 such that the phase windings are accommodated in two slots 13 spaced from each other in bridging relation to a plurality of slots 13 per phase. Since this embodiment uses the distributed winding as the winding method, motor control can be executed over a wide rotation speed range covering not only low rotation speeds, but also high rotation speeds by utilizing the field-weakening control and the reluctance torque.

The rotor 20 comprises a rotor core 21 and permanent magnets 22. The rotor core 21 is formed by stacking a plurality of annular magnetic substances, e.g., a plurality of annular silicon steel plates, in multiple layers in the axial direction. In an outer peripheral portion of the rotor core 21, a number 8 of permanent magnet insertion holes 29 are formed such that the holes are arranged at equal angular intervals in the circumferential direction and are extended to penetrate through the rotor core 21 from one end side to the other end side in the axial direction. The permanent magnet insertion holes 29 are obtained as a result of forming openings in the outer peripheral portion of each of annular silicon steel plates in the same positions, the same shape, the same dimensions, and the same number before the plates are stacked, and then stacking those annular silicon steel plates in multiple layers.

The permanent magnet insertion holes 29 are each divided into two parts in the circumferential direction per magnetic pole. Between two divided halves of each of the permanent magnet insertion holes 29 per magnetic pole, a bridge portion 28 is provided to mechanically connect a portion of the rotor core 21 positioned on one side of the permanent magnet insertion hole 29 closer to the stator 10 and a portion of the rotor core 21 positioned on the other side of the permanent magnet insertion hole 29 closer to an axis of the rotor 20. The bridge portion 28 is continuously extended in the axial direction like the permanent magnet insertion hole 29.

The permanent magnets 22 are inserted in the permanent magnet insertion holes 29, respectively. Therefore, the rotor 20 having eight permanent magnets 22 embedded in the outer peripheral portion of the rotor core 21 is obtained. Stated another way, this embodiment uses the rotor 20 having a number 8 of magnetic poles. Thus, in this embodiment, since the permanent magnets 22 are embedded in the rotor core 21, the strength of the rotor 20 against centrifugal forces is increased and the motor generator MG1 suitable for high-speed rotation can be obtained.

Corresponding to the division of the permanent magnet insertion hole 29, the permanent magnet 22 is inserted in the permanent magnet insertion hole 29 such that it is divided into two parts in the circumferential direction per magnetic pole. More specifically, the permanent magnets 22 having S and N poles are alternately inserted in the permanent magnet insertion holes 29 in the circumferential direction such that two adjacent permanent magnets have opposite polarities in units of magnetic pole (each unit of magnetic pole having the same polarity). With such an arrangement, an auxiliary pole portion 25 is formed in an area of the rotor core 21, which is positioned between the adjacent permanent magnets 22. The auxiliary pole portion 25 constitutes a magnetic circuit bypassing magnetic circuits of the permanent magnets 22 and serves as a region for directly generating magnetic fluxes in the rotor 20 by the magnetomotive force of the stator 10. Further, a pole shoe portion 26 is formed in an area of the rotor core 21, which is positioned radially outward of each permanent magnet 22. The pole shoe portion 26 serves as a region constituting a magnetic circuit through which magnetic fluxes of the permanent magnet 22 pass.

With this embodiment, the efficiency of the motor generator MG1 can be increased by utilizing two kinds of torque, i.e., torque due to the magnetic fluxes of the permanent magnet 22 and reluctance torque due to the magnetic fluxes passing through the auxiliary pole portion 25. Also, with this embodiment, since the auxiliary pole portion 25 enables the field weakening control to be performed, a high-speed operation range of the motor generator MG1 can be widened. Further, with this embodiment, since the pole shoe portion 26 is made of a magnetic substance, pulsating magnetic fluxes of the stator pole can be relaxed.

The permanent magnet 22 can be formed of a neodymium-based sintered magnet, a ferrite magnet, or a neodymium-based bonded magnet. The residual magnetic flux density produced by the permanent magnet 22 is about 0.4-1.2 T. The permanent magnet 22 is magnetized substantially in the radial direction. Also, the circumferentially divided two parts of the permanent magnet 22 are magnetized substantially in the same direction.

A number 6 of teeth cores 11b are positioned to face one rotor pole. In other words, a ratio of the number m of rotor poles to the number of the teeth cores 11b is m:6 m (m: natural number).

A pair of nonmagnetic portions 24 made of magnetic gaps (slits) are formed at circumferential opposite ends of the permanent magnet 22 for each rotor pole. The nonmagnetic portions 24 serve to moderate the gradient of distribution of magnetic flux density produced by the permanent magnet 22 in areas between the circumferential opposite ends of the permanent magnet 22 and the auxiliary pole portions 25 for each rotor pole. The nonmagnetic portions 24 are formed integrally with the permanent magnet insertion hole 29 and are provided in practice by being left open adjacent to the circumferential opposite ends of the permanent magnet 22 when the permanent magnet 22 is inserted in the permanent magnet insertion hole 29. Similarly to the permanent magnet insertion hole 29, the nonmagnetic portions 24 are extended to penetrate through the rotor core 21 from one end to the other end in the axial direction. A filler, such as varnish, may be filled in the nonmagnetic portions 24. In this embodiment, the provision of the nonmagnetic portions 24 reduces cogging torque. Further, with the provision of the nonmagnetic portions 24, the radial size of a magnetic path portion 27 formed at the boundary between the pole shoe portion 26 and the auxiliary pole portion 25 can be made smaller than the radial width of the permanent magnet 22, and therefore leakage fluxes of the permanent magnet 22 can be reduced. In fact, the radial size of the magnetic path portion 27 is not larger than half the radial width of the permanent magnet 22.

The nonmagnetic portions 24 are each trapezoidal in shape such that a side closer to the axis of the rotor 20 has a length shorter than that of a side closer to the stator 10. Also, a corner of the nonmagnetic portion 24 defined by an oblique side, which connects the side closer to the stator 10 and the side closer to the axis of the rotor 20 and is positioned closer to the auxiliary pole portion 25, and by the side closer to the stator 10 is rounded to have a predetermined radius of curvature such that the corner has a circular-arc shape. This rounding relaxes concentration of stresses generated with centrifugal forces due to the rotation of the rotor 20 and acting on the corner of the nonmagnetic portion 24 defined by the oblique side, which connects the side closer to the stator 10 and the side closer to the axis of the rotor 20 and is positioned closer to the auxiliary pole portion 25, and by the side closer to the stator 10.

A pole position sensor (resolver) for detecting the position of the magnetic pole (permanent magnet 22) in the rotor 20 and an encoder for detecting the rotational position of the rotor 20 are disposed on a rotary shaft of the rotor 20 at one end in the axial direction. Detected signals outputted from the resolver and the encoder are inputted to the motor control unit MCU in the inverter INV. The inverter INV executes computations based on the input detected signals and command signals outputted from the higher-level control unit, etc., and then controls the voltage applied to the stator windings 12 of the motor generator MG1. The motor generator MG1 is driven as a motor with application of the voltage controlled by the inverter INV to the stator windings 12.

Figure 5:
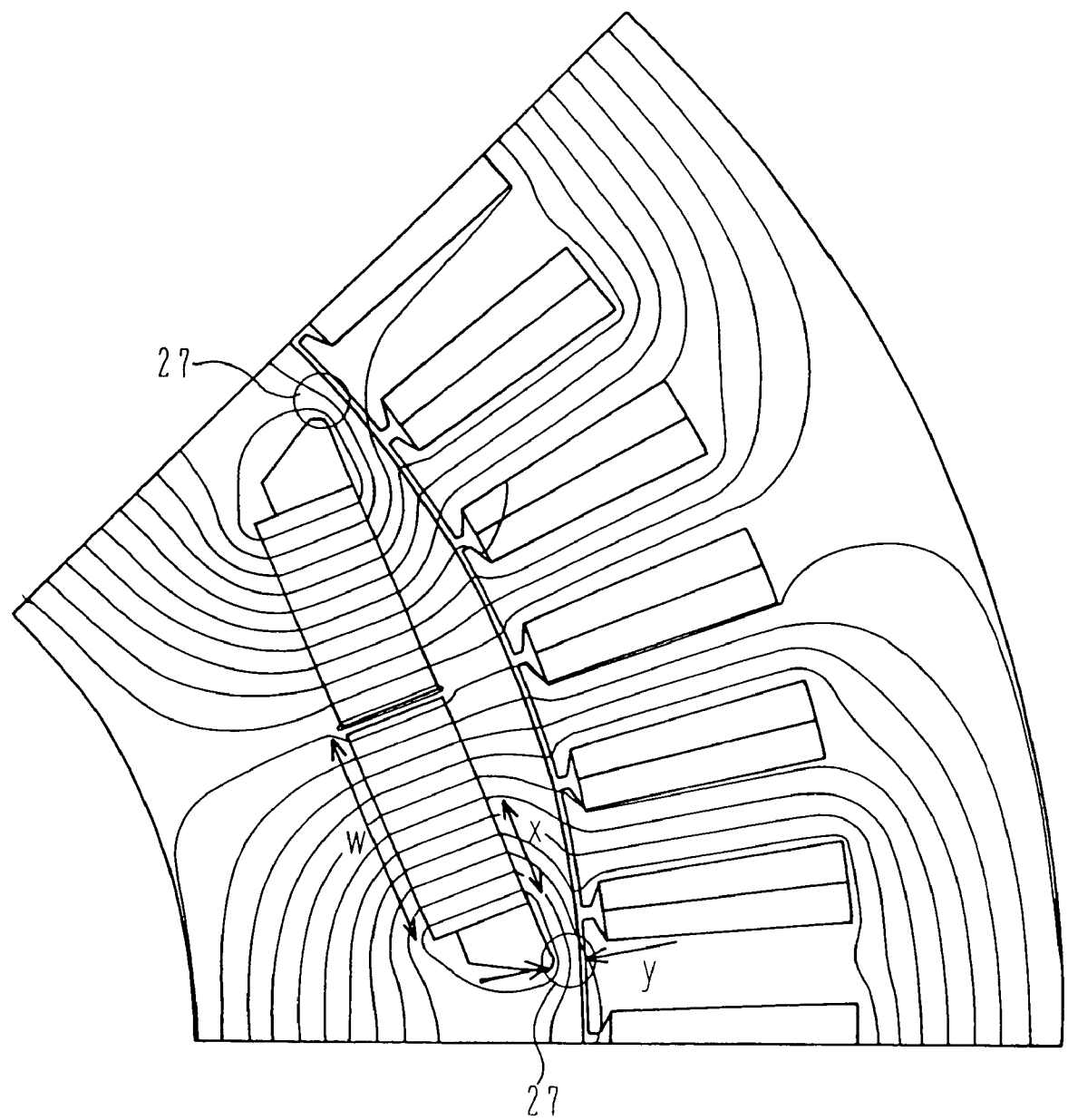
FIG. 5 shows flows of magnetic fluxes formed by a permanent magnet in the motor generator according to one embodiment of the present invention.

FIG. 5 shows flows of magnetic fluxes produced by the permanent magnet 22 of the rotor 20 in a non-load state where power is not supplied to the stator windings 12. When the motor generator MG1 is rotated in the non-load state, a voltage is induced in the stator windings 12. In other words, the induced voltage is generated in such a manner that the magnetic fluxes of the permanent magnet 22 produce a rotating field with the rotation of the rotor 20, and magnetic fluxes formed by the rotting field are brought into interlikage with the stator windings 12 while changing in density.

Looking at the flows of the magnetic fluxes produced by the permanent magnet 22 in the pair of the magnetic path portions 27, it is understood that, in an area near the stator 10, the magnetic fluxes exit from the rotor 20 side toward the stator 10 side, but in a more inner area, the magnetic fluxes go around the inner portion of the rotor core 21 without exiting to the stator 10 side, thus becoming leakage fluxes.

Since the magnetic fluxes of the permanent magnet 22 go around from the N pole to the S pole, the magnetic fluxes surrounded by the core are generally kept from exiting the rotor 20. By narrowing the radial width of the magnetic path portion 27, however, the magnetic flux density can be made saturated in the magnetic path portion 27 so that the magnetic fluxes are bridged from the rotor 20 side to the stator 10 side through the gap 30. Because the rotor core 21 is made of iron, the saturated magnetic flux density in the rotor core 21 is about 2 T. Assuming here the residual magnetic flux density produced by the permanent magnet 22 to be about 1 T, the magnetic flux density in the magnetic path portion 27 is saturated if a circumferential width x of the permanent magnet 22 from the circumferential end is about twice or more a radial width y of the magnetic path portion 27. Stated another way, assuming the circumferential width of the half-divided permanent magnet 22 to be w, magnetic fluxes Φ of the permanent magnet 22 effectively transmitted to the stator 10 side is given by magnetic fluxes generated from the circumferential width of the permanent magnet 22, which is expressed as follows:

$$\Phi \propto w - x = w - 2 \times y$$

The permanent magnet 22 is positioned inward of the pair of the magnetic path portions 27 in the saturated state. Accordingly, the magnetic fluxes of the permanent magnet 22 exiting from the rotor 20 side toward the stator 10 side are changed depending on the positions where the pair of magnetic path portions 27 are located in the circumferential direction of the rotor 20.

Figure 6:
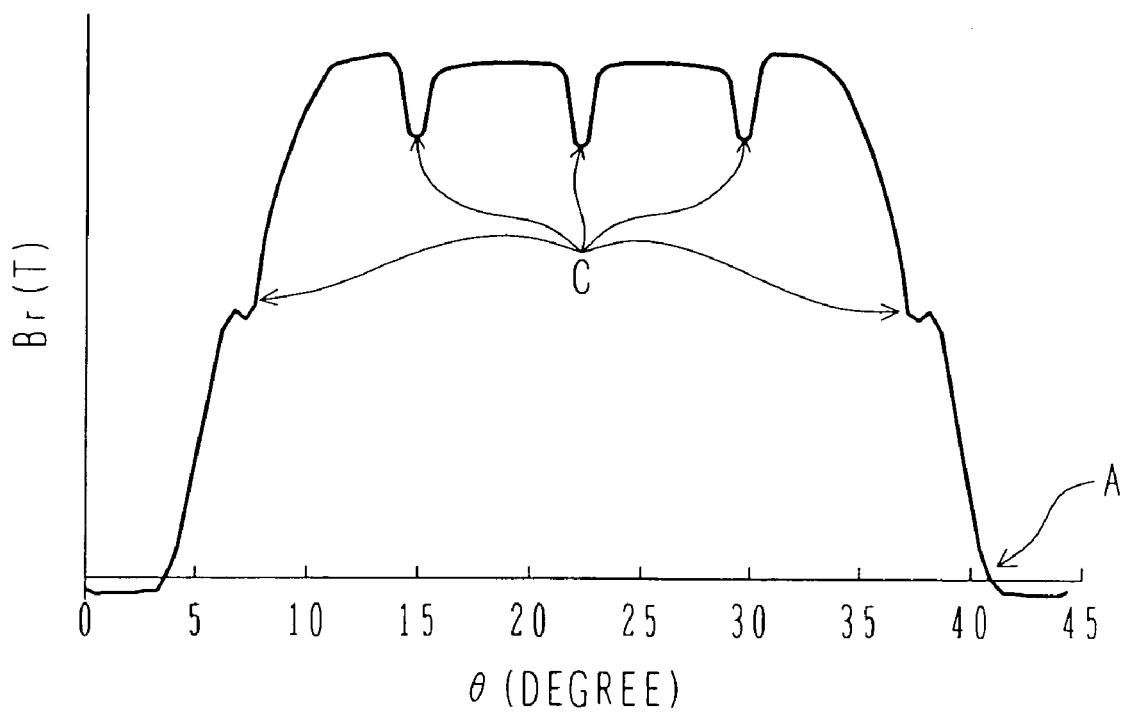
FIG. 6 is a graph showing the distribution of a radial component of magnetic flux density produced by the permanent magnet in the motor generator according to one embodiment of the present invention.

FIG. 6 shows the distribution of a radial component Br of magnetic flux density B produced by the permanent magnet 22 in the gap 30 covering one rotor pole in FIG. 1. In FIG. 6, the horizontal axis represents a circumferential position (mechanical angle θ) in the gap 30 covering one rotor pole in FIG. 1, and the vertical axis represents the radial component Br of the magnetic flux density B produced by the permanent magnet 22. In the distribution graph of FIG. 6, the radial component Br of the magnetic flux density B produced by the permanent magnet 22 have values reduced at five points C. Such reductions are caused for the reason that those points C correspond to respective positions of the five slot openings 13a.

As seen from the distribution graph of FIG. 6, the radial component Br of the magnetic flux density B produced by the permanent magnet 22 is distributed substantially in trapezoidal shape. Then, a position indicated by a point A in the distribution of the radial component Br of the magnetic flux density B produced by the permanent magnet 22 and corresponding to each of two base angles of the trapezoid matches with the circumferential position where the radial width of each of the paired magnetic path portions 27 is minimized. It is hence understood that the circumferential positions of the radial width minimum points of the paired magnetic path portions 27 decide the distribution of the magnetic flux density produced by the permanent magnet 22 in the gap 30.

Figure 7:
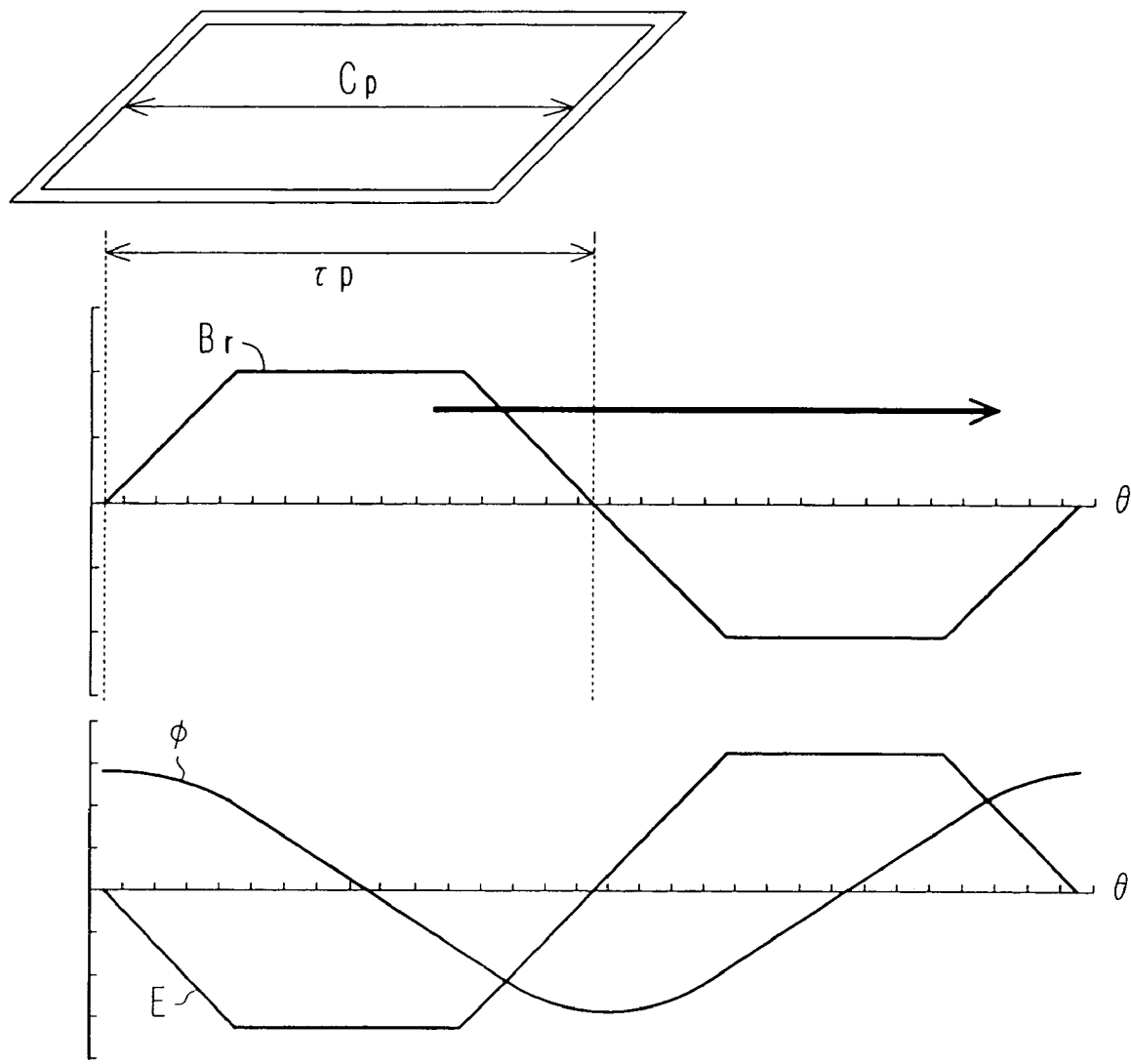
FIG. 7 is a chart showing the waveform of induced voltage.

FIG. 7 shows the waveform of voltage induced in the stator windings 12. In FIG. 7, it is assumed that the distribution of the magnetic flux density produced by the permanent magnet 22 in the gap 30 is trapezoidal and a circumferential width (pitch) τp of the permanent magnet 22 is the same as a circumferential width Cp of the stator windings 12 corresponding to one rotor pole. The magnetic fluxes coming into interlinkage with the stator windings 12 are given as magnetic fluxes Φ resulting from integrating the radial component Br of magnetic flux density B produced by the permanent magnet 22 over a half rotation. Then, in the distribution of the radial component Br of the differentiation of the magnetic fluxes Φ provides an induced voltage E. In other words, the induced voltage is given by spatially integrating the magnetic flux density produced by the permanent magnet 22 in the gap 30 and differentiating the integrated magnetic fluxes Φ with respect to time. Under the above assumptions, it is therefore understood that the spatial distribution of the magnetic flux density produced by the permanent magnet 22 in the gap 30 and the induced voltage have the same waveform in change with time. Thus, the waveform of the induced voltage is expressed as the projected form of the distribution of the magnetic flux density produced by the permanent magnet 22 in the gap 30.

As seen from the above description, the waveform of the induced voltage can be adjusted by changing the spatial distribution of the magnetic flux density produced by the permanent magnet 22 in the gap 30. In this embodiment, therefore, the waveform of the induced voltage is adjusted by adjusting the circumferential positions of the radial width minimum points of the paired magnetic path portions 27. In the related art mentioned above, the waveform of the induced voltage is decided depending on the circumferential width of the permanent magnet looking from the stator side, unlike this embodiment. Accordingly, the related art cannot be directly applied to the motor in which the rotor 20 has the paired nonmagnetic portions 24.

Further, in this embodiment, the circumferential width w of the permanent magnet 22 is independent of the circumferential positions of the radial width minimum points of the paired magnetic path portions 27. In this embodiment, therefore, flexibility in design is increased and the magnitude of a basic wave component of the induced voltage can be adjusted by adjusting the circumferential width w of the permanent magnet 22. This is a very important feature in the permanent magnet type rotating electrical machine used for vehicle driving.

A co-rotation loss in the hybrid electric vehicle will be described below. The co-rotation loss occurs primarily as an iron loss generated in a core by magnetic fluxes of a magnet, which come into interlinkage with a stator. The co-rotation loss is caused even when the motor is used for neither driving nor power generation, thus deteriorating fuel economy of the vehicle. For that reason, the vehicular motor is required to have a smaller co-rotation loss.

It is well known that the iron loss is proportional to 1.6-2 power of the magnetic flux density. Also, average magnetic flux density in a stator is proportional to the circumferential length of the magnet. Therefore, the iron loss is proportional to 1.6-2 power of the circumferential length of the magnet. Accordingly, when the waveform of the induced voltage is adjusted with the magnet width decided as in the related art, the magnet width has to be reduced in order to suppress the co-rotation loss. This is the problem that has been encountered with the related art.

Torque of an embedded magnet type motor is given as a total of magnet torque and reluctance torque. The magnet torque is proportional to the magnet width as described above, while the reluctance torque is generated depending on the difference between a vertical-axis (d-axis) inductance Ld and a horizontal-axis (q-axis) inductance Lq. The embedded magnet type motor generally has a relationship of Lq>Ld. The reason is that the magnet has substantially the same permeability as air, and therefore the magnetic resistance for the d-axis inductance Ld corresponding to the direction passing the magnet is relatively large. On the other hand, the q-axis inductance Lq represents magnetic fluxes flowing through an auxiliary salient pole between two magnets. Therefore, when the magnet is small, the d-axis inductance cannot be reduced because the magnetic resistance in the d-axis direction cannot be reduced. This may reduce the reluctance torque.

In contrast, in this embodiment of the present invention, since the minimum magnetic path portion formed by the nonmagnetic portion at each of the magnet opposite ends can have a large opening angle and the d-axis inductance can be kept small, it is possible to hold large reluctance torque that is generated depending on the difference between the d-axis and q-axis inductances. The rotor disclosed in Japanese Patent No. 3598887 includes small gaps at magnet opposite ends. However, those small gaps are intended to propose an auxiliary structure for relieving stresses at the magnet opposite ends, and that related art essentially differs from the present invention in which gaps are formed in size enough to effectively utilize the reluctance torque. More specifically, in the present invention, each gap includes a portion linearly extended from the magnet end and a rounded corner at a distal end of the linearly extended portion, and the rounded corner has the predetermined radius of curvature.

The motor generator MG1 must be optimally designed for each vehicle to achieve cooperation with the engine ENG. From this point of view, the rotor structure of this embodiment is important. For example, because commercial vehicles and passenger vehicles differ in rotation speed range from each other, not only the value of the induced voltage, but also a driving force sharing rate between the motor generator MG1 and the engine ENG are changed between those types of vehicles. Accordingly, the motor generator MG1 requires to be designed in a way differing a little by a little for each engine. In the above-described related art, because the circumferential positions of the radial width minimum points of the paired magnetic path portions match with the circumferential width of the permanent magnet on the side closer to the stator, a proportion of the effective magnetic fluxes is also uniquely decided, and flexibility in design is small. On the other hand, in this embodiment, since the circumferential width w of the permanent magnet 22 is independent of the circumferential positions of the radial width minimum points of the paired magnetic path portions 27, a proportion of the effective magnetic fluxes (i.e., the magnitude of the basic wave component of the induced voltage) can be decided based on the circumferential width w of the permanent magnet 22, and the peak value of the induced voltage can be decided based on the circumferential positions of the radial width minimum points of the paired magnetic path portions 27. Thus, flexibility in design is large.

In a hybrid electrical vehicle, because electric power available in the vehicle is limited, it is important to obtain a higher output with a system being as small and light as possible. FIG.

Figure 8:
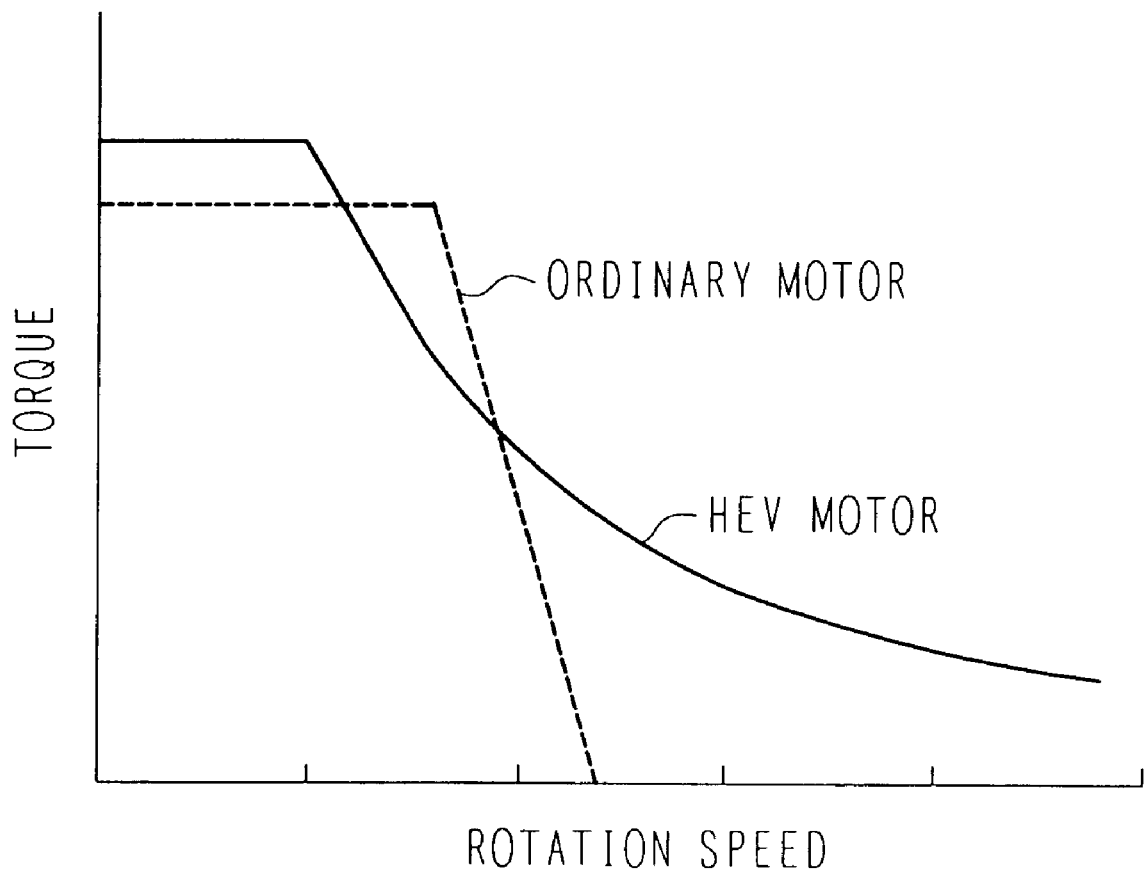
FIG. 8 is a graph for torque comparison.

8 shows a speed-torque characteristic required for a motor for driving a hybrid electrical vehicle (HEV motor). As seen from FIG. 8, the HEV motor is required to have larger torque at low speeds and to maintain a higher output until reaching high speeds as compared with an ordinary servomotor.

The stator windings 12 of the motor generator MG1 are connected in the form of Y-connection including a neutral point and are electrically connected to the power semiconductor devices of the power module PMU1 in the inverter INV. In design of the motor generator MG1, therefore, taking the withstand voltages of various semiconductor devices and capacitors SEC into consideration, the voltage induced due to co-rotation with wheels during coasting of the vehicle or in the event of an abnormality is required to be kept from exceeding those withstand voltages. Particularly, the withstand voltage of each of the power semiconductor devices is decided depending on the peak voltage of the induced voltage and is never exceeded even in case of an abnormality. Also, the power semiconductor device has a current capacity, and the power semiconductor device with a smaller rated current has smaller outer dimensions. Because reduction of weight is important in the hybrid electrical vehicle, the power semiconductor device having a smaller rated current is preferably used and the current capacity is limited correspondingly.

Figure 9:
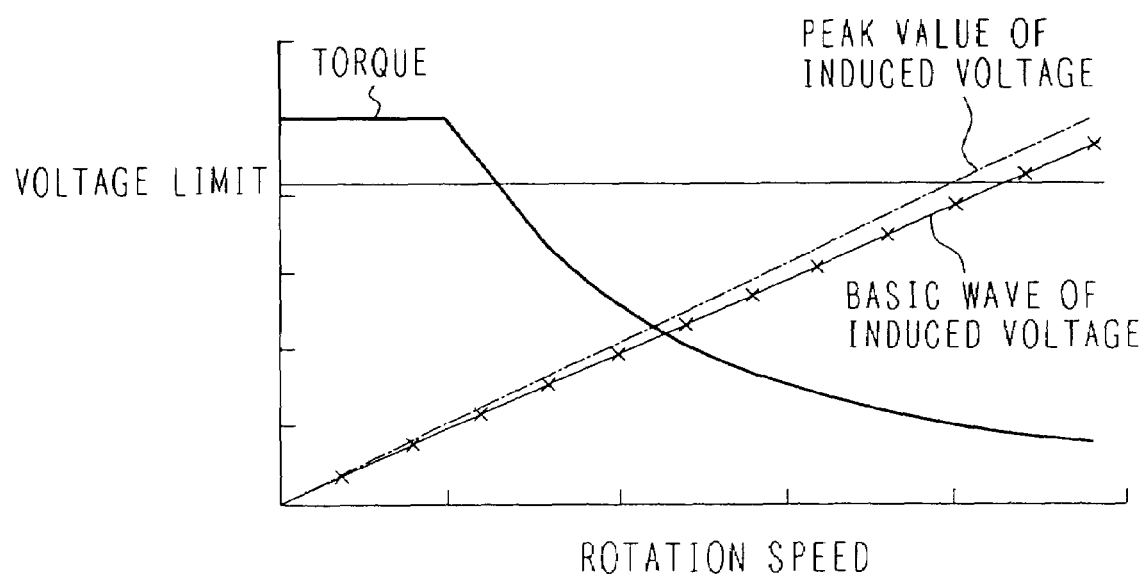
FIG. 9 is a graph for comparatively showing a peak value of the induced voltage and a basic wave of the induced voltage.

On the other hand, in order to obtain a higher output in the motor generator MG1 using the permanent magnets, it is required to maximally effectively utilize the magnetic fluxes of the permanent magnets. However, an increase in the magnetic fluxes of the permanent magnets increases the induced voltage, and the induced voltage has to be limited. The waveform of the induced voltage does not depend on the rotation speed of the motor generator MG1, and the amplitude of the induced voltage is proportional to the rotation speed of the motor generator MG1. The withstand voltage of the power semiconductor device is decided depending on the peak value of the induced voltage. In actual design, therefore, the peak value of the induced voltage is required to be limited to a proper value at maximum speed rotation of the motor generator MG1. As seen from FIG. 9, the basic wave of the induced voltage and the peak value of the induced voltage are increased in proportion to the rotation speed of the rotating electrical machine while maintaining respective constant ratios.

The output of the motor generator MG1 is proportional to basic wave components of voltage and current inputted from the inverter INV. Higher harmonic components appear as pulsations, but they are irrelevant to an average output. Also, in the motor generator MG1 using the permanent magnets, torque is proportional to current. Accordingly, if a ratio of the peak value of the induced voltage to the basic wave of the induced voltage is large, the voltage of the basic wave of the induced voltage must be designed to a lower value. While the motor generator MG1 used in the hybrid electrical vehicle is required to output larger torque at low speeds, the following problem may occur. If the voltage of the basic wave of the induced voltage in the motor generator MG1 is designed to a lower value in consideration of a limit of the induced voltage at high speeds, the voltage supplied from the inverter INV at low speeds is reduced and the current supplied from the inverter INV is increased. This means that a small-sized and lightweight power semiconductor device cannot be used. To avoid that problem, in this embodiment, the voltage of the basic wave of the induced voltage is set to a level as high as possible, and the peak value of the induced voltage is suppressed to a lower level.

In this embodiment, optimum dimensions capable of setting the voltage of the basic wave of the induced voltage to a level as high as possible and suppressing the peak value of the induced voltage to a lower level were confirmed with experiments. The experiment results are shown in FIGS. 10-15. In the motor generator MG1, the number of magnetic poles of the rotor 20 is 8, the number of the teeth cores 11b (slots 13) of the stator 20 is 48, and the angle per rotor pole is 45° in terms of mechanical angle. Under those conditions, the waveform of the induced voltage was computed while the opening angle θ covering the circumferential positions of the radial width minimum points of the paired magnetic path portions 27 (i.e., the opening angle (mechanical angle) of those circumferential positions with respect to the axis of the rotor 20) was changed.

Figure 10B:
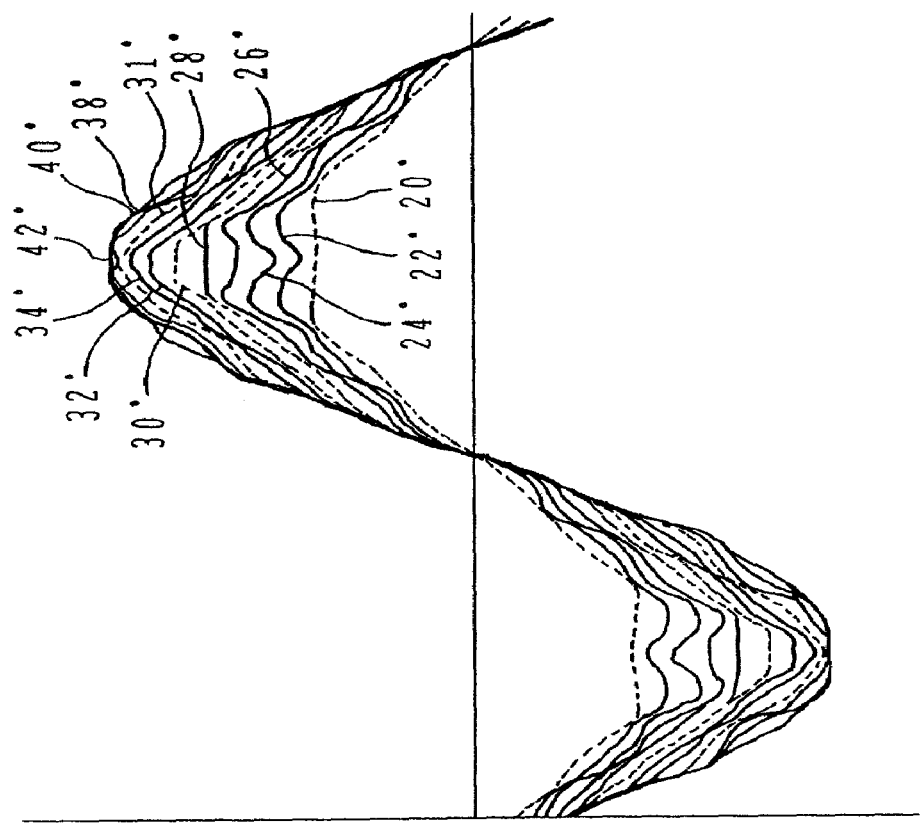
FIG. 10 is a characteristic graph of the motor generator according to one embodiment of the present invention.
Figure 10A:
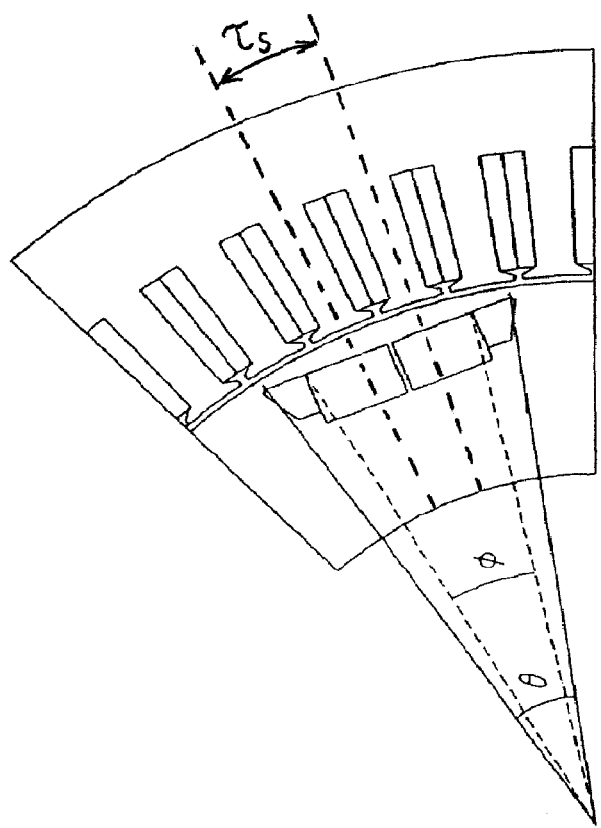
Figure 11:
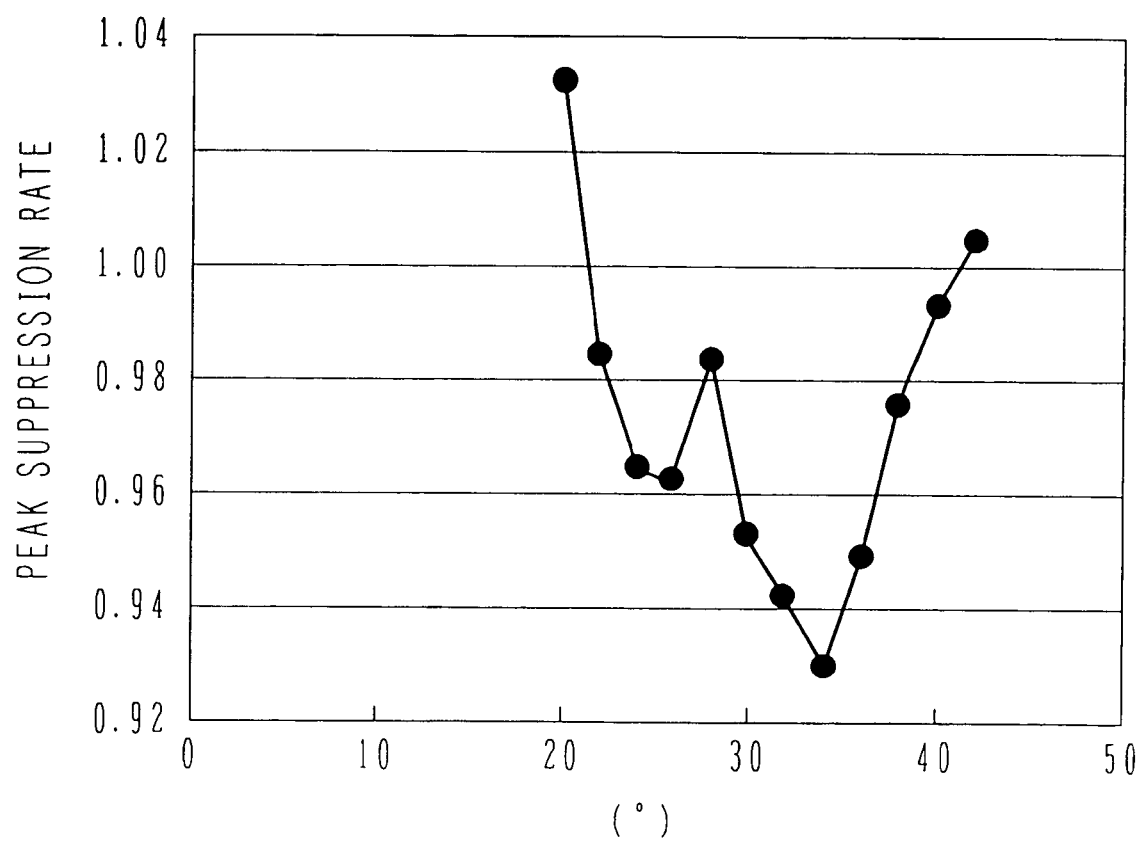
FIG. 11 is a characteristic graph of the motor generator according to one embodiment of the present invention.

FIGS. 10 and 11 show the case where an angle φ contained by the circumferential width of the permanent magnet 22 on the side closer to the stator 20 with respect to the axis of the rotor 20 was set to 0.7 time the opening angle θ covering (the circumferential positions of) the radial width minimum points of the paired magnetic path portions 27. As seen from FIG. 10, when the opening angle θ covering the radial width minimum points of the paired magnetic path portions 27 is in the range of 32°-34°, the peak value of the induced voltage is increased. On the other hand, when the opening angle θ covering the radial width minimum points of the paired magnetic path portions 27 is 28° and 42°, the peak value of the induced voltage is suppressed relatively low. In those conditions, the angle φ contained by the circumferential width of the permanent magnet 22 on the side closer to the stator 20 is 19.6° and 29.4°, respectively.

FIG. 11 shows a ratio (peak suppression rate) of the basic wave of the induced voltage to the peak value of the induced voltage shown in FIG. 10. A higher peak suppression rate increases a proportion at which the basic wave of the induced voltage is contained, and hence contributes to increasing the voltage of the basic wave of the induced voltage. As seen from FIG. 11, when the opening angle θ covering the radial width minimum points of the paired magnetic path portions 27 is 28° and 42°, the proportion of the basic wave of the induced voltage is increased.

Figure 12B:
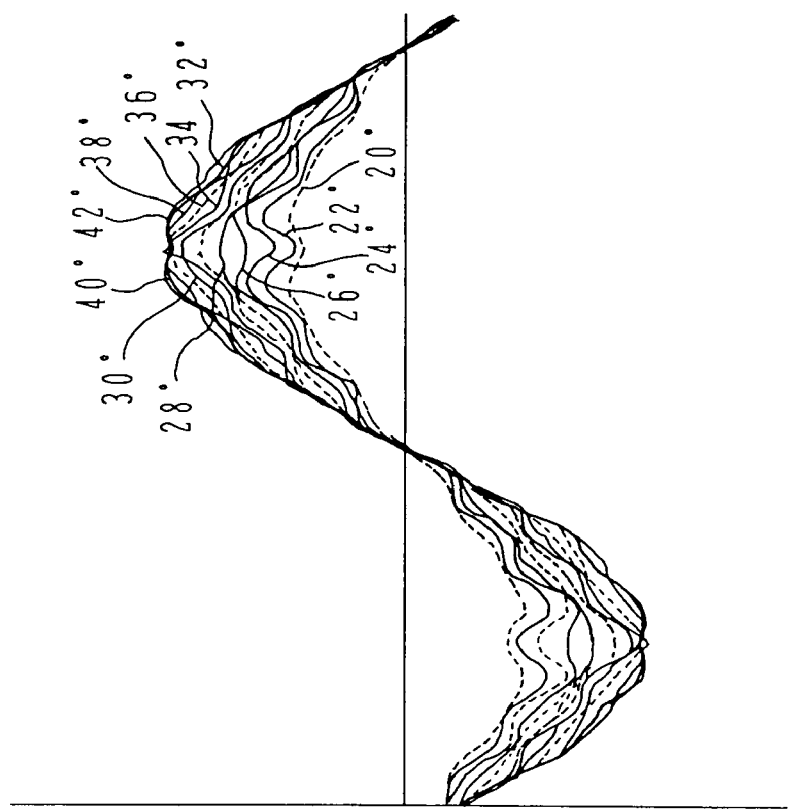
FIG. 12 is a characteristic graph of the motor generator according to one embodiment of the present invention.
Figure 12A:
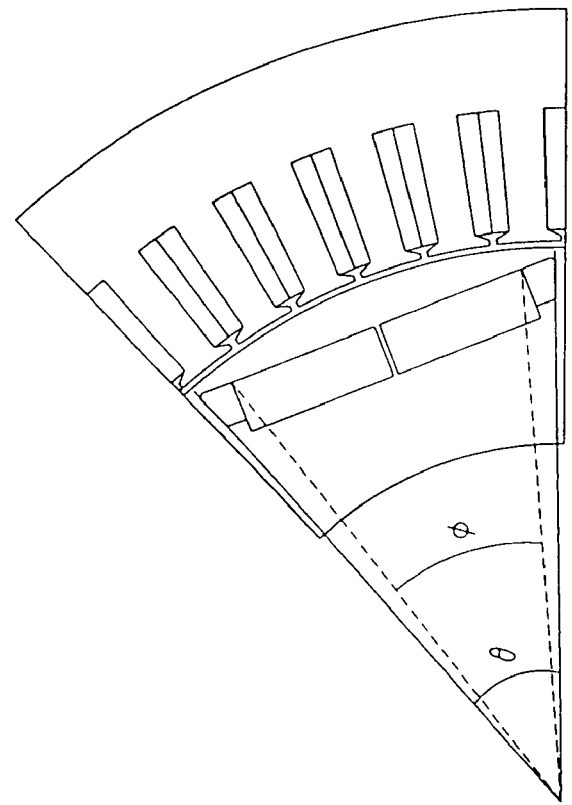
Figure 13:
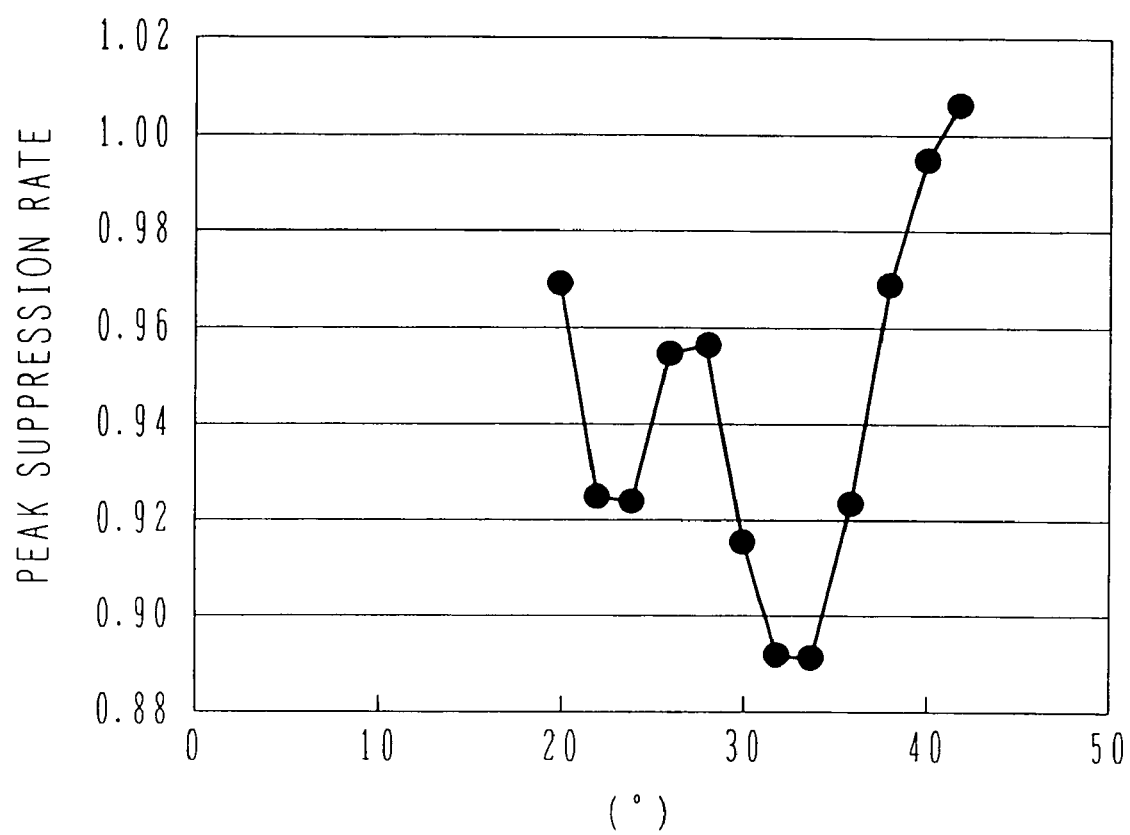
FIG. 13 is a characteristic graph of the motor generator according to one embodiment of the present invention.

FIGS. 12 and 13 show the case where the angle φ contained by the circumferential width of the permanent magnet 22 on the side closer to the stator 20 with respect to the axis of the rotor 20 was set to 0.8 time the opening angle θ covering the radial width minimum points of the paired magnetic path portions 27. In this case, when the opening angle θ covering the radial width minimum points of the paired magnetic path portions 27 is in the ranges of 26°-28° and 38°-42°, the peak value of the induced voltage is suppressed relatively low and the peak suppression rate is increased. In those conditions, the angle φ contained by the circumferential width of the permanent magnet 22 on the side closer to the stator 20 is in the ranges of 20.8°-22.4° and 30.4°-33.6°, respectively.

Figure 14B:
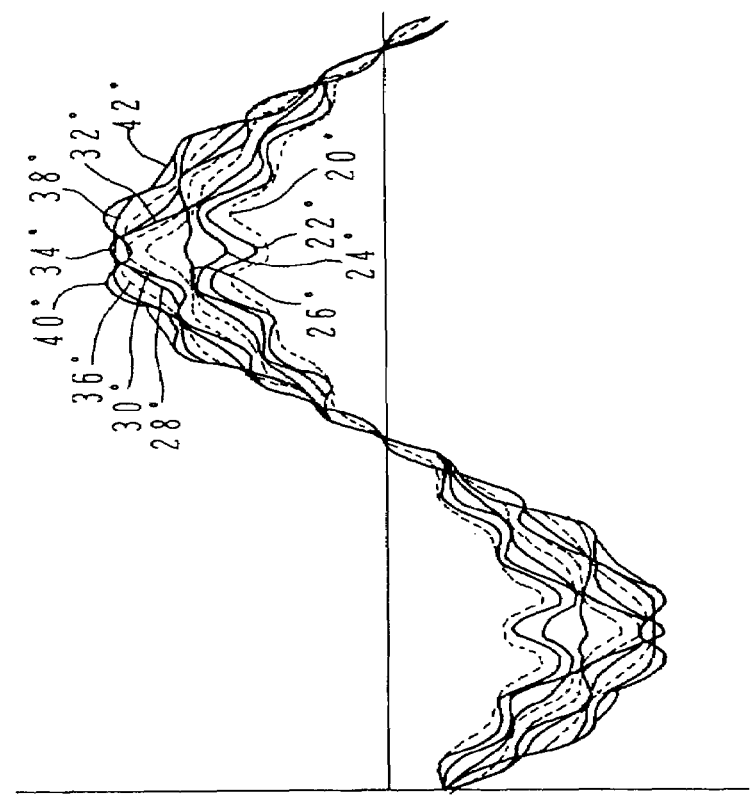
FIG. 14 is a characteristic graph of the motor generator according to one embodiment of the present invention.
Figure 14A:
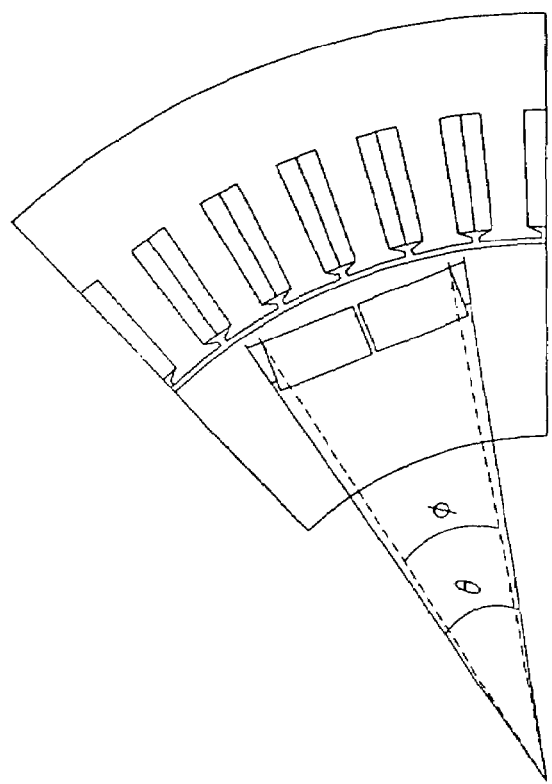
Figure 15:
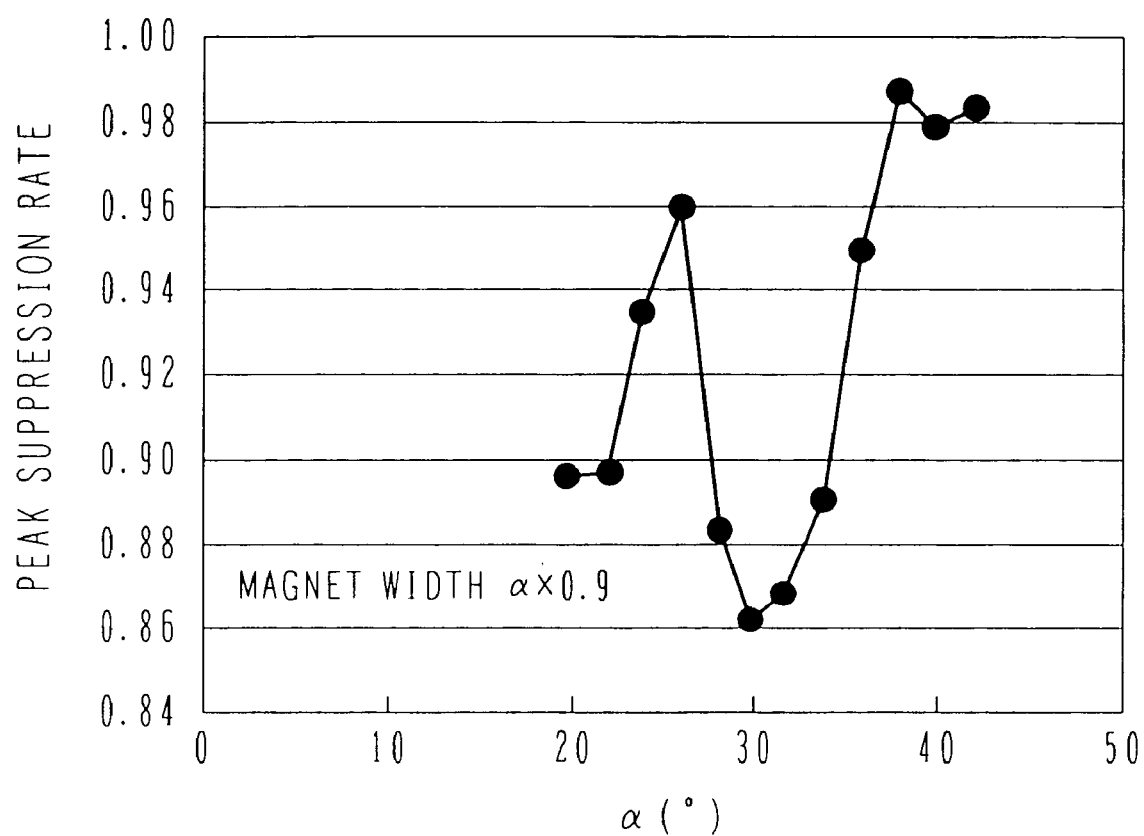
FIG. 15 is a characteristic graph of the motor generator according to one embodiment of the present invention.

FIGS. 14 and 15 show the case where the angle φ contained by the circumferential width of the permanent magnet 22 on the side closer to the stator 20 with respect to the axis of the rotor 20 was set to 0.9 time the opening angle θ covering the radial width minimum points of the paired magnetic path portions 27. In this case, when the opening angle θ covering the radial width minimum points of the paired magnetic path portions 27 is 26° and in the range of 38°-42°, the peak value of the induced voltage is suppressed relatively low and the peak suppression rate is increased. In those conditions, the angle φ contained by the circumferential width of the permanent magnet 22 on the side closer to the stator 20 is 23.4° and is in the range of 34.2°-37.8°, respectively.

If the angle φ contained by the circumferential width of the permanent magnet 22 on the side closer to the stator 20 with respect to the axis of the rotor 20 is smaller than 0.7 time the opening angle θ covering the radial width minimum points of the paired magnetic path portions 27, the effective magnetic fluxes of the permanent magnet 22 are too reduced. On the other hand, if it is larger than 0.9 time, the effect resulting from providing the pair of nonmagnetic portions 24 is too reduced. To obtain the motor generator MG1 meeting satisfactory characteristics to drive the hybrid electric vehicle, therefore, the angle φ contained by the circumferential width of the permanent magnet 22 on the side closer to the stator 20 with respect to the axis of the rotor 20 is preferably set to the range of 0.7-0.9 time the opening angle θ covering the radial width minimum points of the paired magnetic path portions 27. Optimally, the angle φ is set to 0.85 time the opening angle θ covering the radial width minimum points of the paired magnetic path portions 27.

Thus, in order to obtain the motor generator MG1 meeting satisfactory characteristics to drive the hybrid electric vehicle, therefore, the opening angle θ covering the radial width minimum points of the paired magnetic path portions 27 is preferably set to the range of 26°-28° or 38°-42°, and the angle φ contained by the circumferential width of the permanent magnet 22 on the side closer to the stator 20 with respect to the axis of the rotor 20 is preferably set to the range of 19.6°-23.4° or 29.4°-37.8°.

The angles mentioned above are all indicated in terms of mechanical angle. Because the number of magnetic poles of the rotor 20 is 8, the angles can be indicated in terms of electrical angle by multiplying respective values of those angles by 4. Therefore, the preferable opening angle θ covering the radial width minimum points of the paired magnetic path portions 27 is in the range of 104°-112° or 152°-168° in terms of electrical angle, and the preferable angle φ contained by the circumferential width of the permanent magnet 22 on the side closer to the stator 20 with respect to the axis of the rotor 20 is in the range of 72.8°-100.8° or 106.4°-151.2° in terms of electrical angle.

Further, the opening angle θ covering the radial width minimum points of the paired magnetic path portions 27 can be expressed in general formula as follows:

$$\theta \approx (n+0.5) \times \tau s \text{ (n: natural number)}$$

In the formula, τs represents the circumferential pitch between axes of the adjacent teeth cores 11a and is expressed by a contained angle with respect to the axis of the rotor 20.

While the above description has been made of the motor generator MG1 having 8 poles and 48 slots, the above-mentioned preferable angles are always similarly applied to other rotating electrical machines in which a ratio of the number m of magnetic poles of the rotor 20 to the number of the teeth cores 11a is m:6m (m: natural number).

Figure 16:
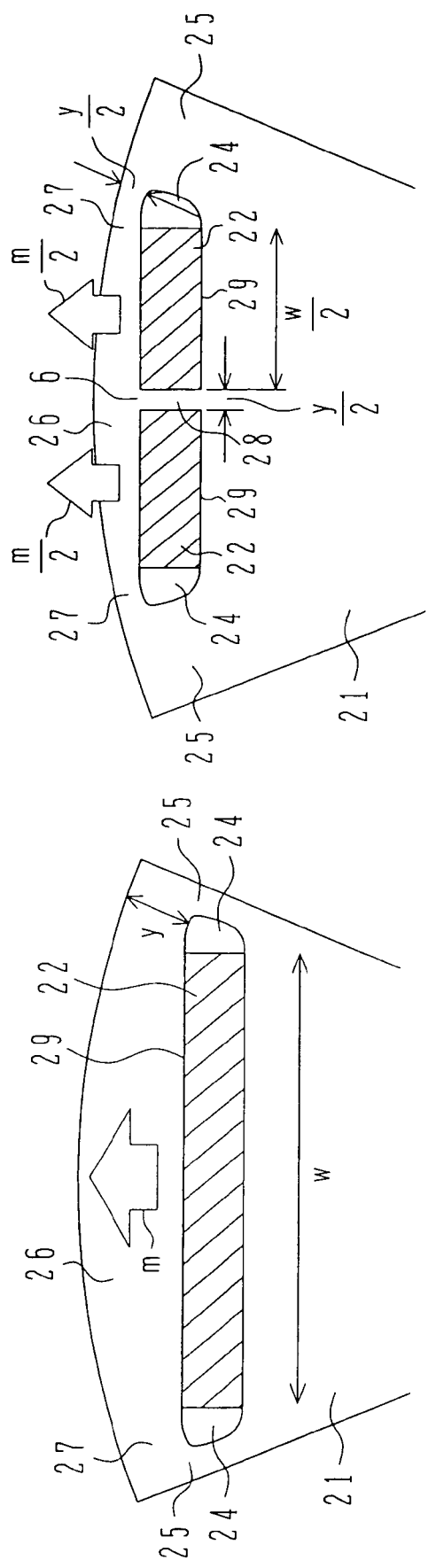
FIG. 16 is an explanatory view for explaining the stress relaxation structure based on centrifugal forces.

Because the motor generator MG1 for driving the hybrid electric vehicle is rotated at high speeds of about 10000 rpm at maximum, sufficient strength is required against centrifugal forces acting on the rotor. In the known permanent magnet type rotating electrical machine in which the permanent magnet is not divided, as shown in the left side of FIG. 16, the centrifugal forces act on the permanent magnet in the direction indicated by an arrow, and stresses are concentrated in the magnetic path portions 27 where the radial width is minimum. From the magnetic point of view, it is desired that the radial width y of the magnetic path portion 27 be reduced to lessen the amount of leakage fluxes of the permanent magnet. However, because of the above-described restriction from the mechanical point of view, the magnetic path portion 27 cannot be so narrowed. In the known rotor structure, therefore, the amount of leakage fluxes of the permanent magnet in the magnetic path portion 27 is large and the torque of the rotating electrical machine is reduced correspondingly.

In contrast, in this embodiment, the permanent magnet 22 is circumferentially divided into two parts per magnetic pole of the rotor 20, and the bridge portion 28 is disposed between the divided permanent magnets so as to relax stress concentration in the magnetic path portions 27. Assuming here that the centrifugal force acting on the magnetic path portion 27 is F, the weight of the permanent magnet 22 is m, and the rotation speed of the rotor 20 is N, the following relationship holds:

$$F \propto \tfrac{1}{2} mN^2$$

Also, assuming the radial width of the magnetic path portion 27 to be y, the stress S acting on the magnetic path portion 27 is expressed by:

$$S \propto 1/y$$

When the permanent magnet 22 is divided into two parts in the circumferential direction, the weight of the divided permanent magnet 22 is reduced to half and so is the centrifugal force F. Accordingly, by holding the stress S caused by the centrifugal force to remain the same, the radial width y of the magnetic path portion 27 can be reduced to half.

Further, assuming that the saturated magnetic flux density in the rotor core 21 is 2T and the residual magnetic flux density of the permanent magnet 22 is 1T, the magnetic fluxes corresponding to the circumferential width of the permanent magnet 22, which is twice the radial width y of the magnetic path portion 27, is leaked to the inside of the rotor core 21 through the magnetic path portion 27. This leakage of the magnetic fluxes occurs at the opposite ends of the permanent magnet 22 in the circumferential direction. In consideration of the above-described formula representing the effective magnetic fluxes φ of the permanent magnet 22, effective magnetic fluxes φ1 in the known permanent magnet type rotating electrical machine are given by:

$$\phi 1 \propto w - 2 \times (2 \times y) = w - 4 \times y$$

On the other hand, in the motor generator MG1 of this embodiment, the magnetic fluxes of the permanent magnet leak through the bridge portion 28 as well. Assuming the circumferential width of the bridge portion 28 to be y/2, therefore, effective magnetic fluxes φ2 in the motor generator MG1 of this embodiment are given by:

$$\phi 2 \propto w - 3 \times (2 \times y/2) = w - 3 \times y$$

As a result, it can be said that the leakage fluxes of the permanent magnet 22 are further reduced in the motor generator MG1 of this embodiment. Thus, this embodiment is able to obtain a higher output than the known permanent magnet type rotating electrical machine while relaxing concentration of stresses generated by centrifugal forces.

The circumferential width of the bridge portion 28 is assumed to be y/2 in this embodiment, but it can be set to a smaller value in practice. The stress acting on the magnetic path portion 27 is bending stress, whereas the stress acting on the bridge portion 28 is tensile stress. Metallic materials have such characteristics that the tensile strength is larger than the bending strength. Accordingly, the actual circumferential width of the bridge portion 28 can be set smaller than the radial width y/2 of the magnetic path portion 27.

Further, because the bridge portion 28 has a longer magnetic path in which the magnetic flux density is saturated, the magnetic resistance of the bridge portion 28 can be made larger than that of the magnetic path portion 27 even at the same magnetic path width. Therefore, the actual leakage fluxes are further reduced. If the circumferential length of the magnetic path portion 27 is increased in order to enlarge the magnetic resistance of the magnetic path portion 27, this results in that the area of the nonmagnetic portion 27 is increased equivalently in the circumferential direction of the rotor, and a portion ineffective to torque is increased correspondingly. Also, the necessary circumferential width of the permanent magnet 22 cannot be secured from the viewpoint of strength. For that reason, increasing the radial length of the bridge portion 28 is effective as a manner for increasing the magnetic resistance while ensuring the rotor strength.

Additionally, the provision of the bridge portion 28 presents another overall effect. In systems using permanent magnet type rotating electrical machines, a rotor outer diameter and a stator outer diameter of the permanent magnet type rotating electrical machine have optimum values per system. However, if there is a limitation in the rotor strength, the rotor diameter has to be reduced to weaken the centrifugal forces. This lowers the overall characteristics of the permanent magnet type rotating electrical machine. In contrast, in this embodiment, the overall characteristics of the motor generator MG1 can be improved with the effect resulting from the provision of the bridge portion 28.

Figure 17:
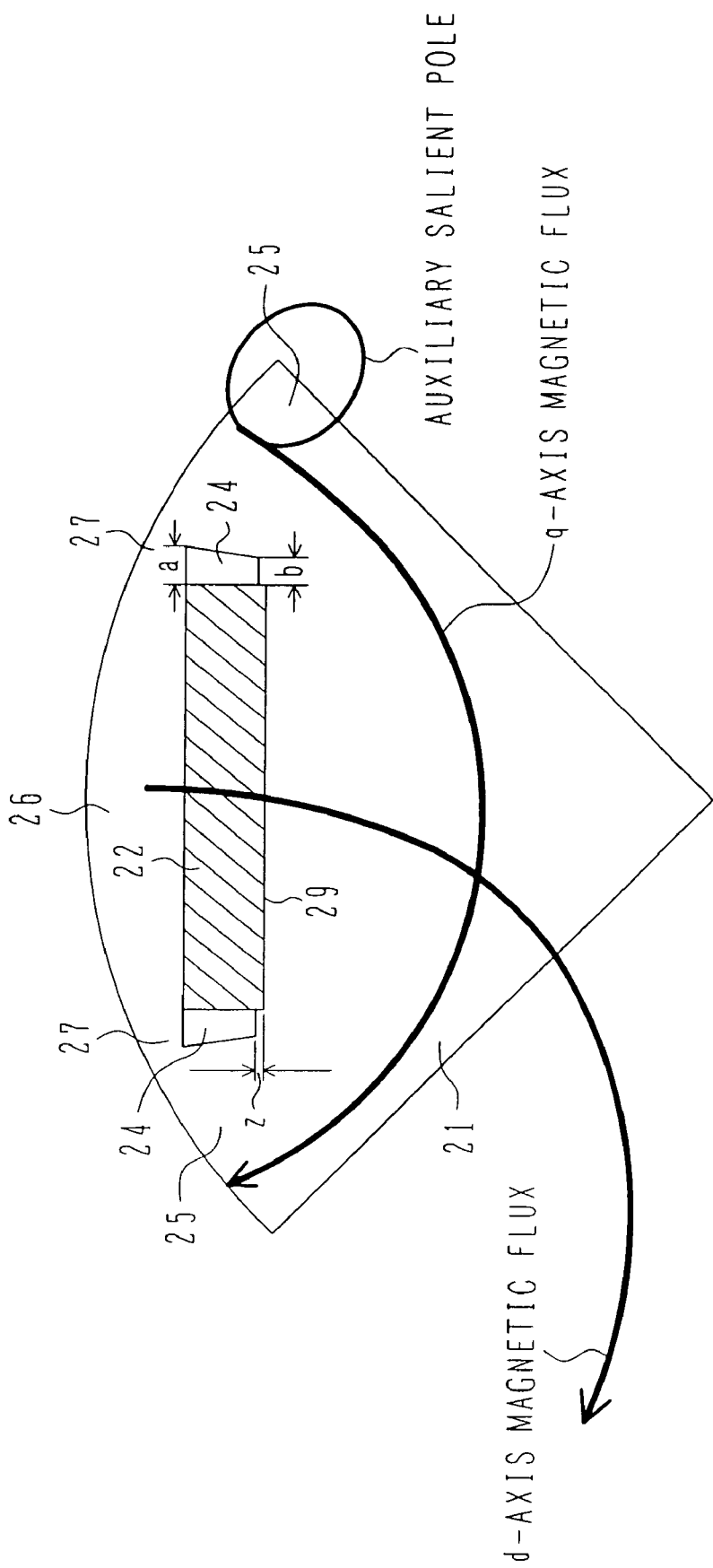
FIG. 17 is an explanatory view for explaining the effect resulting from the shape of a nonmagnetic portion.

In this embodiment, as described above, the nonmagnetic portion 24 has a trapezoidal shape. Assuming, as shown in FIG. 17, that the length of the side of the nonmagnetic portion 24 on the side closer to the stator 10 is a and the length of the side of the nonmagnetic portion 24 on the side closer to the axis of the rotor 20 is b, the following relationship holds in this embodiment;

$$b/a \leqq 1$$

Consequently, the reluctance torque can be increased in this embodiment. The reason will be described below with reference to FIGS. 17-20.

The reluctance torque is generated due to the difference in easiness of flow between the d-axis magnetic flux and the q-axis magnetic flux. In the permanent magnet type rotating electrical machine including permanent magnets embedded in the rotor core, since the permanent magnet having substantially the same specific permeability as air is present in the d-axis direction, the d-axis magnetic flux is relatively hard to flow. On the other hand, since the auxiliary pole portions 25 as parts of the core are present in the q-axis direction, the q-axis magnetic flux is relatively easy to flow.

FIG. 18 shows flows of magnetic fluxes in the case where the opening angle θ covering the radial width minimum points of the paired magnetic path portions 27 is set to 38° in terms of mechanical angle. The magnetic fluxes shown in FIG. 18 are produced by currents flowing through the stator windings 12 and represent flows in the state where the reluctance torque is generated. An illustration in the left side of FIG. 18 shows the case where b/a defined as described above with reference to FIG. 17 is 1.0, and an illustration in the right side shows the case where b/a is 0. In the case of b/a=1, since a corner of the nonmagnetic portion 24 on the side closer to the axis of the rotor 20 is positioned near another adjacent magnetic pole in the circumferential direction, the flows of magnetic fluxes are distorted and the magnetic flux density is increased. In the case shown in the left side of FIG. 18, therefore, the q-axis magnetic flux is harder to flow and the reluctance torque is relatively small. On the other hand, in the case of b/a=0, the nonmagnetic portion 24 is formed into a triangular shape, the magnetic fluxes flow smoothly and the q-axis magnetic flux is increased. Consequently, the reluctance torque is increased about 20% in the case of b/a=0 as compared with the case of b/a=1.

FIG. 19 shows flows of magnetic fluxes in the case where the opening angle θ covering the radial width minimum points of the paired magnetic path portions 27 is set to 28° in terms of mechanical angle. An illustration in the left side of FIG. 19 shows the case where b/a defined as described above with reference to FIG. 17 is 0.8, and an illustration in the right side shows the case where b/a is 0. Under this condition, the reluctance torque is maximum in the case of b/a=0.8. On the other hand, in the case of b/a=0, the q-axis magnetic flux is easy to flow, but the d-axis magnetic flux is also easy to flow because the opening angle θ covering the radial width minimum points of the paired magnetic path portions 27 is relatively small. Consequently, the reluctance torque is reduced corresponding to an increase of the d-axis magnetic flux.

Figure 20:
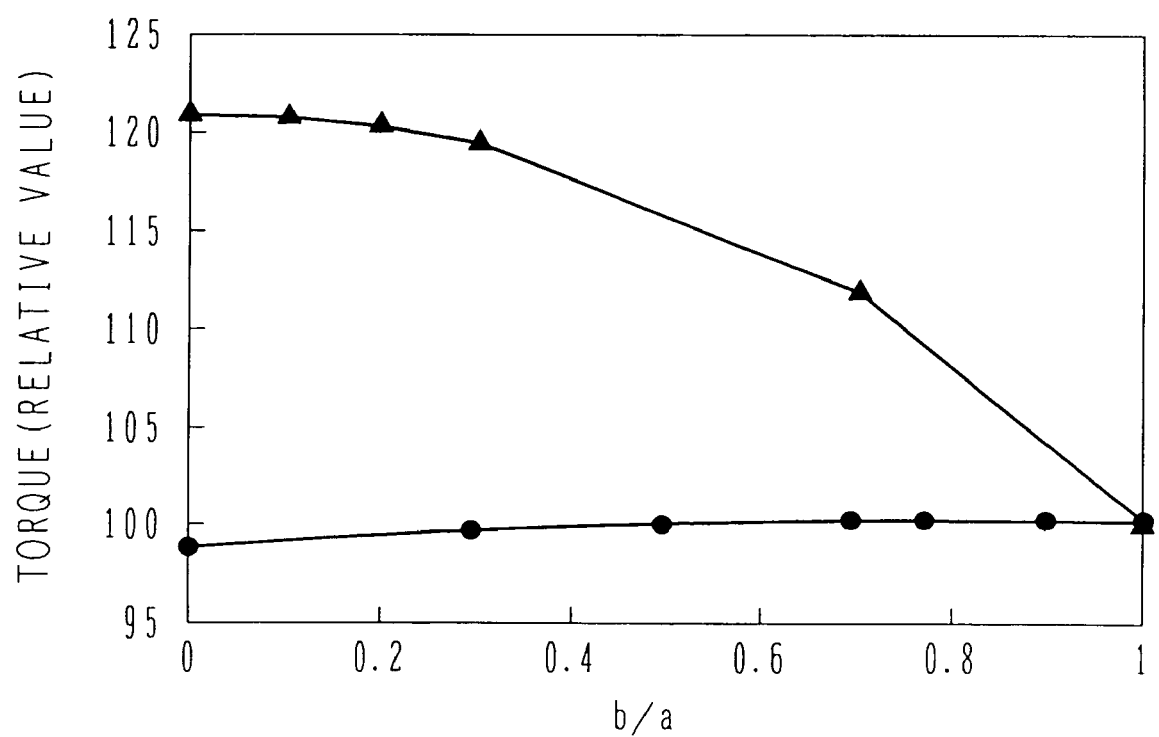
FIG. 20 is a graph for explaining the effect resulting from the shape of the nonmagnetic portion.

The above-described relationships are plotted in FIG. 20. As seen from FIG. 20, the reluctance torque can be increased by setting the opening angle θ covering the radial width minimum points of the paired magnetic path portions 27 to 38° in terms of mechanical angle, and by forming the nonmagnetic portion 24 so as to satisfy b/a≦1. In particular, b/a is preferably set to the range of 0-0.3.

Further, in this embodiment, the nonmagnetic portion 24 has a radial width smaller than that of the permanent magnet insertion hole 29 by a distance z, as shown in FIG. 17. Edges are thereby formed at the opposite ends of the permanent magnet insertion hole 29 in the circumferential direction. Accordingly, when the permanent magnet 22 is inserted in the permanent magnet insertion hole 29, it is possible to easily fix the permanent magnet 22 in the permanent magnet insertion hole 29 by utilizing the edges.

Figure 21:
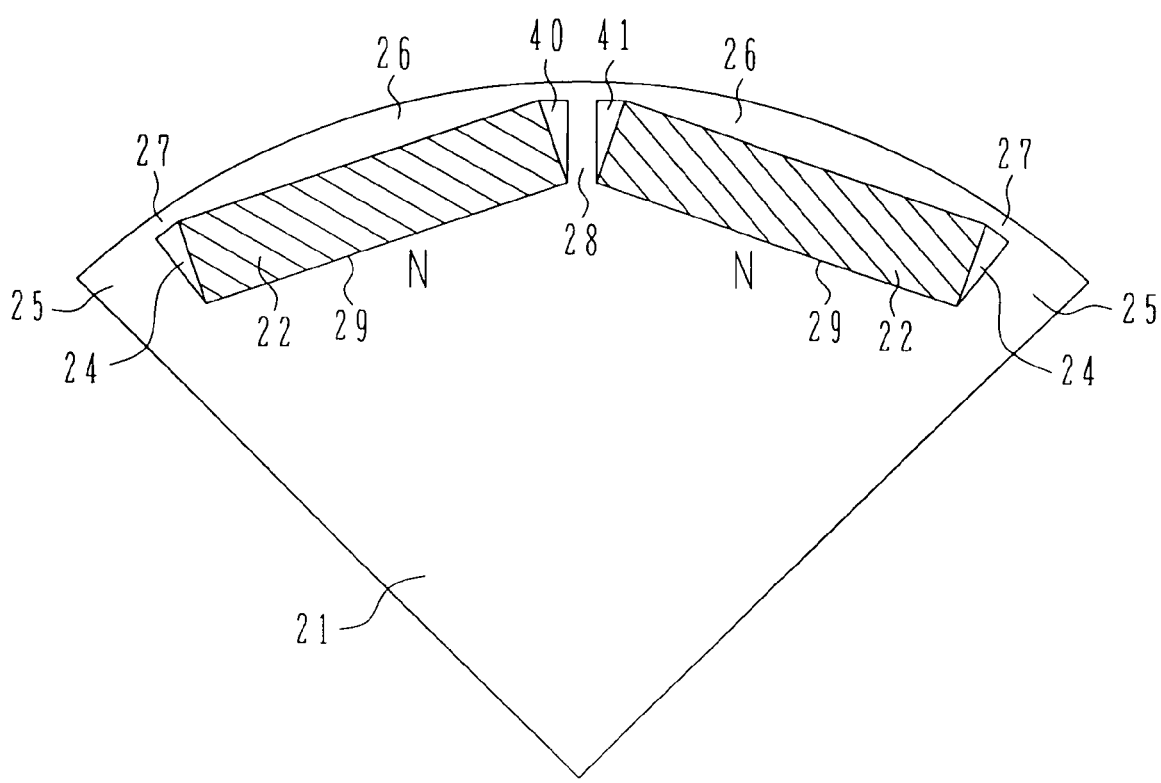
FIG. 21 is a sectional view showing the structure of a motor generator according to a modification of the present invention.
Figure 22:
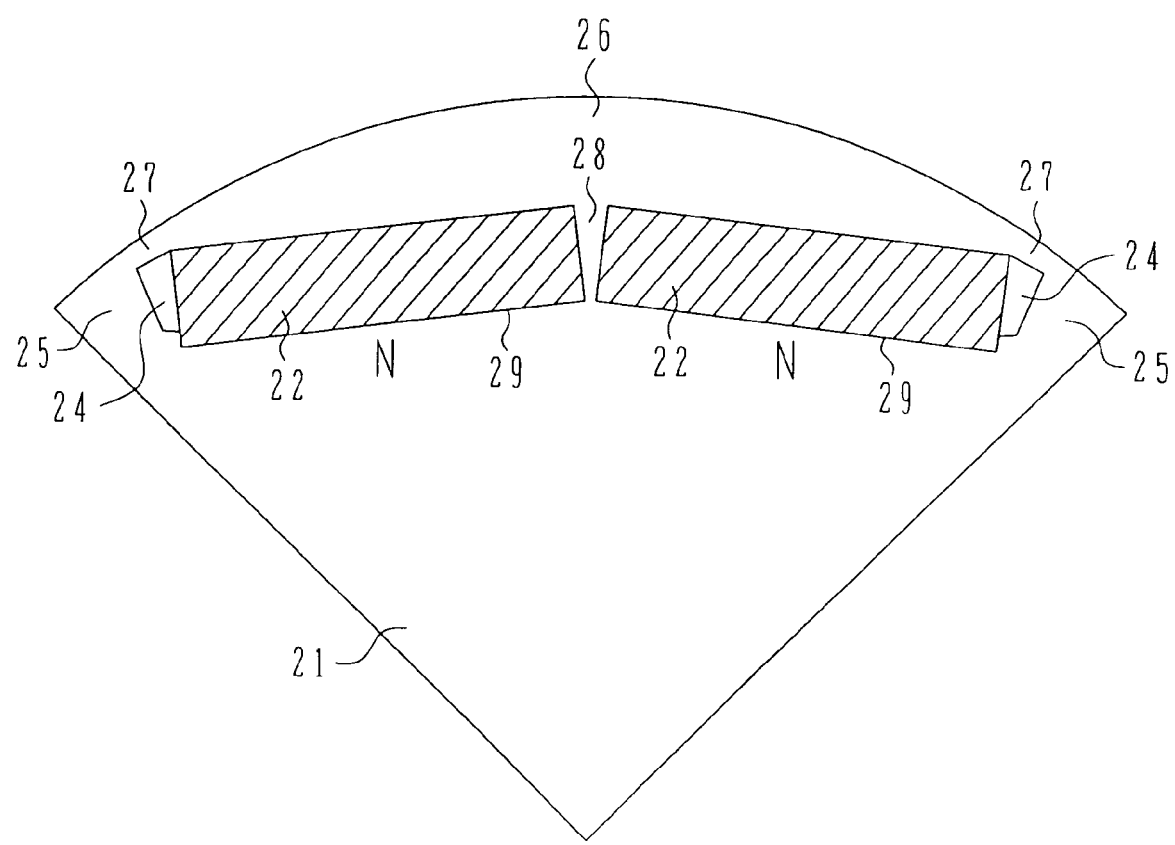
FIG. 22 is a sectional view showing the structure of a motor generator according to another modification of the present invention.
Figure 23:
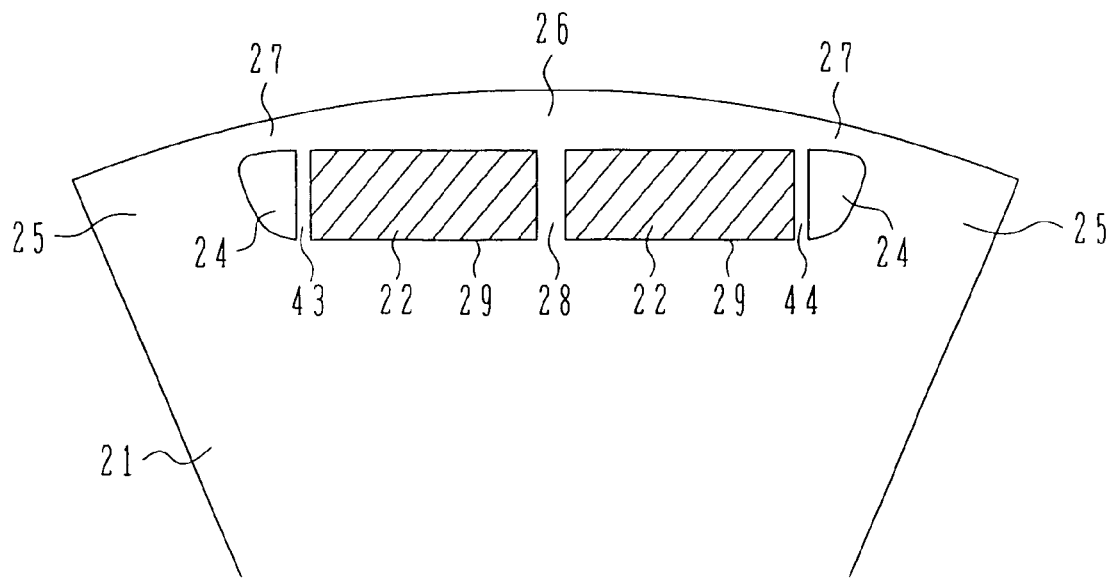
FIG. 23 is a sectional view showing the structure of a motor generator according to still another modification of the present invention.

FIGS. 21 and 22 show modifications. In each of these modifications, the permanent magnet 22 circumferentially divided into two parts is arranged in the rotor core 21 such that the pole center of the permanent magnet 22 is positioned closer to the stator 10 than the opposite pole ends. This arrangement is effective in making the curvature of each magnetic path portion 27 more moderate and further relaxing stress concentration. If the circumferentially 2-split permanent magnet 22 is arranged on a linear line or in the V-form with the pole center offset inward, the centrifugal forces acting on the permanent magnet 22 are concentrated in an area closer to the outer periphery and the stress concentration in the magnetic path portion 27 is increased. In contrast, by arranging the circumferentially 2-split permanent magnet 22 in the inclined form as in this embodiment, the bridge portion 28 is positioned closer to the stator 10 and its radial position approaches that of the magnetic path portion 27. As a result, the centrifugal forces are borne by the magnetic path portion 27 and the bridge portion 28 in a more evenly distributed manner, and the stress concentration can be reduced.

In the modification of FIG. 21, nonmagnetic portions 40, 41 made of magnetic gaps are formed at pole-center side ends of two parts of the circumferentially 2-split permanent magnet 22.

Figure 24:
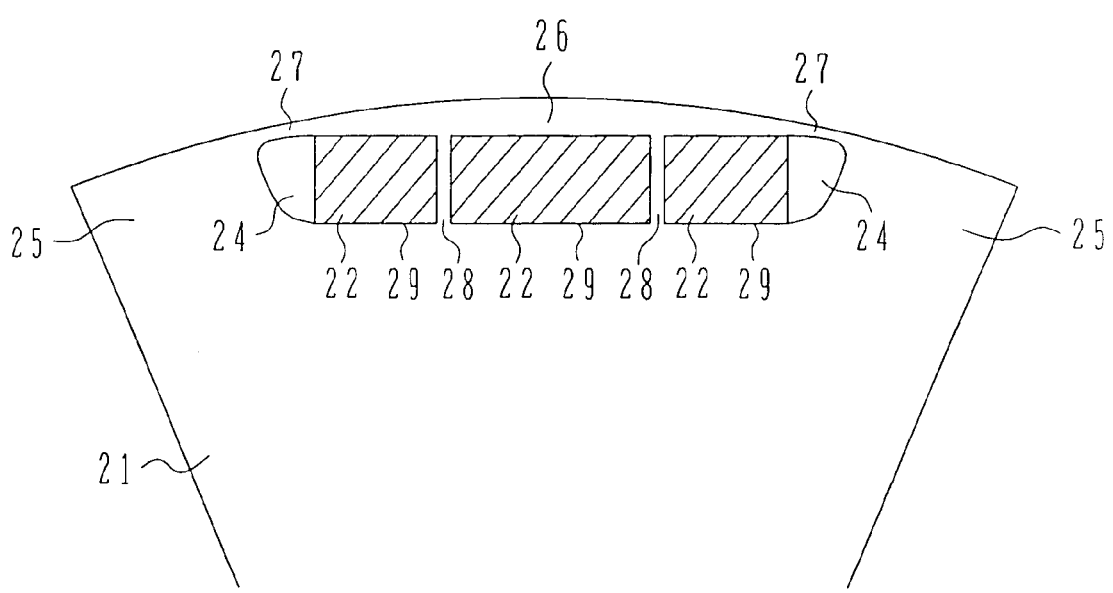
FIG. 24 is a sectional view showing the structure of a motor generator according to still another modification of the present invention.
Figure 25:
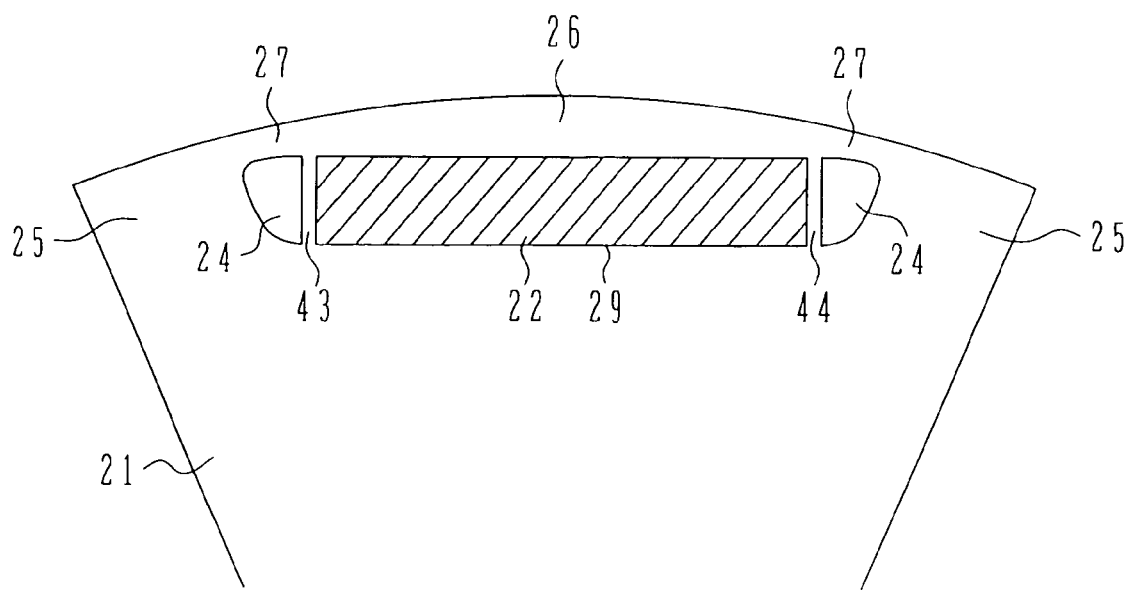
FIG. 25 is a sectional view showing the structure of a motor generator according to still another modification of the present invention.
Figure 26:
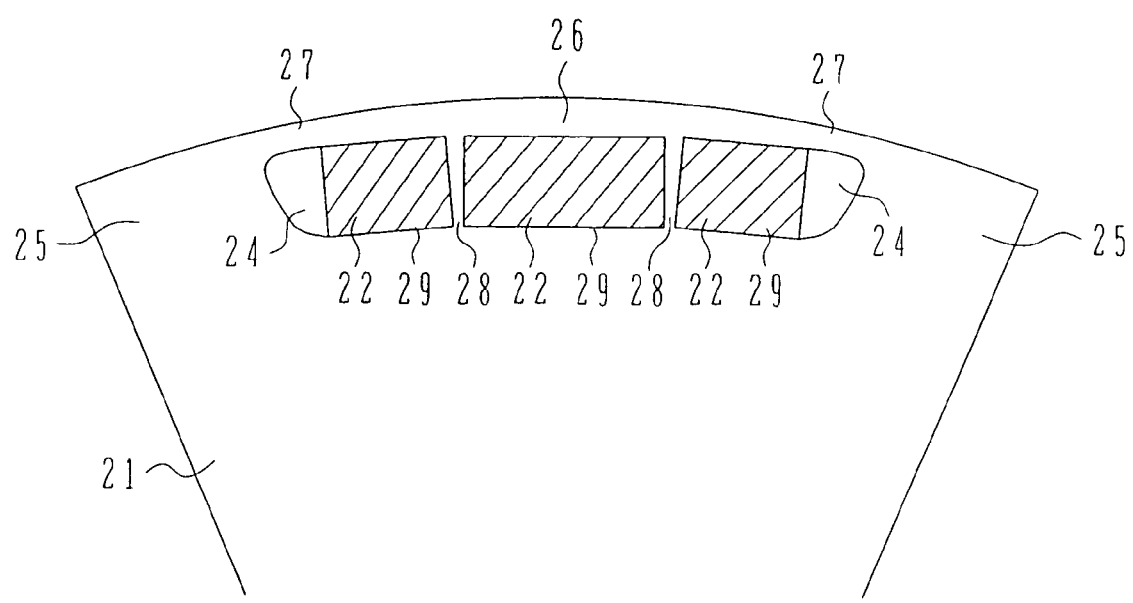
FIG. 26 is a sectional view showing the structure of a motor generator according to still another modification of the present invention.

FIGS. 23-26 show other modifications. The modification of FIG. 23 includes, in addition to the bridge portion 28, bridge portions 43, 44 formed between the circumferential opposite ends of the permanent magnet 22 and the nonmagnetic portions 24. In the modification of FIG. 24, the permanent magnet 22 is divided into three parts in the circumferential direction, and the bridge portion 28 is formed between two adjacent divided magnet parts. In the modification of FIG. 25, bridge portions 43, 44 are formed between the circumferential opposite ends of the permanent magnet 22, which is not divided, and the nonmagnetic portions 24. In the modification of FIG. 26, the permanent magnet 22 is arranged in the rotor core 21 such that the three divided magnet parts in the modification of FIG. 24 are positioned closer to the stator 10 at the pole center thereof as in FIGS. 21 and 22. In any of those modifications, since the number of bridge portions is increased, the radial width of the magnetic path portion 27 can be further narrowed and the effective magnetic fluxes of the permanent magnet 22 can be increased correspondingly.

Another embodiment using stator windings wound with concentrated winding will be described below with reference to FIGS. 27-38.

Figure 27:
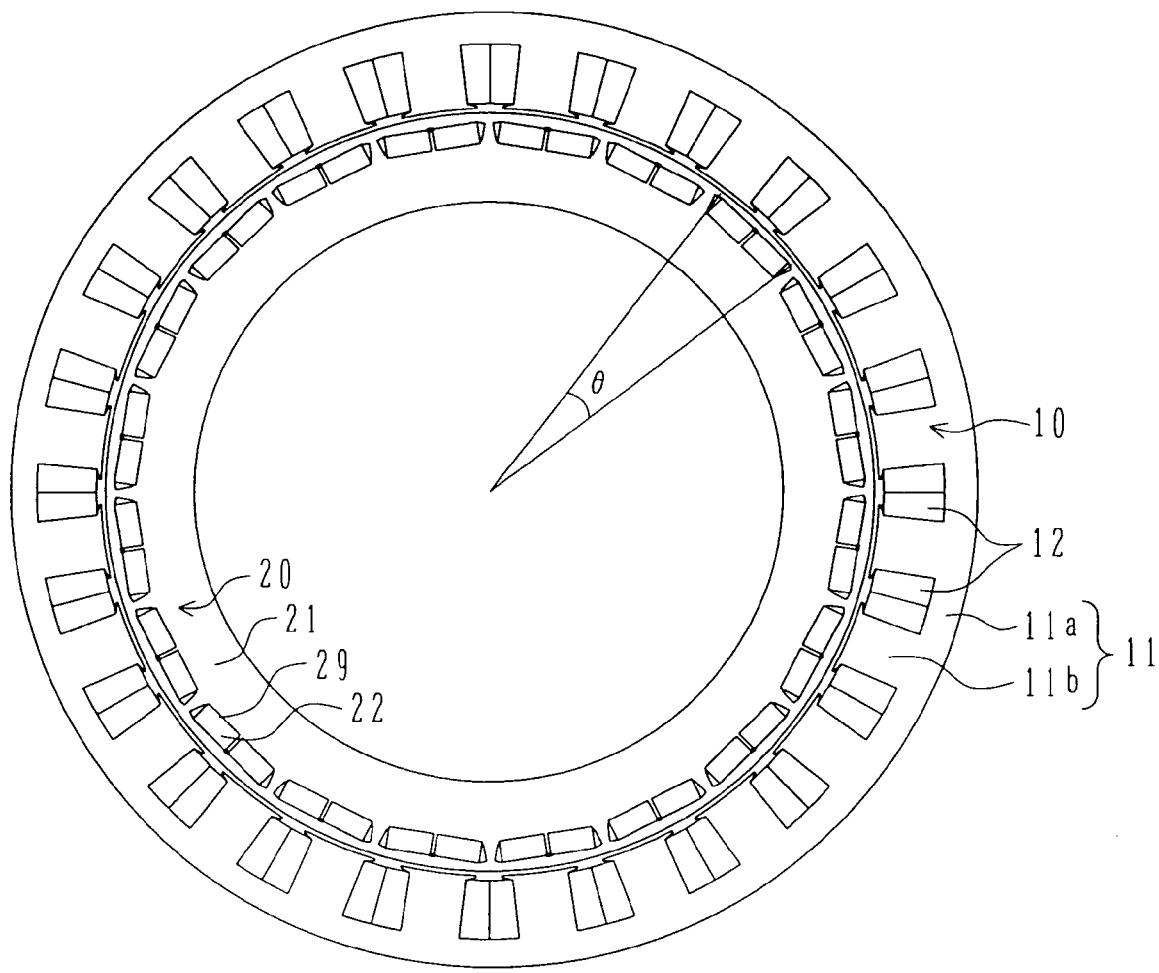
FIG. 27 is a sectional view showing the structure of a motor generator MG1 according to another embodiment of the present invention.
Figure 28:
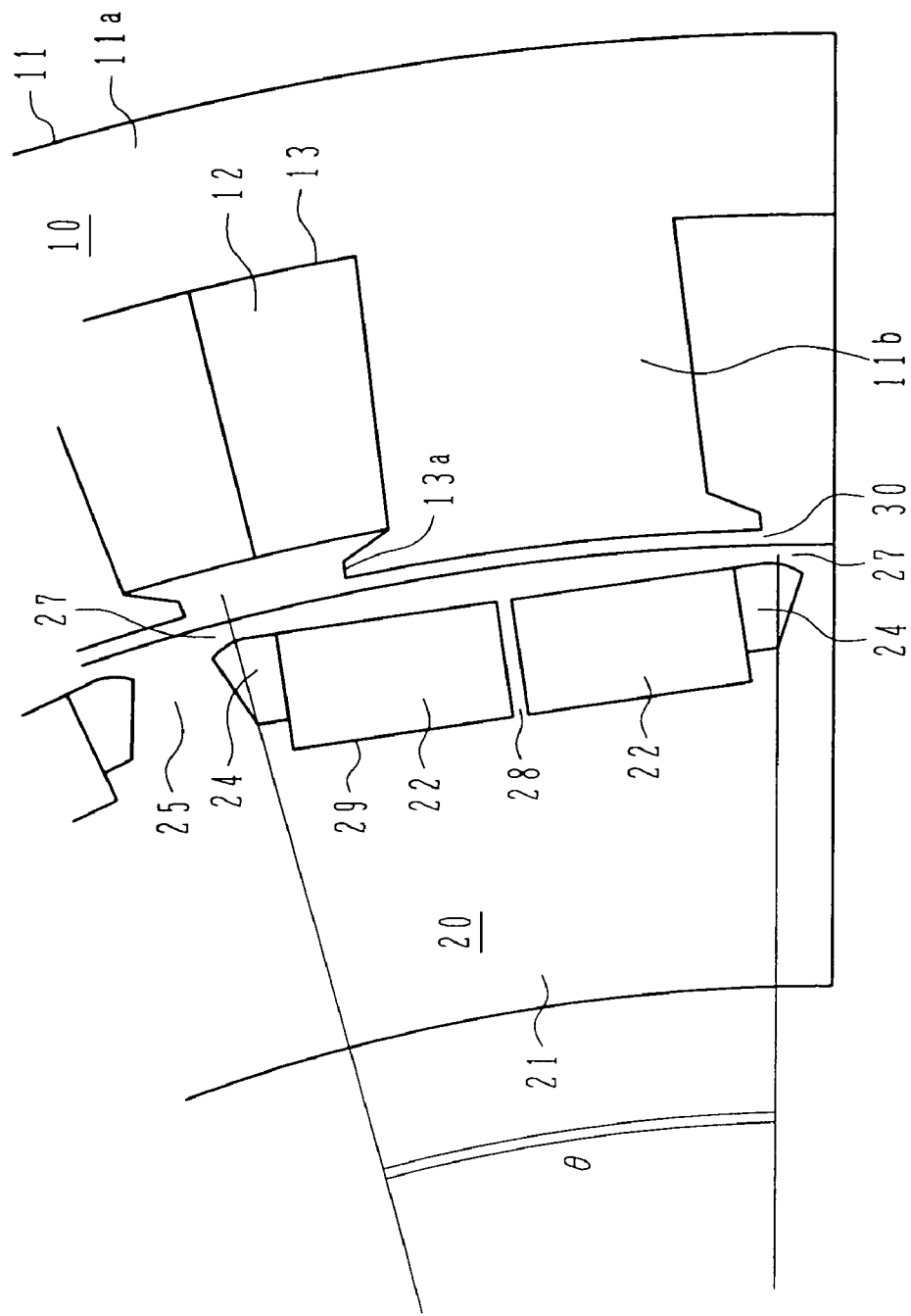
FIG. 28 is a sectional view showing the structure of the motor generator MG1 according to the other embodiment of the present invention.

With reference to FIGS. 27 and 28, a description is first made of the structure of a 20-pole and 24-teeth motor generator MG1 with concentrated winding according to the other embodiment of the present invention. The circuit configuration of an inverter is the same as that shown in FIG. 3. Also, the construction of a hybrid electric vehicle to which the motor generator of this embodiment is applied is the same as that shown in FIG. 4.

FIG. 27 is a sectional view showing the structure of the motor generator MG1 according to the other embodiment of the present invention. FIG. 28 is a sectional view showing the structure of the motor generator MG1 according to the other embodiment of the present invention and shows a principal part of FIG. 27 in enlarged scale.

This embodiment will be described below, by way of example, in connection with the case of using an embedded permanent magnet type 3-phase AC synchronous machine as the motor generator MG1. While the structure of the motor generator MG1 is described in this embodiment, a motor generator MG2 also has the same structure.

As shown in FIG. 27, the motor generator MG1 of this embodiment comprises a stator 10 and a rotor 20 that is rotatably supported and disposed inside the stator 10 in opposed relation to an inner periphery of the stator 10 with a gap 30 left between them. The stator 10 and the rotor 20 are held in a housing. The housing is omitted from the drawing.

The stator 10 comprises a stator core 11 and stator windings 12. The stator core 11 is formed by stacking a plurality of magnetic substances, e.g., a plurality of silicon steel plates, in multiple layers in the axial direction. The stator core 11 is made up of a yoke portion (also called a core back portion) and teeth portions (also called projected portions or salient pole portions). The yoke portion is constituted as a cylindrical yoke core 11a (also called a core back) that is fitted to an inner periphery of the housing. The teeth portions are constituted as a plurality of teeth cores 11b, which are projected radially inward from an inner periphery of the yoke core 11a and are arranged at predetermined angular intervals in the circumferential direction. In this embodiment, 24 teeth cores 11b are formed along the inner periphery of the yoke core 11a.

Between every adjacent twos of the teeth cores 11b, a number 24 of slots 13 (FIG. 28) are formed which are continuously extended in the axial direction and have slot openings 13a (FIG. 28) on the side facing the rotor 20. Within 24 slots 13, slot insulations (not shown) are provided and plural sets of phase windings of the u- to w-phases constituting the stator windings 12 are fitted. In this embodiment, the stator windings 12 are wound in a way of concentrated winding. Here, the term "concentrated winding" means a winding method in which the stator windings are wound over one tooth in a concentrated way. Stated another way, the phase windings are wound in the stator core 11 such that a set of phase windings are accommodated in two slots 13 on both sides of one tooth. Since this embodiment uses the concentrated winding as the winding method, the length of each coil end portion of the stator windings can be reduced in comparison with the case of using the distributed winding. As a result, the axial length of the rotating electrical machine can be cut and the machine size can be reduced.

The rotor 20 comprises a rotor core 21 and permanent magnets 22. The rotor core 21 is formed by stacking a plurality of annular magnetic substances, e.g., a plurality of annular silicon steel plates, in multiple layers in the axial direction. In an outer peripheral portion of the rotor core 21, a number 20 of permanent magnet insertion holes 29 are formed such that the holes are arranged at equal angular intervals in the circumferential direction and are extended to penetrate through the rotor core 21 from one end side to the other end side in the axial direction. The permanent magnet insertion holes 29 are obtained as a result of forming openings in the outer peripheral portion of each of annular silicon steel plates in the same positions, the same shape, the same dimensions, and the same number before the plates are stacked, and then stacking those annular silicon steel plates in multiple layers.

Thus, a 20-pole and 24-teeth permanent-magnet embedded rotating electrical machine with concentrated winding is constructed in which the number of poles of the permanent magnets in the rotor is 20 and the number of teeth of the stator is 24.

As shown in FIG. 28 in detail, the permanent magnet insertion holes 29 are each divided into two parts in the circumferential direction per magnetic pole. Between two divided holes for each of the permanent magnet insertion holes 29 per magnetic pole, a bridge portion 28 is provided to mechanically connect a portion of the rotor core 21 positioned on one side of the permanent magnet insertion hole 29 nearer to the stator 10 and a portion of the rotor core 21 positioned on the other side of the permanent magnet insertion hole 29 nearer to an axis of the rotor 20. The bridge portion 28 is continuously extended in the axial direction like the permanent magnet insertion hole 29.

The permanent magnets 22 are inserted in the permanent magnet insertion holes 29, respectively. Therefore, the rotor 20 having twenty permanent magnets 22 each divided into two parts and embedded in the outer peripheral portion of the rotor core 21 is obtained. Stated another way, this embodiment uses the rotor 20 having a number 20 of magnetic poles. Thus, in this embodiment, since the permanent magnets 22 are embedded in the rotor core 21, the strength of the rotor 20 against centrifugal forces is increased and the motor generator MG1 suitable for high-speed rotation can be obtained.

Corresponding to the division of the permanent magnet insertion hole 29, the permanent magnet 22 is inserted in the permanent magnet insertion hole 29 such that it is divided into two parts in the circumferential direction per magnetic pole. More specifically, the permanent magnets 22 having S and N poles are alternately inserted in the permanent magnet insertion holes 29 in the circumferential direction such that two adjacent permanent magnets have opposite polarities in units of magnetic pole (each unit of magnetic pole having the same polarity). With such an arrangement, an auxiliary pole portion 25 is formed in an area of the rotor core 21, which is positioned between the adjacent permanent magnets 22. The auxiliary pole portion 25 constitutes a magnetic circuit bypassing magnetic circuits of the permanent magnets 22 and serves as a region for directly generating magnetic fluxes in the rotor 20 by the magnetomotive force of the stator 10. Further, a pole shoe portion 26 is formed in an area of the rotor core 21, which is positioned radially outward of each permanent magnet 22. The pole shoe portion 26 serves as a region constituting a magnetic circuit through which magnetic fluxes of the permanent magnet 22 pass.

With this embodiment, the efficiency of the motor generator MG1 can be increased by utilizing both torque due to the magnetic fluxes of the permanent magnet 22 and reluctance torque due to the magnetic fluxes passing through the auxiliary pole portion 25. Also, with this embodiment, since the auxiliary pole portion 25 enables the field-weakening control to be performed, a high-speed operation range of the motor generator MG1 can be widened. Further, with this embodiment, since the pole shoe portion 26 is made of a magnetic substance, pulsating magnetic fluxes of the stator pole can be relaxed.

The permanent magnet 22 can be formed of a neodymium-based sintered magnet, a ferrite magnet, or a neodymium-based bonded magnet. The residual magnetic flux density produced by the permanent magnet 22 is about 0.4-1.2 T. The permanent magnet 22 is magnetized substantially in the radial direction. Also, the circumferentially divided two parts of the permanent magnet 22 are magnetized substantially in the same direction.

A pair of nonmagnetic portions 24 made of magnetic gaps (slits) are formed at circumferential opposite ends of the permanent magnet 22 for each rotor pole. The nonmagnetic portions 24 serve to moderate the gradient of distribution of magnetic flux density around the permanent magnet 22 in areas between the circumferential opposite ends of the permanent magnet 22 and the auxiliary pole portions 25 for each rotor pole. The nonmagnetic portions 24 are formed integrally with the permanent magnet insertion hole 29 and are provided in practice by being left open adjacent to the circumferential opposite ends of the permanent magnet 22 when the permanent magnet 22 is inserted in the permanent magnet insertion hole 29. Like the permanent magnet insertion hole 29, the nonmagnetic portions 24 are extended to penetrate through the rotor core 21 from one end to the other end in the axial direction. A filler, such as varnish, may be filled in the nonmagnetic portions 24. In this embodiment, the provision of the nonmagnetic portions 24 reduces cogging torque. Further, with the provision of the nonmagnetic portions 24, the radial size of a magnetic path portion 27 formed at the boundary between the pole shoe portion 26 and the auxiliary pole portion 25 can be made smaller than the radial width of the permanent magnet 22, and therefore the leakage flux of the permanent magnet 22 can be reduced. In fact, the radial size of the magnetic path portion 27 is not larger than half the radial width of the permanent magnet 22.

The nonmagnetic portions 24 are each trapezoidal in shape such that a side closer to the axis of the rotor 20 has a length shorter than that of a side closer to the stator 10. Also, a corner of the nonmagnetic portion 24 defined by an oblique side, which connects the side closer to the stator 10 and the side closer to the axis of the rotor 20 and is positioned closer to the auxiliary pole portion 25, and by the side closer to the stator 10 is rounded to have a predetermined radius of curvature such that the corner has a circular-arc shape. This rounding relaxes concentration of stresses generated with centrifugal forces due to the rotation of the rotor 20 and acting on the above-mentioned corner of the nonmagnetic portion 24 defined by the oblique side, which connects the side closer to the stator 10 and the side closer to the axis of the rotor 20 and is positioned closer to the auxiliary pole portion 25, and by the side closer to the stator 10.

A pole position sensor (resolver) for detecting the position of the magnetic pole (permanent magnet 22) in the rotor 20 and an encoder for detecting the rotational position of the rotor 20 are disposed on a rotary shaft of the rotor 20 at one end in the axial direction. Detected signals outputted from the resolver and the encoder are inputted to the motor control unit MCU in the inverter INV described in the above embodiment. The inverter INV executes computations based on the input detected signals and command signals outputted from the higher-level control unit, etc., and then controls the voltage applied to the stator windings 12 of the motor generator MG1. The motor generator MG1 is driven as a motor with application of the voltage controlled by the inverter INV to the stator windings 12.

Here, the opening angle θ covering the radial width minimum points of the paired magnetic path portions 27 formed between the permanent magnet insertion hole 29 and the outer periphery of the rotor core 21, at which the radial width of each magnetic path portion 27 is minimized, is 145° in terms of electrical angle.

The relationship between the opening angle θ and the waveform of induced voltage in the 20-pole and 24-teeth rotating electrical machine (motor generator) with concentrated winding will be described below with reference to FIGS. 29-31. In the 20-pole and 24-teeth motor generator, the structure of 10 poles and 12 teeth is repeated twice and therefore the motor generator is similar to the structure of 10 poles and 12 teeth from the electrical point of view.

Figure 29:
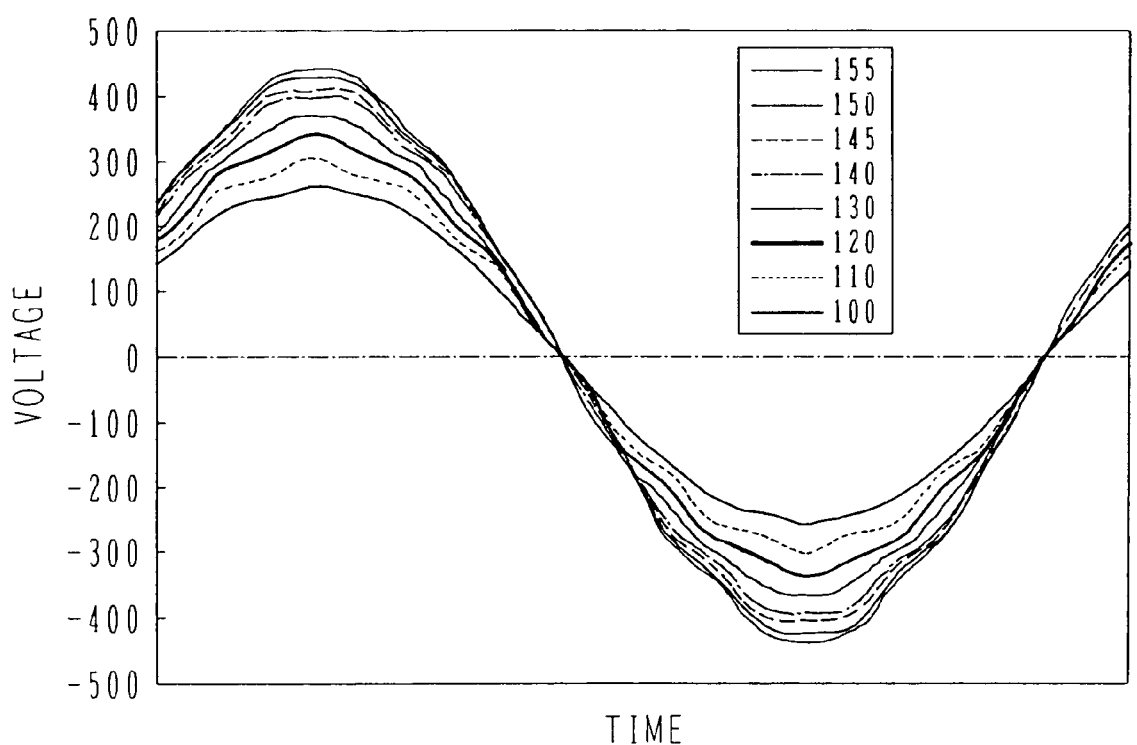
FIG. 29 is a graph showing the relationship between the opening angle and the waveform of induced voltage in a 20-pole and 24-teeth motor generator with concentrated winding according to the other embodiment of the present invention.

FIG. 29 is a graph showing the relationship between the opening angle and the waveform of induced voltage in the 20-pole and 24-teeth motor generator with concentrated winding according to the other embodiment of the present invention. FIG. 30 is a graph for explaining a peak suppression rate of the waveform of induced voltage shown in FIG. 29. FIG. 31 is a graph for explaining an effective value of the waveform of induced voltage shown in FIG. 29 per unit magnet.

The relationship between the opening angle and the waveform of induced voltage in the motor (generator) of the other embodiment is obtained as shown in FIG. 29. In FIG. 29, the horizontal axis represents time and the vertical axis represents the induced voltage. More specifically, FIG. 29 shows the waveform of induced voltage resulting when the opening angle θ in the motor is changed from 100°-155° in terms of electrical angle as indicated in a column on the right side of FIG. 29.

As seen from FIG. 29, the smaller the opening angle θ, the lower is the voltage and the sharper is the tip of the waveform. At the electrical angle of not smaller than 130°, the tip of the waveform is flattened, which means that the voltage peak is suppressed and the basic wave component is increased. In motor design, the peak of the induced voltage at the maximum rotation speed must be held so as not to exceed the withstand voltage of the inverter. Therefore, the motor providing the flattened tip of the waveform can be obtained as a higher-output motor when combined with an inverter.

More specifically, in an inverter serving as a motor control circuit, a current requires to be reduced in order to make the inverter size smaller. However, such a current reduction accompanies the problem specific to a magnet motor, i.e., the problem of induced voltage generated when the motor is co-rotated. In the case of a hybrid electric vehicle, the voltage induced in the motor during coasting has to be kept from exceeding the withstand voltage of switching devices in the inverter serving as the motor control circuit. If the motor voltage at a maximum vehicle speed is designed to a relatively low value by reducing, e.g., the number of windings of a stator coil with intent to meet such necessity, torque capable of being generated at a maximum output current of the inverter during the low-speed and low-voltage operation is reduced.

On the other hand, the withstand voltage of the control circuit is decided depending on the peak voltage, whereas the motor torque and output are decided depending on the basic wave of the induced voltage. Thus, a higher-output motor can be obtained by increasing the basic wave of the induced voltage while suppressing the peak value of the waveform of the induced voltage, as in the case where the electrical angle is set to be not smaller than 130° in FIG. 29.

Figure 30:
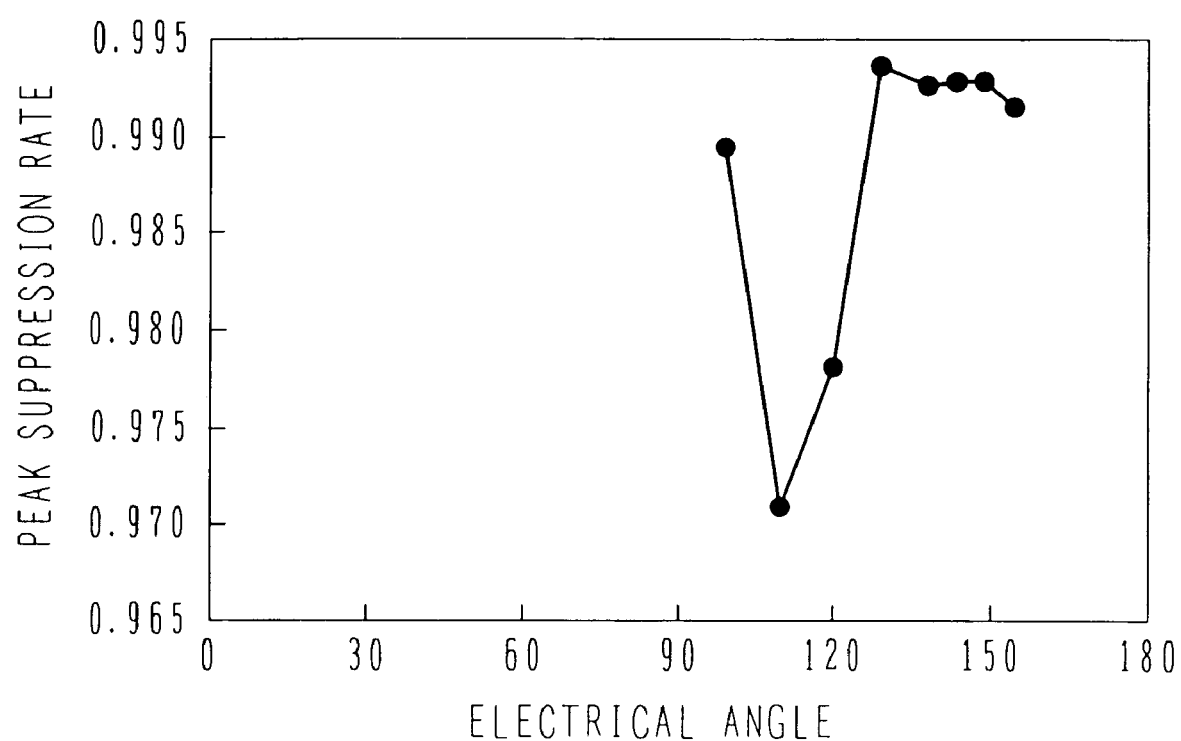
FIG. 30 is a graph for explaining a peak suppression rate of the waveform of induced voltage shown in FIG. 29.

FIG. 30 shows a peak suppression rate defined as a ratio of the peak value of the induced voltage to the amplitude of the basic wave. As seen from FIG. 30, the electrical angle is preferably set to be not smaller than 130° because the peak suppression rate is sharply dropped at the electrical angle of 120°.

Figure 31:
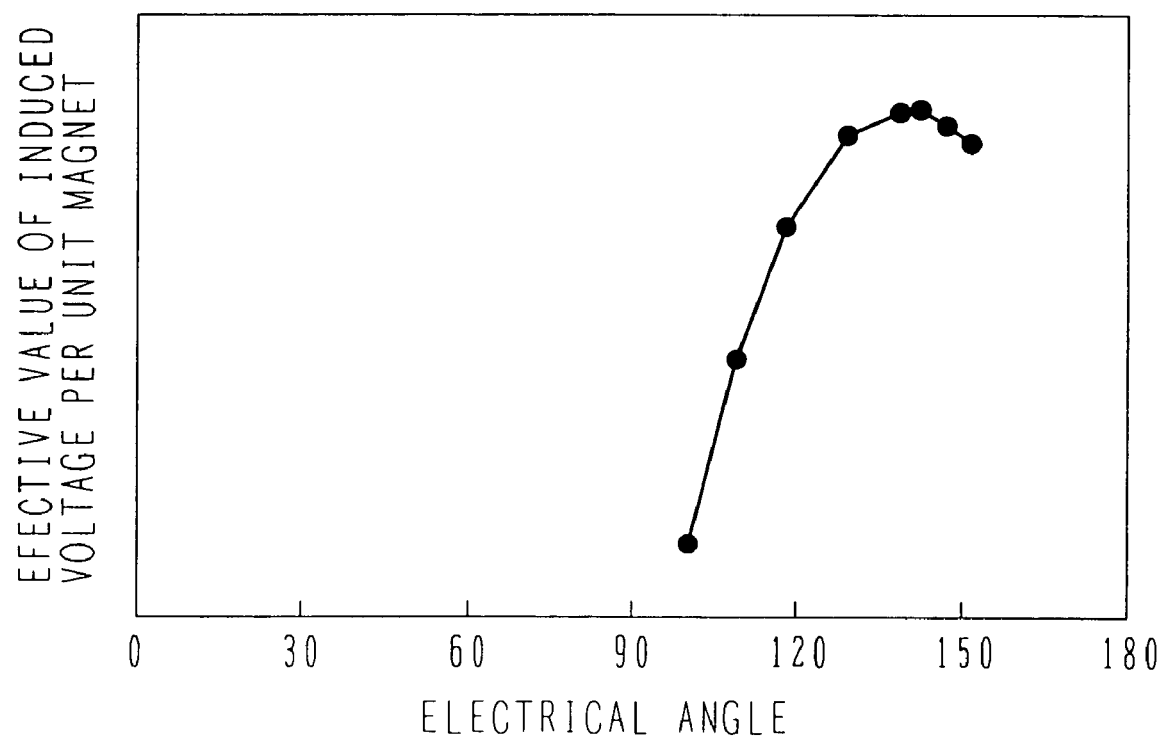
FIG. 31 is a graph for explaining an effective value of the waveform of induced voltage shown in FIG. 29 per unit magnet.

FIG. 31 shows an effective value of the induced voltage per unit magnet. Because the magnet is an expensive material, the graph of FIG. 31 also represents an index of the motor having a superior cost-performance ratio. As seen from FIG. 31, the effective value is also sharply dropped when the electrical angle is reduced from 130°. This means that the magnet is wastefully used.

For the reasons described above with reference to FIGS. 29-31, the opening angle θ is preferably set to be not smaller than 130° in terms of electrical angle in the 20-pole and 24-teeth rotating electrical machine (motor generator) with concentrated winding.

Figure 32:
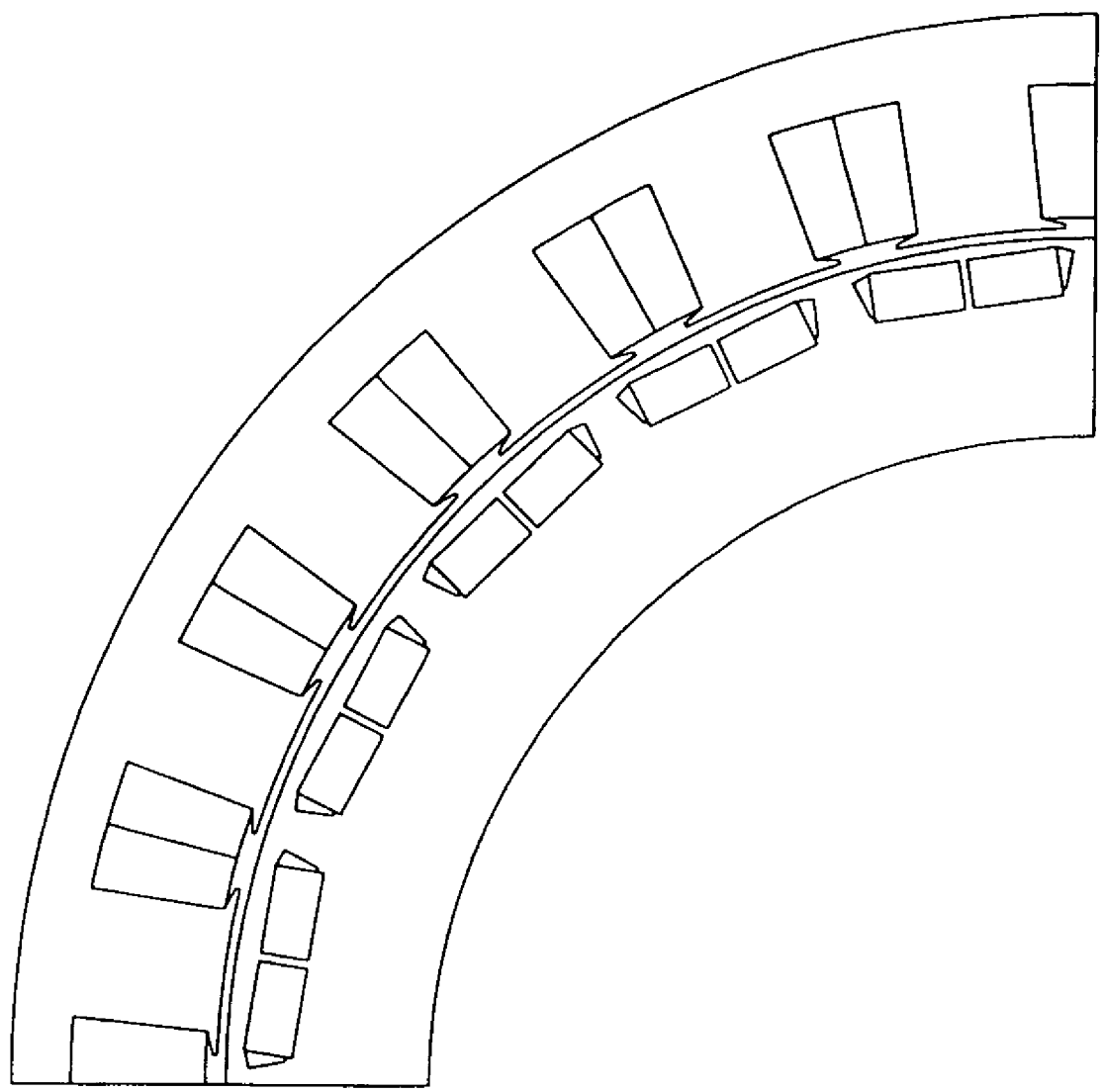
FIG. 32 is a sectional view showing the structure of the 20-pole and 24-teeth motor generator with concentrated winding according to the other embodiment of the present invention when an opening angle θ is set to 130° in terms of electrical angle.
Figure 33:
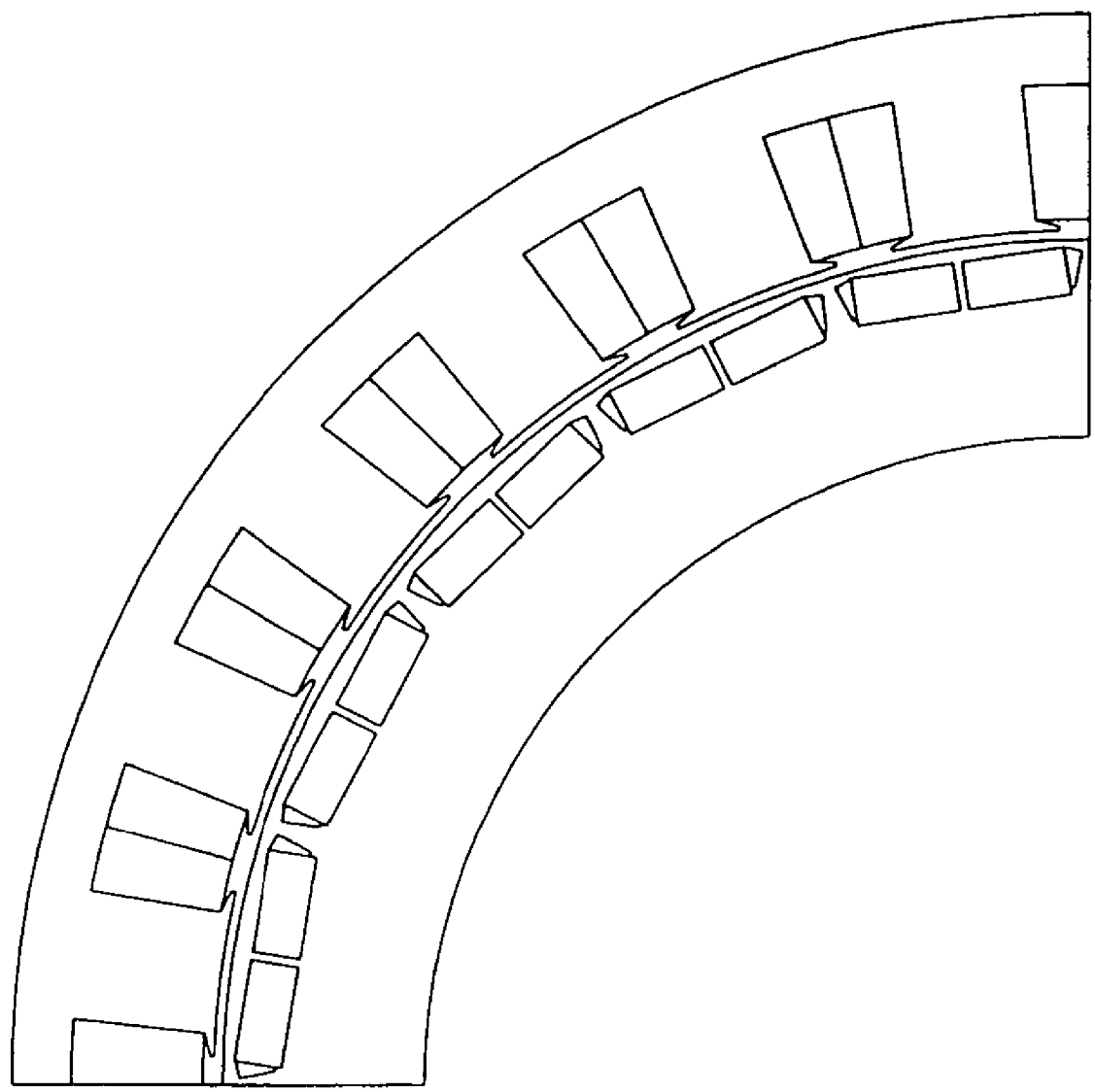
FIG. 33 is a sectional view showing the structure of the 20-pole and 24-teeth motor generator with concentrated winding according to the other embodiment of the present invention when an opening angle θ is set to 155° in terms of electrical angle.

With reference to FIGS. 32 and 33, a description is now made of the structure of the 20-pole and 24-teeth rotating electrical machine (motor generator) with concentrated winding when the opening angle θ is set to 130° and 155° in terms of electrical angle, respectively.

FIG. 32 is a sectional view showing the structure of the 20-pole and 24-teeth motor generator with concentrated winding according to the other embodiment of the present invention when the opening angle θ is set to 130° in terms of electrical angle. FIG. 33 is a sectional view showing the structure of the 20-pole and 24-teeth motor generator with concentrated winding according to the other embodiment of the present invention when an opening angle θ is set to 155° in terms of electrical angle.

As seen from FIG. 32, when the opening angle θ is set to 130° in terms of electrical angle, a sufficient space is left between adjacent magnet poles, and the auxiliary salient poles each having a sufficient size are formed in such a space. Because any nonmagnetic portion is not formed in an area of the rotor corresponding to a central portion between the adjacent magnetic poles, magnetic fluxes are able to most easily flow through that area, whereby the auxiliary salient poles are formed and larger reluctance torque is expected. Accordingly, it is also effective to set the opening angle θ to be not smaller than 130° in terms of electrical angle from the viewpoint of ensuring the sufficient size of the auxiliary salient pole.

On the other hand, as seen from FIG. 33, when the opening angle θ is set to 155° in terms of electrical angle, the auxiliary salient poles are formed between adjacent magnet poles, but the sizes of the auxiliary salient poles cannot have a sufficiently large size because the adjacent magnet poles overlap with each other if the opening angle θ is set to an even larger angle.

From the viewpoint of rotor layout, therefore, it is concluded that the opening angle θ is optimally in the range of 130°-155° in terms of electrical angle and effective use of the magnet is also realized in such range.

The opening angle θ covering the radial width minimum points of the paired magnetic path portions 27 can be expressed in general formula as follows:

$$\theta \approx (n+0.9 \text{ to } 1.2) \times \tau s \text{ (n; integer larger than 0)}$$

In the formula, τs (shown in FIG. 10A) represents the circumferential pitch between axes of the adjacent teeth cores 11a and is expressed by a contained angle with respect to the axis of the rotor 20. Note that, in the case of concentrated winding, the number of slots (teeth) will not become 1.5 time or more the number of poles of the permanent magnets and therefore n=0 holds.

While the above description has been made of the motor with electrical combination of 10 poles and 12 teeth, the above-mentioned preferable condition is similarly applied to motors with other electrical combinations than the above one. Electrical combinations applicable to 3-phase motors, for example, include the cases where a ratio of p (number of poles):t (number of teeth) is 2:3, 4:3, 8:9, 10:9, 14:12, 14:15, 16:15, 14:18, 22:18, 16:21, 20:21, 22:21, 26:21, 22:24, and 26:24.

The construction of a driving source of a hybrid electric vehicle using the motor generator MG1 according to the other embodiment will be described below with reference to FIG. 34.

Figure 34:
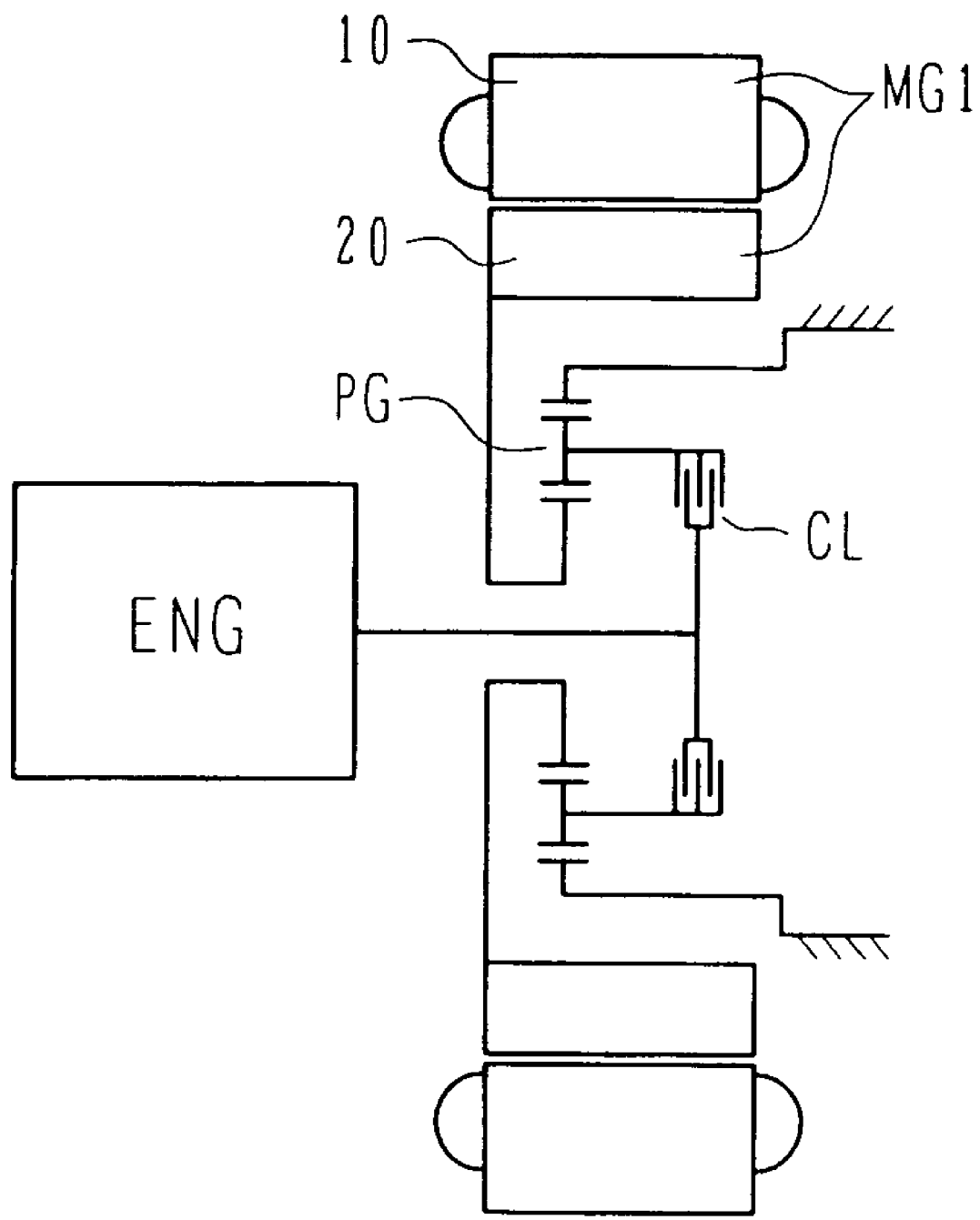
FIG. 34 is a block diagram showing the construction of a driving source of a hybrid electric vehicle using the motor generator MG1 according to the other embodiment of the present invention.

FIG. 34 is a block diagram showing the construction of the driving source of the hybrid electric vehicle using the motor generator MG1 according to the other embodiment of the present invention.

The motor generator MG1 comprises a stator 10 and a rotor 20 that is rotatably supported and disposed inside the stator 10. A space is formed inside the stator 20, and a reduction gearing, i.e., a planetary gear PG, and a clutch CL are disposed in the space. Driving forces of the motor generator MG1 are reduced in speed by the planetary gear PG and transmitted to the clutch CL. Respective driving forces of an engine ENG and the motor generator MG1 are transmitted to the front wheels FLW, FRW through the power splitting mechanism PSM and the transmission T/M, which are shown in FIG. 4.

When driving system parts, such as the planetary gear and the clutch, are assembled inside the motor generator MG1, the space for assembling the driving system parts is required inside the rotor 20 of the motor generator MG1. In other words, the motor generator MG1 has a structure extending flat in the radial direction. By arranging the planetary gear and the clutch in that space, the system size can be reduced.

In the motor generator MG1 having the above-described construction, the radial width between the outer diameter of the stator 10 and the inner diameter of the rotor 20 is reduced. Particularly, a core back of the stator and a yoke of the rotor positioned inward of permanent magnets are thinned. From the viewpoint of realizing such a structure, it is effective to increase the number of poles of permanent magnets embedded in the rotor of the motor generator MG1.

Figure 35:
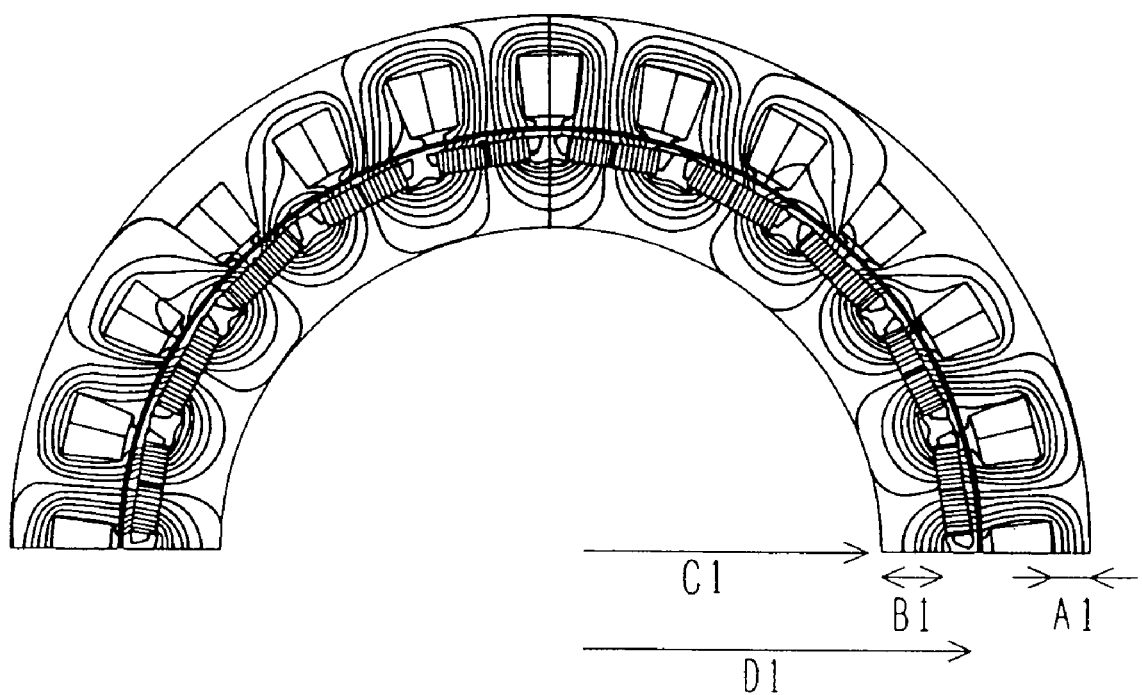
FIG. 35 is an explanatory view showing lines of magnetic flux in the 20-pole and 24-teeth motor generator with concentrated winding according to the other embodiment of the present invention.
Figure 36:
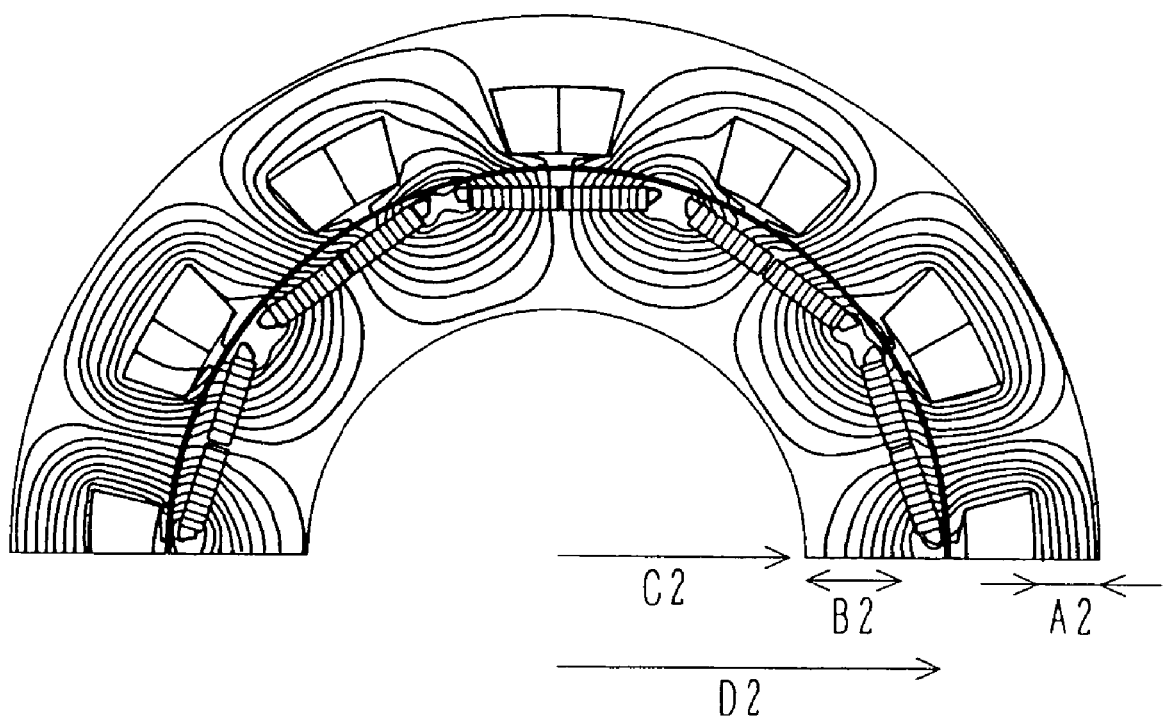
FIG. 36 is an explanatory view showing lines of magnetic flux in a 10-pole and 12-teeth motor generator with concentrated winding according to still another embodiment of the present invention.

With reference to FIGS. 35 and 36, a description is made of lines of magnetic flux in the 20-pole and 24-teeth rotating electrical machine (motor generator) with concentrated winding and a 10-pole and 12-teeth rotating electrical machine (motor generator) with concentrated winding.

FIG. 35 shows the lines of magnetic flux in the 20-pole and 24-teeth motor generator with concentrated winding according to the other embodiment of the present invention. FIG. 36 shows the lines of magnetic flux in the 10-pole and 12-teeth motor generator with concentrated winding according to still another embodiment of the present invention.

As seen from comparison of FIGS. 35 and 36, the thickness of the core back of the stator can be set to a smaller value in the case of the 20-pole motor than in the case of the 10-pole motor (i.e., A1<A2). Also, the radial thickness of the core of the rotor, which is positioned inward of the magnets, can be set to a smaller value (i.e., B1<B2). As a result, a radius C1 of the space inside the rotor of the 20-pole motor can be made larger than a radius C2 of the space inside the rotor of the 10-pole motor (i.e., C1>C2). This is because magnetic fluxes in a multi-pole motor go around following curves of smaller curvatures as seen from the lines of magnetic flux in the respective motors shown in FIGS. 35 and 36.

Further, the larger number of poles reduces the thickness A1 of the stator core back so that the radius of the rotor can be increased correspondingly (D1>D2). Thus, the 20-pole motor can produce higher torque than the 10-pole motor.

Also, as easily understood from the rotor layouts shown in FIGS. 35 and 36, the larger number of poles results in that a larger number of magnets are divided to increase the number of bridge portions, and therefore the mechanical strength against centrifugal forces can be increased. In other words, when magnetic fluxes are generated in the same amount, the larger number of poles is advantageous in that the size of one magnet can be reduced, and therefore the mechanical strength against centrifugal forces can be increased.

In addition, because the 20-pole motor is less apt to demagnetize than the 10-pole motor, the magnet thickness can be reduced and the cost can be cut in the former. The reason why the 20-pole motor is less apt to demagnetize is as follows. When the magnetic field formed by the stator is exactly opposite to the direction of magnetization of the magnet and the intensity of the magnetic field exceeds a predetermined value, the magnet is demagnetized. The magnet is required to have a certain thickness in order to avoid the demagnetization. In the 20-pole motor, because the number of slots is twice that in the 10-pole motor, the electromotive force per slot is about half and the intensity of the magnetic field formed by windings wound over one tooth of the stator is also reduced to half. Accordingly, equivalent demagnetization strength can be obtained even with the magnet having a substantially half thickness. It is hence possible to reduce the magnet amount and to provide a motor having a superior cost-performance ratio.

However, if the number of poles is further increased, the core back of the stator can be made thinner from the viewpoint of magnetic circuit, but the mechanical strength is too reduced. In practice, therefore, a satisfactory effect cannot be expected with the further increase in the number of poles. For that reason, an upper limit in the number of poles is about 30.

While the multi-pole structure is advantageous in arranging the gears inside the rotor as described above, the motor with distributed winding requires a larger number of slots. In the case of the motor with centralized winding, the number of slots will not exceed 1.5 times the number of poles in general combinations. In the case of the motor with distributed winding, however, the number of slots exceeds 3 times the number of poles. If the number of slots is increased and each slot has a narrower shape, electrical work becomes harder to execute and the coil density in each slot is reduced, thus leading to a difficulty in realizing a small size with sufficient performance. For that reason, the structure using the concentrated winding is more suitable for the multi-pole motor including the built-in gears.

Other problems accompanying with the multi-pole motor are iron loss of the stator core and heat generated by eddy currents in the magnet, which are attributable to an increase of frequency. Those problems can be overcome in design of the motor by dividing the magnet in the axial direction, the circumferential direction or the direction of thickness, and/or forming slits. A bonded magnet formed by solidifying magnet dust may be used as an alternate solution. In this case, the magnet dust is covered with an inorganic coating to increase heat resistance. The reason is that, because a vehicular motor is subjected to high temperatures in excess of 150° C. and often requires oil cooling, the heat resistance of the conventional organic coating is insufficient. Alternatively, iron dust may be covered with the inorganic coating, and an ion-dust core formed by compacting the coated iron dust may be used in the rotor and the stator. Thus, by employing the dust-magnet and/or -core, it is possible to reduce eddy currents, to lessen the iron loss, and to realize high-speed rotation.

Figure 37:
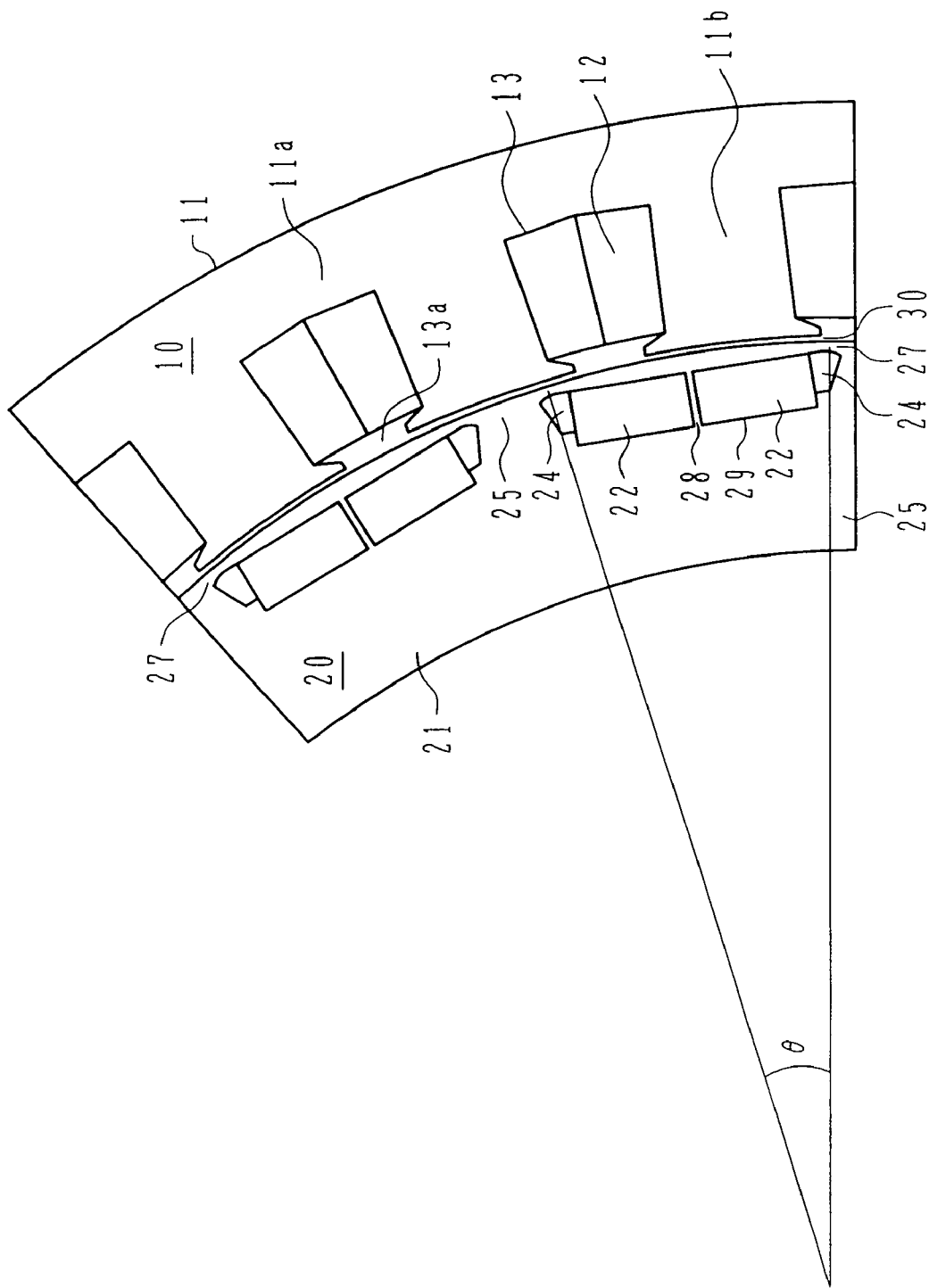
FIG. 37 is an enlarged sectional view showing the construction of a principal part of a motor generator MG1 according to still another embodiment of the present invention.
Figure 38:
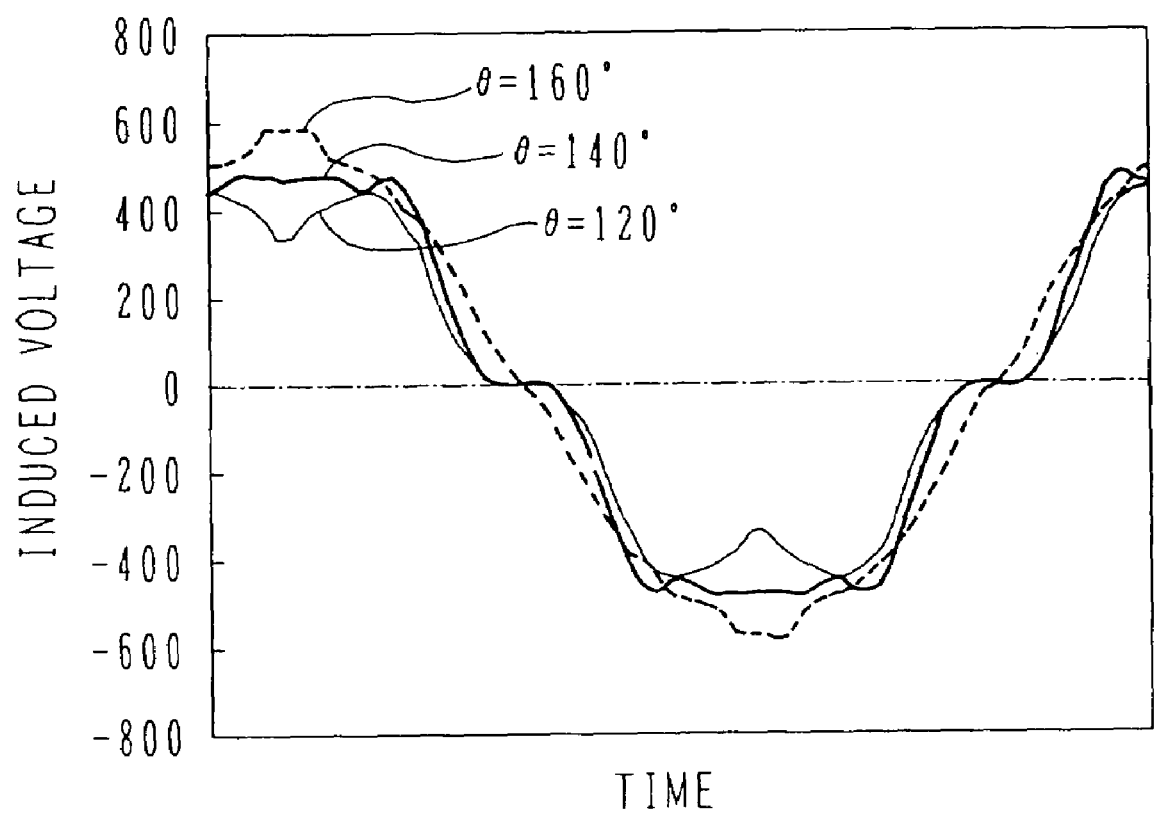
FIG. 38 is a graph showing the relationship between the opening angle and the waveform of induced voltage in a 16-pole and 24-teeth motor generator with concentrated winding according to the still other embodiment of the present invention.

With reference to FIGS. 37 and 38, a description is now made of the structure of a (2:3)-series, 16-pole and 24-teeth motor generator MG1 with concentrated winding according to still another embodiment of the present invention. The circuit configuration of an inverter is the same as that shown in FIG. 3. Also, the construction of a hybrid electric vehicle to which the motor generator of this embodiment is applied is the same as that shown in FIG. 4.

FIG. 37 is an enlarged sectional view showing the construction of a principal part of the motor generator MG1 according to the still other embodiment of the present invention. FIG. 38 is a graph showing the relationship between the opening angle and the waveform of induced voltage in the 16-pole and 24-teeth motor generator with concentrated winding according to the still other embodiment of the present invention. Note that, in FIG. 37, the same reference numerals in FIGS. 27 and 28 denote the same components.

FIG. 37 shows the case where the opening angle θ is set to 150° in terms of electrical angle.

The relationship between the opening angle and the waveform of induced voltage in the motor (generator) of the still other embodiment is obtained as shown in FIG. 38. In FIG. 38, the horizontal axis represents time and the vertical axis represents the induced voltage. More specifically, FIG. 38 shows the waveform of induced voltage resulting when the opening angle θ in the motor is changed from 120°-160° in terms of electrical angle.

As seen from FIG. 38, the smaller the opening angle θ, the lower is the voltage and the sharper is the tip of the waveform. At the electrical angle of not smaller than 130°, the tip of the waveform is flattened, which means that the voltage peak is suppressed and the basic wave component is increased. In motor design, the peak of the induced voltage at the maximum rotation speed must be held so as not to exceed the withstand voltage of the inverter. Therefore, the motor providing the flattened tip of the waveform can be obtained as a higher-output motor when combined with an inverter.

Thus, in the case of the motor generator which has a space for assembling the driving system parts inside the rotor and is extended flat in the radial direction, the number of poles of the permanent magnets is preferably 16 or more.

Electrical combinations suitable for those flat motor generators on condition of 3-phase motors, for example, include the cases where a ratio of p (number of poles):t (number of teeth) is 16:24, 18:27, 20:30, 22:33 and 24:36 in (2:3) series, 16:9, 20:15 and 24:18 in (4:3) series, 16:18 and 24:27 in (8:9) series, 20:18 in (9:8) series, as well as 16:15, 16:21, 20:21, 22:18, 22:21 and 22:24 in other series.

What is claimed is:

1. A permanent magnet type rotating electrical machine comprising:
   a stator; and
   a rotor disposed opposite to said stator with a gap left therebetween; wherein,
   said stator comprises a stator core and stator windings wound over said stator core;
   said stator core comprises an annular yoke core and a plurality of teeth cores radially projecting from said yoke core;
   said rotor comprises a rotor core and a plurality of permanent magnets embedded in said rotor core;
   a pair of nonmagnetic portions are formed in said rotor core at circumferential opposite ends of said permanent magnet for each magnetic pole;
   a pair of magnetic path portions are formed by said pair of nonmagnetic portions in areas of said rotor core which are positioned on one side of said pair of nonmagnetic portions closer to said stator; and
   assuming that a circumferential pitch of said teeth cores with respect to an axis of said rotor is τs (degree) and an opening angle contained by a circumferential width between radial width minimum points of said pair of magnetic path portions with respect to the axis of said rotor is θ (degree), the following formula is met θ≈(n+Y)×τs (n: integer larger than 0)

where Y=0.5 when said stator windings are wound in a distributed winding way, and Y=0.9-1.2 when said stator windings are wound in a concentrated winding way.

2. The permanent magnet type rotating electrical machine according to claim 1, wherein when said stator windings are wound in a distributed winding way, said opening angle θ is in the range of 104°-112° or 152°-168° in terms of electrical angle on condition that a ratio of the number of magnetic poles of said rotor to the number of the teeth cores is m: 6 m (m: natural number).

3. The permanent magnet type rotating electrical machine according to claim 2, wherein assuming that an angle contained by a width between circumferential opposite ends of said permanent magnet on the side closer to said stator with respect to the axis of said rotor is φ (degree), φ is 0.7-0.9 time θ.

4. The permanent magnet type rotating electrical machine according to claim 1, wherein said permanent magnet constituting one magnetic pole of said rotor is divided into plural parts in the circumferential direction, and
   a bridge portion is formed between adjacent two divided parts of said permanent magnet for mechanically connecting a portion of said rotor core which is positioned on one side of said permanent magnet closer to said stator and a portion of said rotor core which is positioned on the other side of said permanent magnet closer to the axis of said rotor.

5. The permanent magnet type rotating electrical machine according to claim 1, wherein said nonmagnetic portion has a trapezoidal shape, and
   a side of said nonmagnetic portion on the side closer to the axis of said rotor has a shorter length than a side of said nonmagnetic portion on the side closer to said stator.

6. The permanent magnet type rotating electrical machine according to claim 5, wherein a corner of said nonmagnetic portion, which is formed by a side of said nonmagnetic portion connecting the side of said nonmagnetic portion on the side closer to said stator and the side of said nonmagnetic portion on the side closer to the axis of said rotor and by the side of said nonmagnetic portion on the side closer to said stator, is formed in circular-arc shape.

7. The permanent magnet type rotating electrical machine according to claim 4, wherein said permanent magnet divided into plural parts is arranged to gradually come closer to said stator while a circumferential magnet position advances from each of opposite ends of a rotor pole toward a center of said rotor pole.

8. The permanent magnet type rotating electrical machine according to claim 4, wherein a bridge portion is formed between said permanent magnet divided into plural parts and said nonmagnetic portion for mechanically connecting the portion of said rotor core which is positioned on one side of said permanent magnet closer to said stator and the portion of said rotor core which is positioned on the other side of said permanent magnet closer to the axis of said rotor.

9. The permanent magnet type rotating electrical machine according to claim 1, wherein a bridge portion is formed between said permanent magnet and said nonmagnetic portion for mechanically connecting the portion of said rotor core which is positioned on one side of said permanent magnet closer to said stator and the portion of said rotor core which is positioned on the other side of said permanent magnet closer to the axis of said rotor.

10. The permanent magnet type rotating electrical machine according to claim 1, wherein said plurality of permanent magnets are arranged in said rotor core at intervals in the circumferential direction such that polarity is alternately changed,
    a portion of said rotor core which is positioned on one side of said permanent magnet closer to said stator serves as a pole shoe portion constituting a magnetic circuit for magnetic fluxes of said permanent magnet, and
    a portion of said rotor core which is positioned between the adjacent permanent magnets serves as an auxiliary pole portion constituting a magnetic circuit for magnetic fluxes to generate torque differing from torque generated by the magnetic fluxes of the permanent magnets,
    said magnetic path portion magnetically connecting said pole shoe portion and said auxiliary pole portion.

11. The permanent magnet type rotating electrical machine according to claim 1, wherein when said stator windings are wound in a concentrated winding way, said opening angle θ is in the range of 130°-155° in terms of electrical angle.

12. The permanent magnet type rotating electrical machine according to claim 1, wherein said rotating electrical machine has a space inside said rotor,
    said stator windings are wound in a concentrated winding way, and the number of poles of said permanent magnets is 16 or more.

13. A permanent magnet type rotating electrical machine driven by an inverter for converting DC power supplied from a DC power supply to AC power, thereby generating an electromotive force to drive a vehicle, said rotating electrical machine comprising:
    a stator; and
    a rotor disposed opposite to said stator with a gap left therebetween; wherein,
    said stator comprises a stator core and stator windings wound over said stator core;
    said rotor comprises a rotor core and a plurality of permanent magnets embedded in said rotor core;
    a pair of nonmagnetic portions are formed in said rotor core at circumferential opposite ends of said permanent magnet;
    a pair of magnetic path portions are formed by said pair of nonmagnetic portions in areas of said rotor core which are positioned on one side of said pair of nonmagnetic portions closer to said stator;

said stator windings are wound in a distributed winding way; and an opening angle θ (degree) contained by a circumferential width between radial width minimum points of said pair of magnetic path portions with respect to an axis of said rotor is in the range of 104°-112° or 152°-168° in terms of electrical angle on condition that a ratio of the number of magnetic poles of said rotor to the number of teeth cores is m: 6 m (m: natural number).

14. The permanent magnet type rotating electrical machine according to claim 13, wherein an angle contained by a width between circumferential opposite ends of said permanent magnet on the side closer to said stator with respect to the axis of said rotor is in the range of 72.8°-100.8° or 106.4°-151.2° in terms of electrical angle.

15. The permanent magnet type rotating electrical machine according to claim 13, wherein said permanent magnet constituting one magnetic pole of said rotor is divided into plural parts in the circumferential direction, and a bridge portion is formed between adjacent two divided parts of said permanent magnet for mechanically connecting a portion of said rotor core which is positioned on one side of said permanent magnet closer to said stator and a portion of said rotor core which is positioned on the other side of said permanent magnet closer to the axis of said rotor.

16. The permanent magnet type rotating electrical machine according to claim 13, wherein said nonmagnetic portion has a trapezoidal shape, and a side of said nonmagnetic portion on the side closer to the axis of said rotor has a shorter length than a side of said nonmagnetic portion on the side closer to said stator.

17. The permanent magnet type rotating electrical machine according to claim 15, wherein a corner of said nonmagnetic portion, which is formed by a side of said nonmagnetic portion connecting the side of said nonmagnetic portion on the side closer to said stator and the side of said nonmagnetic portion on the side closer to the axis of said rotor and by the side of said nonmagnetic portion on the side closer to said stator, is formed in circular-arc shape.

18. The permanent magnet type rotating electrical machine according to claim 15, wherein said permanent magnet divided into plural parts is arranged to gradually come closer to said stator while a circumferential magnet position advances from each of opposite ends of a rotor pole toward a center of said rotor pole.

19. The permanent magnet type rotating electrical machine according to claim 15, wherein a bridge portion is formed between said permanent magnet divided into plural parts and said nonmagnetic portion for mechanically connecting the portion of said rotor core which is positioned on one side of said permanent magnet closer to said stator and the portion of said rotor core which is positioned on the other side of said permanent magnet closer to the axis of said rotor.

20. The permanent magnet type rotating electrical machine according to claim 13, wherein a bridge portion is formed between said permanent magnet and said nonmagnetic portion for mechanically connecting the portion of said rotor core which is positioned on one side of said permanent magnet closer to said stator and the portion of said rotor core which is positioned on the other side of said permanent magnet closer to the axis of said rotor.

21. The permanent magnet type rotating electrical machine according to claim 13, wherein said plurality of permanent magnets are arranged in said rotor core at intervals in the circumferential direction such that polarity is alternately changed, a portion of said rotor core which is positioned on one side of said permanent magnet closer to said stator serves as a pole shoe portion constituting a magnetic circuit for magnetic fluxes of said permanent magnet, and a portion of said rotor core which is positioned between the adjacent permanent magnets serves as an auxiliary pole portion constituting a magnetic circuit for magnetic fluxes to generate torque differing from torque generated by the magnetic fluxes of the permanent magnets, said magnetic path portion magnetically connecting said pole shoe portion and said auxiliary pole portion.

22. A permanent magnet type rotating electrical machine driven by an inverter for converting DC power supplied from a DC power supply to AC power, thereby generating an electromotive force to drive a vehicle, said rotating electrical machine comprising:

a stator; and a rotor disposed opposite to said stator with a gap left therebetween; wherein, said stator comprises a stator core and stator windings wound over said stator core;

said stator comprises an annular yoke core and a plurality of teeth cores radially projecting from said yoke core;

said rotor comprises a rotor core and a plurality of permanent magnets embedded in said rotor core;

a pair of nonmagnetic portions are formed in said rotor core at circumferential opposite ends of said permanent magnet;

a pair of magnetic path portions are formed by said pair of nonmagnetic portions in areas of said rotor core which are positioned on one side of said pair of nonmagnetic portions closer to said stator;

assuming that a circumferential pitch of said teeth cores with respect to an axis of said rotor is τs (degree) and an opening angle contained by a circumferential width between radial width minimum points of said pair of magnetic path portions with respect to an axis of said rotor is θ (degree), the following formula is met;

θ≈(n+0.5)×τs(n: natural number)

said stator windings are wound in a distributed winding way;

a ratio of the number of magnetic poles of said rotor to the number of the teeth cores is m: 6 m (m; natural number); and assuming that an angle contained by a width between circumferential opposite ends of said permanent magnet on the side closer to said stator with respect to the axis of said rotor is φ (degree), φ is 0.7-0.9 timeθ.

23. A permanent magnet type rotating electrical machine driven by an inverter for converting DC power supplied from a DC power supply to AC power, thereby generating an electromotive force to drive a vehicle, said rotating electrical machine comprising:

a stator; and a rotor disposed opposite to said stator with a gap left therebetween; wherein, said stator comprises a stator core and stator windings wound over said stator core;

said rotor comprises a rotor core and a plurality of permanent magnets embedded in said rotor core;

a pair of nonmagnetic portions are formed in said rotor core at circumferential opposite ends of said permanent magnet;

a pair of magnetic path portions are formed by said pair of nonmagnetic portions in areas of said rotor core which are positioned on one side of said pair of nonmagnetic portions closer to said stator;

said stator windings are wound in a distributed winding way;

an opening angle θ (degree) contained by a circumferential width between radial width minimum points of said pair of magnetic path portions with respect to an axis of said rotor is in the range of 104°-112° or 152°-168° in terms of electrical angle on condition that a ratio of the number of magnetic poles of said rotor to the number of teeth cores is m: 6 m (in: natural number); and an angle contained by a width between circumferential opposite ends of said permanent magnet on the side closer to said stator with respect to the axis of said rotor is in the range of 72.8°-100.8° or 106.4°-151.2° in terms of electrical angle.

24. The permanent magnet type rotating electrical machine according to claim 1, wherein:

a permanent magnet constituting one magnetic pole of said rotor is divided into plural parts in the circumferential direction, and a bridge portion is formed between adjacent divided parts of said permanent magnet for mechanically connecting a portion of said rotor core which is positioned on one side of said permanent magnet closer to said stator and a portion of said rotor core which is positioned on the other side of said permanent magnet closer to an axis of said rotor.

25. The permanent magnet type rotating electrical machine according to claim 24, wherein said nonmagnetic portion has a trapezoidal shape, and a side of said nonmagnetic portion on the side closer to the axis of said rotor has a shorter length than a side of said nonmagnetic portion on the side closer to said stator.

26. The permanent magnet type rotating electrical machine according to claim 25, wherein a corner of said nonmagnetic portion, which is formed by a side of said nonmagnetic portion connecting the side of said nonmagnetic portion on the side closer to said stator and the side of said nonmagnetic portion on the side closer to the axis of said rotor and by the side of said nonmagnetic portion on the side closer to said stator, is formed in circular-arc shape.

27. The permanent magnet type rotating electrical machine according to claim 24, wherein said permanent magnet divided into plural parts is arranged to gradually come closer to said stator while a circumferential magnet position advances from each of opposite ends of a rotor pole toward a center of said rotor pole.

28. The permanent magnet type rotating electrical machine according to claim 24, wherein a bridge portion is formed between said permanent magnet divided into plural parts and said nonmagnetic portion for mechanically connecting the portion of said rotor core which is positioned on one side of said permanent magnet closer to said stator and the portion of said rotor core which is positioned on the other side of said permanent magnet closer to the axis of said rotor.

29. The permanent magnet type rotating electrical machine according to claim 24, wherein a bridge portion is formed between said permanent magnet and said nonmagnetic portion for mechanically connecting the portion of said rotor core which is positioned on one side of said permanent magnet closer to said stator and the portion of said rotor core which is positioned on the other side of said permanent magnet closer to the axis of said rotor.

30. The permanent magnet type rotating electrical machine according to claim 24, wherein said plurality of permanent magnets are arranged in said rotor core at intervals in the circumferential direction such that polarity is alternately changed, a portion of said rotor core which is positioned on one side of said permanent magnet closer to said stator serves as a pole shoe portion constituting a magnetic circuit for magnetic fluxes of said permanent magnet, and a portion of said rotor core which is positioned between the adjacent permanent magnets serves as an auxiliary pole portion constituting a magnetic circuit for magnetic fluxes to generate torque differing from torque generated by the magnetic fluxes of the permanent magnets, said magnetic path portion magnetically connecting said pole shoe portion and said auxiliary pole portion.

31. A permanent magnet type rotating electrical machine driven by an inverter for converting DC power supplied from a DC power supply to AC power, thereby generating an electromotive force to drive a vehicle, said rotating electrical machine comprising:

a stator; and a rotor disposed opposite to said stator with a gap left therebetween; wherein, said stator comprises a stator core and stator windings wound over said stator core;

said rotor comprises a rotor core and a plurality of permanent magnets embedded in said rotor core;

a pair of nonmagnetic portions are formed in said rotor core at circumferential opposite ends of said permanent magnet;

a pair of magnetic path portions are formed by said pair of nonmagnetic portions in areas of said rotor core which are positioned on one side of said pair of nonmagnetic portions closer to said stator;

said stator windings are wound in a concentrated winding way; and an opening angle θ (degree) contained by a circumferential width between radial width minimum points of said pair of magnetic path portions with respect to an axis of said rotor is in the range of 130°-155° in terms of electrical angle.

32. A permanent magnet type rotating electrical machine driven by an inverter for converting DC power supplied from a DC power supply to AC power, thereby generating an electromotive force to drive a vehicle, said rotating electrical machine comprising:

a stator; and a rotor disposed opposite to said stator with a gap left therebetween; wherein, said stator comprises a stator core and stator windings wound over said stator core;

said rotor comprises a rotor core and a plurality of permanent magnets embedded in said rotor core;

a pair of nonmagnetic portions are formed in said rotor cor at circumferential opposite ends of said permanent magnet;

a pair of magnetic path portions are formed by said pair of nonmagnetic portions in areas of said rotor core which are positioned on one side of said pair of nonmagnetic portions closer to said stator;

said rotating electrical machine has a space inside said rotor;

said stator windings are wound in a concentrated winding way;

an opening angle θ (degree) contained by a circumferential width between radial width minimum points of said pair of magnetic path portions with respect to an axis of said rotor is in the range of 130°-155° in terms of electrical angle; and the number of poles of said permanent magnets is 16 or more.

* * * * *